(12) United States Patent
Miwa et al.

(10) Patent No.: US 7,289,859 B2
(45) Date of Patent: Oct. 30, 2007

(54) METHOD FOR DETERMINING PARAMETER OF PRODUCT DESIGN AND ITS SUPPORTING SYSTEM

(75) Inventors: Toshiharu Miwa, Kariya (JP); Kenji Tamaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/518,208

(22) Filed: Sep. 11, 2006

(65) Prior Publication Data

US 2007/0078553 A1 Apr. 5, 2007

(30) Foreign Application Priority Data

Sep. 30, 2005 (JP) ............... 2005-285964

(51) Int. Cl.
*G06F 19/00* (2006.01)
*G05B 13/02* (2006.01)

(52) U.S. Cl. ............... 700/97; 700/31; 700/52

(58) Field of Classification Search ............ 700/28–31, 700/44, 45, 47–50, 52, 97, 103–105; 703/1, 703/6, 13, 23; 716/1, 4, 5; 717/104, 124, 717/134, 135

See application file for complete search history.

(56) References Cited

U.S. PATENT DOCUMENTS

| | | | | |
|---|---|---|---|---|
| 6,448,983 | B1* | 9/2002 | Ali et al. ............... | 715/780 |
| 6,845,489 | B1* | 1/2005 | Mizuno et al. ............ | 716/1 |
| 2003/0115037 | A1* | 6/2003 | Sumida ............... | 703/22 |
| 2004/0139405 | A1* | 7/2004 | Mori et al. ............ | 716/2 |
| 2006/0184482 | A1* | 8/2006 | Flinn et al. ............ | 705/45 |
| 2006/0212343 | A1* | 9/2006 | Ferryanto et al. ......... | 705/11 |
| 2007/0043622 | A1* | 2/2007 | Olsen et al. ............ | 705/22 |
| 2007/0044049 | A1* | 2/2007 | Adams et al. ............ | 716/4 |
| 2007/0100475 | A1* | 5/2007 | Korchinski ............ | 700/28 |

FOREIGN PATENT DOCUMENTS

| | | | |
|---|---|---|---|
| JP | 05-041443 | | 2/1993 |
| JP | 07-200662 | | 8/1995 |
| JP | 10-207926 | | 8/1998 |
| JP | 2000-148817 | | 5/2000 |
| JP | 2002-259464 | | 9/2002 |
| JP | 2003058579 A | * | 2/2003 |
| JP | 2003058582 A | * | 2/2003 |

OTHER PUBLICATIONS

"Design of Experiments" by Shu Yamada, Juse Press, Ltd. ISBN4-8171-0389-2, pp. 230-235, no date, no translation.

* cited by examiner

*Primary Examiner*—M. N. Von Buhr
(74) *Attorney, Agent, or Firm*—Antonelli, Terry, Stout & Kraus, LLP.

(57) ABSTRACT

In a method for determining a design parameter in a product design parameter determination supporting system, interaction between product function and design parameter is structured, a design parameter group with reduced interaction is extracted, an experiment design is prepared based upon the design parameter group, modeling of a quality influence degree between product function and design parameter is performed from an experiment result, and coordination process of a design parameter and estimation of a product function are performed with taking into account a manufacturing variation. By this means, it is possible to realize a system which can determine many design parameters extremely efficiently even in the product development where there are many design parameters and product functions to be handled and interactions are present between the design parameters and product functions.

15 Claims, 38 Drawing Sheets

FIG. 3

| No | Constituent Element | Part | Design Parameter | Unit | Upper Limit | Lower Limit | Number of Experiment Levels | Manufacturing Variation | Minimum Change Amount |
|---|---|---|---|---|---|---|---|---|---|
| 1 | HEADER ASSEMBLY | LOWER SHIELD FILM | FILM THICKNESS | μm | 50 | 80 | 3 | 5 | 5 |
| 2 | | LOWER GAP FILM | FILM THICKNESS | μm | 100 | 80 | 3 | 5 | |
| 3 | | GMR FILM | Mn COMPOSITION RATIO | % | 25 | 20 | 3 | 1 | 5 |
| 4 | | | Fe COMPOSITION RATIO | % | 40 | 30 | 3 | 1 | 5 |
| 5 | | | Co COMPOSITION RATIO | % | 15 | 5 | 3 | 1 | 5 |
| 6 | | | FILM THICKNESS | μm | 5 | 3 | 3 | 1 | 1 |
| 7 | | | HEAD SIZE | μm | 0.1 | 0.08 | 3 | 0.005 | 0.01 |
| 8 | | SPACER | GAP SIZE | mm | 0.3 | 0.2 | 3 | 0.1 | 0.05 |
| 9 | | | FLATNESS | μm | 0.3 | 0.2 | 3 | 0.05 | 0.05 |
| 10 | DISK | SUBSTRATE GLASS | THICKNESS | mm | 3 | 5 | 3 | 0.05 | 1 |
| ... | ... | ... | ... | ... | ... | ... | ... | ... | ... |

FIG. 4

| No | PRODUCT FUNCTION | UNIT | TARGET VALUE | | |
|---|---|---|---|---|---|
| | | | UPPER LIMIT | CENTER | LOWER LIMIT |
| 1 | DISK TRANSFER RATE | | | ✕ | |
| 2 | INTERFACE TRANSFER RATE | | ✕ | ✕ | |
| 3 | SEEK TIME | | ✕ | ✕ | ✕ |
| 4 | DISK REMNANT MAGNETIZATION | | | ✕ | |
| 5 | GMR HEAD INDUCTANCE | | | | |
| ... | ... | | ... | ... | ... |

FIG. 5

| No | PROCESS | DESIGN PARAMETER | UNIT | UPPER LIMIT | LOWER LIMIT | NUMBER OF EXPERIMENT LEVELS | MANUFACTURING VARIATION | MINIMUM CHANGE AMOUNT |
|---|---|---|---|---|---|---|---|---|
| 1 | DEVICE ISOLATION | DEVICE ISOLATION PORTION LENGTH | nm | 200 | 180 | 3 | 10 | 2 |
| 2 | | DEVICE ISOLATION PORTION WIDTH | nm | 400 | 350 | 3 | 10 | 2 |
| 3 | | DEVICE ISOLATION PORTION DEPTH | nm | 250 | 200 | 3 | 20 | 10 |
| 4 | | TRENCH EMBEDDING AMOUNT | nm | 300 | 350 | 3 | 5 | 10 |
| 5 | | TRENCH ETCHING AMOUNT | nm | 10 | 8 | 3 | 1 | 1 |
| 6 | ION IMPLANTATION | B IMPLANTATION AMOUNT IN p-WELL PORTION | eV | 1.2 | 1 | 3 | ✕ | 0.1 |
| 7 | | P IMPLANTATION AMOUNT IN n-WELL PORTION | eV | 0.8 | 0.6 | 3 | ✕ | 0.1 |
| 8 | DIFFUSION | TEMPERATURE | °C | 900 | 850 | 3 | 2 | 10 |
| 9 | | TIME | sec | 40 | 30 | 3 | ✕ | 5 |
| 10 | GATE FORMATION | OXIDE FILM THICKNESS | nm | 5 | 4 | 3 | 1 | 0.5 |
| 11 | | GATE SIZE | nm | 120 | 110 | 3 | 5 | 2 |
| 12 | | GATE FILM THICKNESS | nm | 300 | 280 | 3 | 5 | 10 |
| 13 | | CLEANING PROCESS (NECESSARY/NOT NECESSARY) | — | 0 | 1 | 2 | ✕ | 1 |
| ... | ... | ... | ... | ... | ... | ... | ... | ... |

FIG. 6

| No | PRODUCT FUNCTION | UNIT | TARGET VALUE | | |
|---|---|---|---|---|---|
| | | | UPPER LIMIT | CENTER | LOWER LIMIT |
| 1 | THRESHOLD VOLTAGE | V | | | |
| 2 | LEAKAGE CURRENT | A | | | |
| 3 | STANDBY CURRENT | A | | | |
| 4 | SHEET RESISTANCE | Ω | | | |
| 5 | POWER CONSUMPTION | J | | | |
| ... | ... | | ... | ... | ... |

NETWORK DIAGRAM

MATRIX DIAGRAM

| QUALITY INFLUENCE MODEL | | DESIGN PARAMETER | | | | |
|---|---|---|---|---|---|---|
| | | X1 | X2 | X3 | X4 | X5 |
| PRODUCT FUNCTION | Y1 | 1 | 0 | 1 | 0 | 0 |
| | Y2 | 0 | 1 | 0 | 1 | 1 |
| | Y3 | 0 | 0 | 1 | 1 | 0 |

MATRIX DIAGRAM

DESIGN PARAMETER (X)

| | 1 | 2 | 3 | 4 | 5 |
|---|---|---|---|---|---|
| 1 | | | 1 | | |
| 2 | | | | 1 | 1 |
| 3 | 1 | | | 1 | |
| 4 | | 1 | 1 | | 1 |
| 5 | | 1 | 1 | | |

DESIGN PARAMETER (X)

NETWORK DIAGRAM

DESIGN PARAMETER (X)

FIG. 12
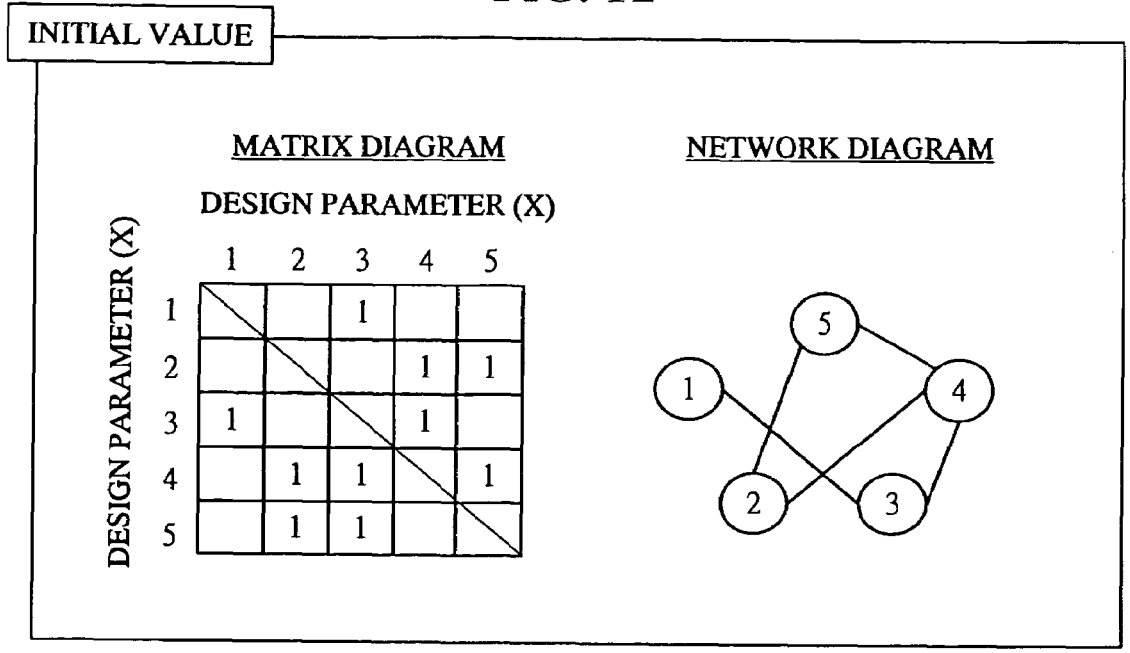
STRUCTURING PROCESS (RE-ARRANGEMENT)
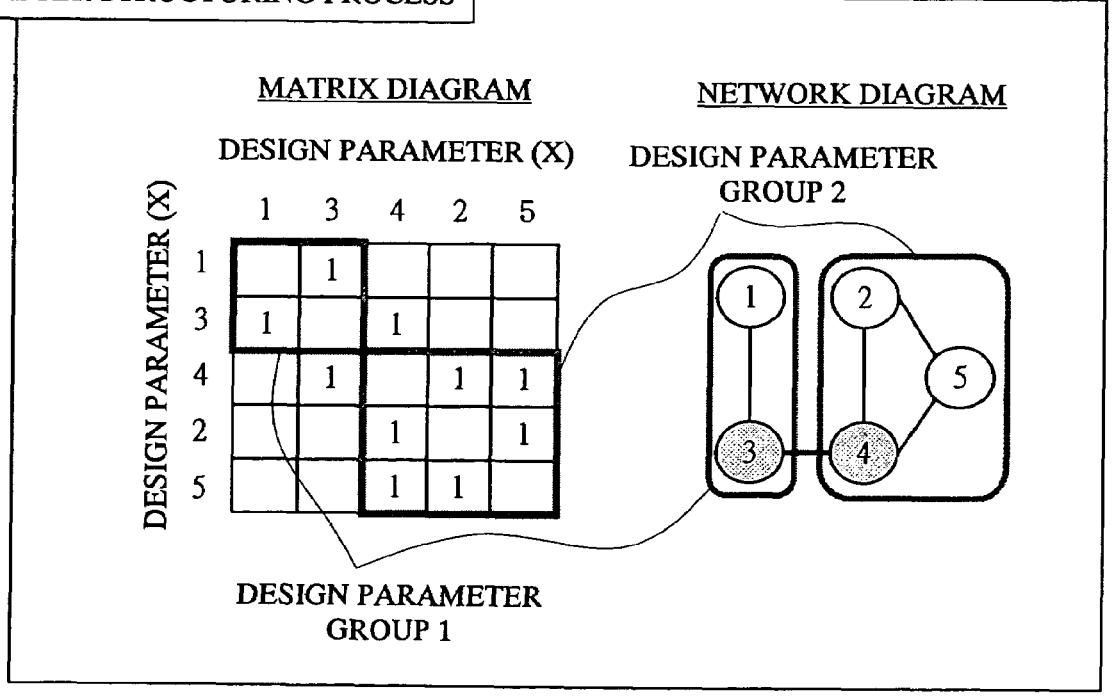

FIG. 15

LARGE EXPERIMENT ID=2

| SMALL EXPERIMENT ID | DESIGN PARAMETER | | |
|---|---|---|---|
| | X2 | X4 | X5 |
| 1 | 1 | 1 | 1 |
| 2 | 1 | 1 | 2 |
| 3 | 1 | 2 | 1 |
| 4 | 1 | 2 | 2 |
| 5 | 2 | 1 | 1 |
| 6 | 2 | 1 | 2 |
| 7 | 2 | 2 | 1 |
| 8 | 2 | 2 | 2 |

| | EXPERIMENT LEVEL | |
|---|---|---|
| | 1 | 2 |
| X2 | 10 | 20 |
| X4 | 5 | 10 |
| X5 | 10 | 30 |

FIG. 19

| DESIGN PARAMETER ITEM | INTERFACE WITH OTHER PARAMETER | APPROPRIATE VALUE | TOLE-RANCE | MANUFACTURING VARIATION RECORD |
|---|---|---|---|---|
| X1 |  | 150 | 20 | 30 |
| X2 |  | 12 | 5 | 2 |
| X3 | X4 | 1 | 0.5 | 0.3 |
| X4 |  | 7 | 3 | 1 |
| X5 |  | 20 | 10 | 5 |

FIG. 20

| PRODUCT FUNCTION ITEM | ESTIMATION VALUE | | TARGET VALUE | | | DETERMI-NATION |
|---|---|---|---|---|---|---|
| | AVERAGE | VARIATION | UPPER LIMIT | CENTER | LOWER LIMIT | |
| Y1 | | | | | | NG |
| Y2 | | | | | | OK |
| Y3 | | | | | | OK |

FIG. 21
NO INTERACTION
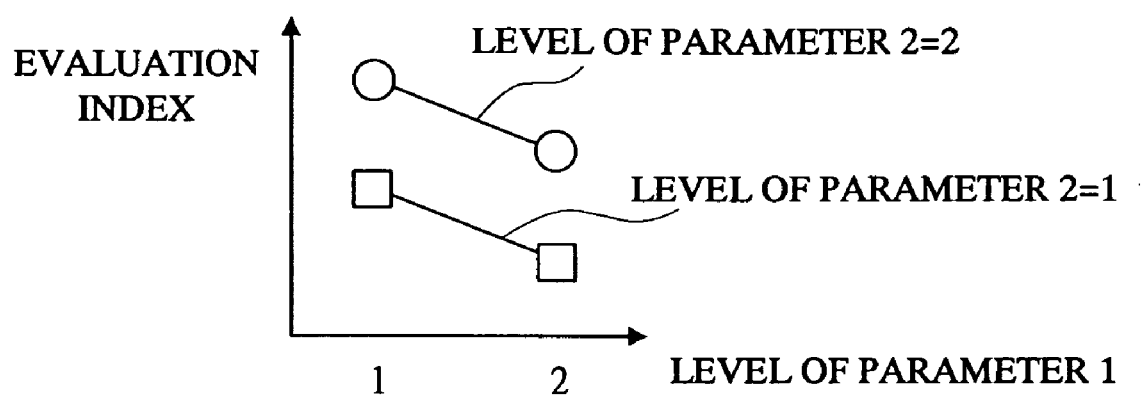
WITH INTERACTION
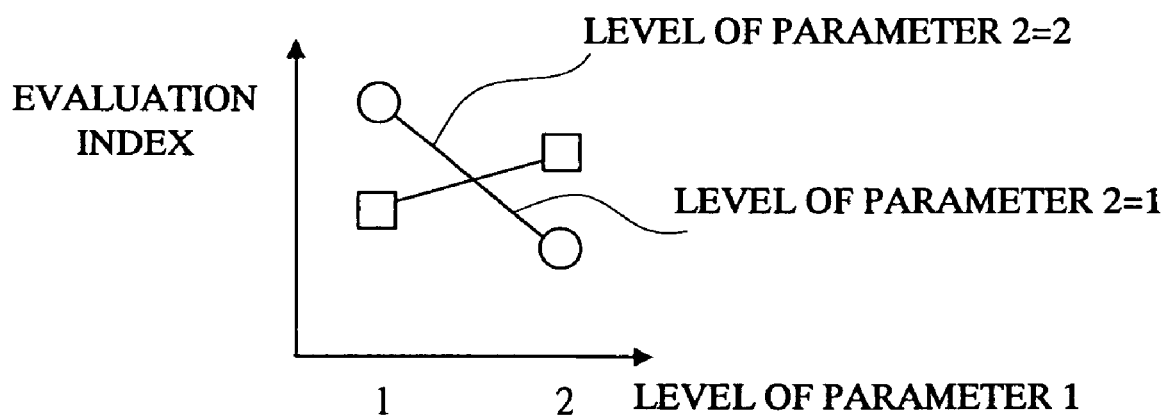

NETWORK DIAGRAM

MATRIX DIAGRAM

| QUALITY INFLUENCE MODEL | | DESIGN PARAMETER | | | | | | | | | |
|---|---|---|---|---|---|---|---|---|---|---|---|
| | | X1 | X2 | X3 | X4 | X5 | X6 | X7 | X8 | X9 | X10 |
| PRODUCT FUNCTION | Y1 | 1 | 1 | 1 | 0 | 0 | 0 | 0 | 0 | 0 | 0 |
| | Y2 | 1 | 0 | 1 | 1 | 0 | 0 | 0 | 0 | 0 | 0 |
| | Y3 | 0 | 0 | 1 | 0 | 1 | 1 | 0 | 1 | 0 | 0 |
| | Y4 | 0 | 0 | 0 | 0 | 1 | 1 | 1 | 0 | 0 | 0 |
| | Y5 | 0 | 0 | 0 | 0 | 1 | 0 | 0 | 1 | 1 | 1 |

NETWORK DIAGRAM

MATRIX DIAGRAM

DESIGN PARAMETER (X)

| | 1 | 2 | 3 | 4 | 5 | 6 | 7 | 8 | 9 | 10 |
|---|---|---|---|---|---|---|---|---|---|---|
| 1 | | 1 | 1 | 1 | 0 | 0 | 0 | 0 | 0 | 0 |
| 2 | 1 | | 1 | 0 | 0 | 0 | 0 | 0 | 0 | 0 |
| 3 | 1 | 1 | | 1 | 1 | 1 | 0 | 1 | 0 | 0 |
| 4 | 1 | 0 | 1 | | 0 | 0 | 0 | 0 | 0 | 0 |
| 5 | 0 | 0 | 1 | 0 | | 1 | 1 | 1 | 1 | 1 |
| 6 | 0 | 0 | 1 | 0 | 1 | | 1 | 1 | 0 | 0 |
| 7 | 0 | 0 | 0 | 0 | 1 | 1 | | 0 | 0 | 0 |
| 8 | 0 | 0 | 1 | 0 | 1 | 1 | 0 | | 1 | 1 |
| 9 | 0 | 0 | 0 | 0 | 1 | 0 | 0 | 1 | | 1 |
| 10 | 0 | 0 | 0 | 0 | 1 | 0 | 0 | 1 | 1 | |

DESIGN PARAMETER (X)

| No. | DESIGN PARAMETER X1 ↓ COLUMN 1 A | X2 ↓ COLUMN 2 B | X3 ↓ COLUMN 3 A×B | COLUMN 4 C | COLUMN 5 A×C | COLUMN 6 B×C | COLUMN 7 ERROR |
|---|---|---|---|---|---|---|---|
| 1 | 1 | 1 | 1 | 1 | 1 | 1 | 1 |
| 2 | 1 | 1 | 1 | 2 | 2 | 2 | 2 |
| 3 | 1 | 2 | 2 | 1 | 1 | 2 | 2 |
| 4 | 1 | 2 | 2 | 2 | 2 | 1 | 1 |
| 5 | 2 | 1 | 2 | 1 | 2 | 1 | 2 |
| 6 | 2 | 1 | 2 | 1 | 1 | 2 | 1 |
| 7 | 2 | 2 | 1 | 2 | 2 | 2 | 1 |
| 8 | 2 | 2 | 1 |   | 1 | 1 | 2 |

FIG. 34

| PARAMETER | p VALUE | SIGNIFICANCE DETERMINATION |
|---|---|---|
| X1 | 0.02 | PRESENCE |
| X2 | 0.01 | PRESENCE |
| X4 | 0.03 | PRESENCE |
| (X1)×(X2) | 0.04 | PRESENCE |
| (X1)×(X4) | 0.65 | ABSENCE |
| (X2)×(X4) | 0.32 | ABSENCE |

FIG. 35

·RELATIONSHIP BETWEEN PRIMARY ITEM OF
DESIGN PARAMETER (X) AND
PRODUCT FUNCTION (Y)

|    | X1 | X2 | X3 | X4 | X5 | X6 | X7 | X8 | X9 | X10 |
|----|----|----|----|----|----|----|----|----|----|-----|
| Y1 | O  | O  | O  |    |    |    |    |    |    |     |
| Y2 | O  |    | O  | O  |    |    |    |    |    |     |
| Y3 |    |    | O  |    | O  | O  |    | O  |    |     |
| Y4 |    |    |    |    | O  | O  | O  |    |    |     |
| Y5 |    |    |    |    | O  |    |    | O  | O  | O   |

·RELATIONSHIP BETWEEN INTERACTION ITEM
 BETWEEN DESIGN PARAMETER (X) AND PRODUCT FUNCTION (Y)

|    | X1–X2 | X1–X3 | X1–X4 | X2–X3 | X3–X4 | X3–X5 | X3–X6 | X3–X8 | X5–X6 | X5–X7 | X5–X8 | X5–X9 | X5–X10 | X6–X7 | X6–X8 | X8–X9 | X8–X10 | X9–X10 |
|----|-------|-------|-------|-------|-------|-------|-------|-------|-------|-------|-------|-------|--------|-------|-------|-------|--------|--------|
| Y1 | O | O |   | O |   |   |   |   |   |   |   |   |   |   |   |   |   |   |
| Y2 |   | O | O | O |   |   |   |   |   |   |   |   |   |   |   |   |   |   |
| Y3 |   |   |   |   |   | O | O | O | O |   | O |   |   |   | O |   |   |   |
| Y4 |   |   |   |   |   |   |   |   | O | O |   |   |   | O |   |   |   |   |
| Y5 |   |   |   |   |   |   |   |   |   |   | O | O | O |   |   | O | O | O |

FIG. 36

·RELATIONSHIP BETWEEN PRIMARY ITEM OF DESIGN PARAMETER (X) AND PRODUCT FUNCTION (Y)

|    | X1 | X2 | X3 | X4 | X5 | X6 | X7 | X8 | X9 | X10 |
|----|----|----|----|----|----|----|----|----|----|-----|
| Y1 | B  | B  | A  |    |    |    |    |    |    |     |
| Y2 | B  |    | A  | B  |    |    |    |    |    |     |
| Y3 |    |    | A  |    | A  | C  |    | A  |    |     |
| Y4 |    |    |    |    | A  | C  | C  |    |    |     |
| Y5 |    |    |    |    | A  |    |    | A  | D  | D   |

·RELATIONSHIP BETWEEN INTERACTION ITEM BETWEEN DESIGN PARAMETER (X) AND PRODUCT FUNCTION (Y)

|    | X1–X2 | X1–X3 | X1–X4 | X2–X3 | X3–X4 | X3–X5 | X3–X6 | X3–X8 | X5–X6 | X5–X7 | X5–X8 | X5–X9 | X5–X10 | X6–X7 | X6–X8 | X8–X9 | X8–X10 | X9–X10 |
|----|-------|-------|-------|-------|-------|-------|-------|-------|-------|-------|-------|-------|--------|-------|-------|-------|--------|--------|
| Y1 | B     | E     |       | E     |       |       |       |       |       |       |       |       |        |       |       |       |        |        |
| Y2 |       | E     | B     |       | E     |       |       |       |       |       |       |       |        |       |       |       |        |        |
| Y3 |       |       |       |       |       | A     | E     | A     | E     |       | A     |       |        |       | E     |       |        |        |
| Y4 |       |       |       |       |       |       |       |       |       | E     | E     |       |        |       | C     |       |        |        |
| Y5 |       |       |       |       |       |       |       |       |       |       | A     | E     | E      |       |       | E     | E      | D      |

A : CALCULATED FROM EVALUATION EXPERIMENT BETWEEN INTERFACES
B : CALCULATED FROM EVALUATION EXPERIMENT OF DESIGN PARAMETER GROUP 1
C : CALCULATED FROM EVALUATION EXPERIMENT OF DESIGN PARAMETER GROUP 2
D : CALCULATED FROM EVALUATION EXPERIMENT OF DESIGN PARAMETER GROUP 3
E : NOT CALCULATED

DISTRIBUTION OF PRODUCT FUNCTION 1
(ESTIMATION VALUE)

DISTRIBUTION OF PRODUCT FUNCTION 2
(ESTIMATION VALUE)

FIG. 39

| DESIGN PARAMETER ITEM | INITIAL VALUE | APPROPRIATE VALUE | MANUFACTURING VARIATION | DESIGN PARAMETER GROUP | INTERFACE SETTING |
|---|---|---|---|---|---|
| X1 | 150 | 130 | 30 | Gr1 | ABSENCE |
| X2 | 12 | 15 | 2 | Gr1 | ABSENCE |
| X3 | 1 | 1 | 0.3 | Gr1 | PRESENCE |
| X4 | 7 | 5 | 1 | Gr1 | ABSENCE |
| X5 | 20 | 20 | 5 | Gr2 | PRESENCE |
| X6 | 300 | 280 | 10 | Gr2 | ABSENCE |
| X7 | 6 | 6 | 1 | Gr2 | ABSENCE |
| X8 | 20 | 20 | 3 | Gr3 | PRESENCE |
| X9 | 1000 | 1100 | 50 | Gr3 | ABSENCE |
| X10 | 1200 | 1050 | 50 | Gr3 | ABSENCE |

FIG. 40

| PRODUCT FUNCTION ITEM | ESTIMATION VALUE | | TARGET VALUE | | | DETERMI-NATION |
|---|---|---|---|---|---|---|
| | AVERAGE | VARIATION (3σ) | UPPER LIMIT | AIMED VALUE | LOWER LIMIT | |
| Y1 | 105 | 10 | 130 | 100 | 70 | OK |
| Y2 | 52 | 5 | 60 | 50 | 40 | OK |
| Y3 | 1050 | 80 | 1100 | 1000 | 900 | NG |
| Y4 | 710 | 20 | 750 | 700 | 650 | OK |
| Y5 | 520 | 60 | 600 | 500 | 400 | OK |

FIG. 42
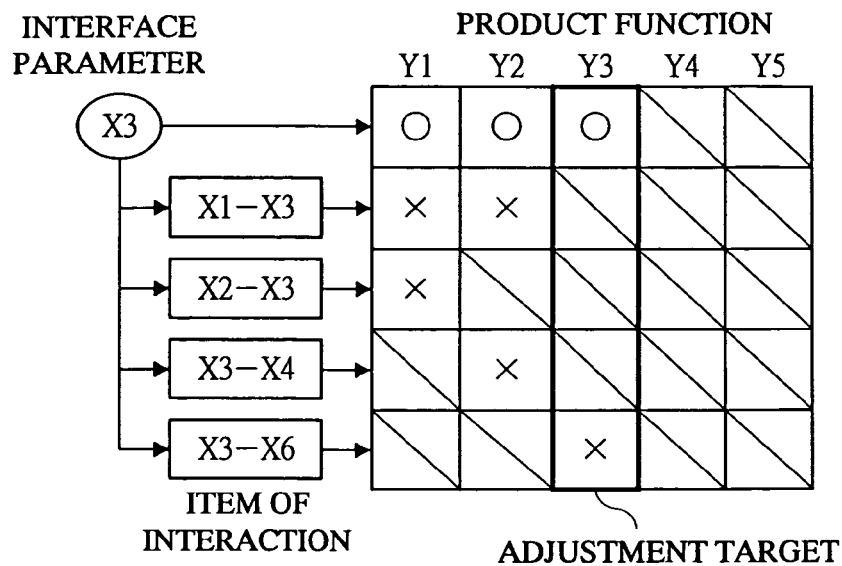
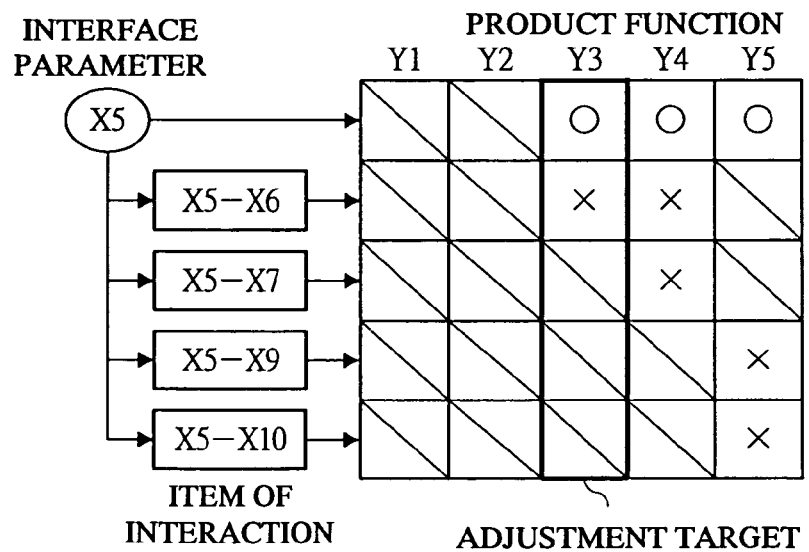
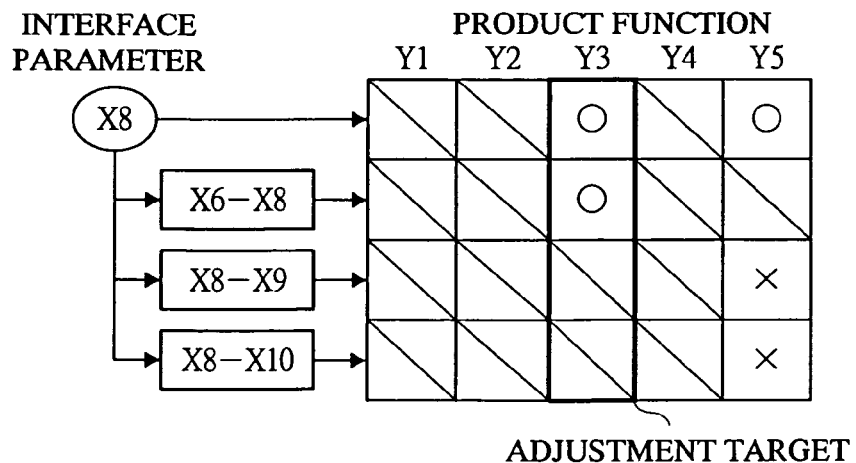

FIG. 43
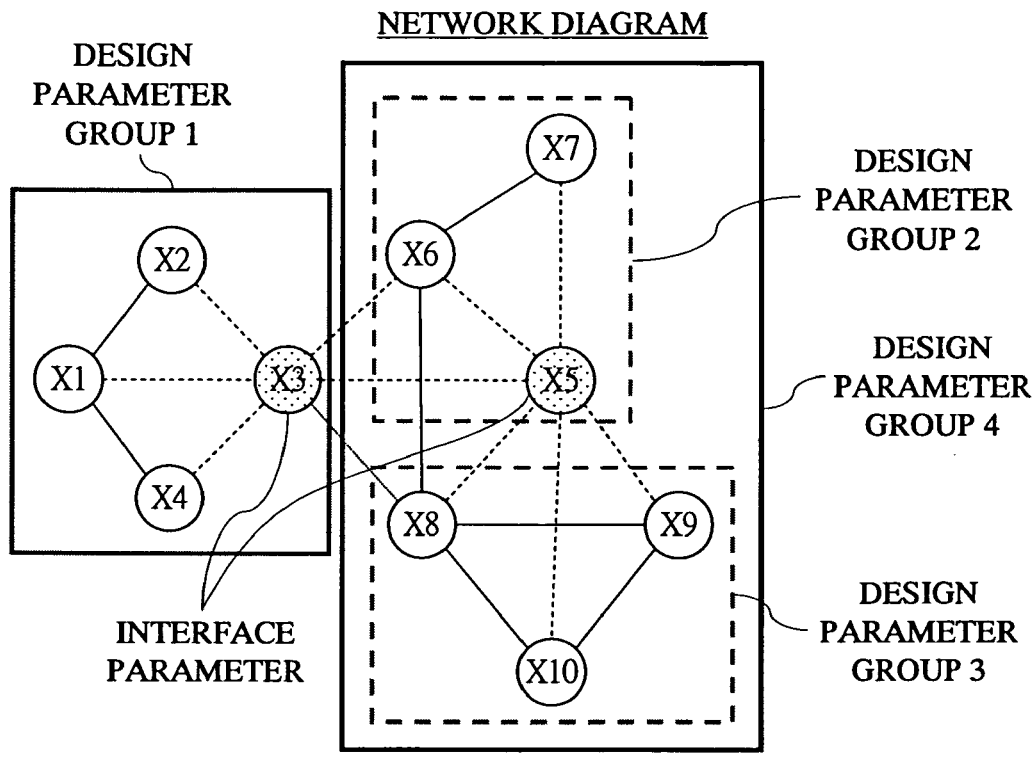
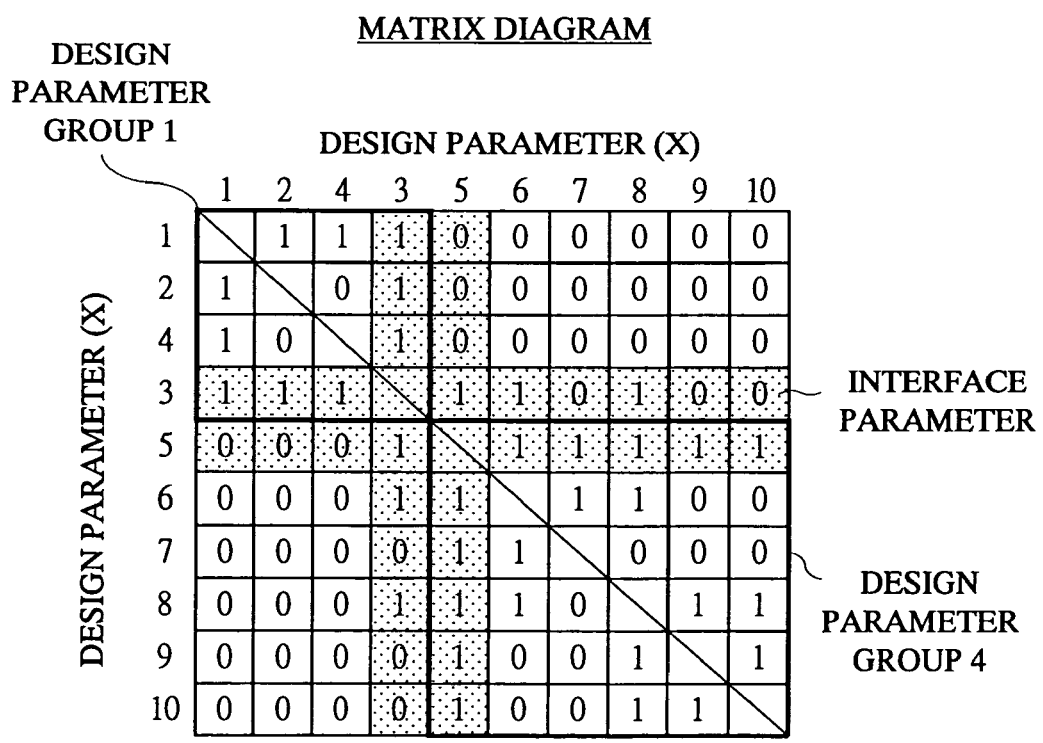

METHOD FOR DETERMINING PARAMETER OF PRODUCT DESIGN AND ITS SUPPORTING SYSTEM

CROSS-REFERENCE TO RELATED APPLICATION

The present application claims priority from Japanese Patent Application No. JP 2005-285964 filed on Sep. 30, 2005, the content of which is hereby incorporated by reference into this application.

TECHNICAL FIELD OF THE INVENTION

The present invention relates to a technology for determining a design parameter of a product and supporting the determination. More particularly, it relates to a technology effectively applied to a method and a system for efficiently determining a design parameter in a design process for determining a design parameter required for manufacturing a hardware product in a hardware product development.

BACKGROUND OF THE INVENTION

In general, development of a hardware product is a work for determining many design specifications and manufacture specifications so as to satisfy a function required in a product. For example, in the case of an assembly product such as a mechanical appliance, shapes and materials of respective parts, manufacturing methods of the parts (manufacturing procedures, manufacturing apparatuses used in respective steps, usage conditions of the manufacturing apparatuses, and the like), assembly methods of the parts, and the like are determined. Also, in the case of a thin film process product typified by a semiconductor LSI, a circuit satisfying a required function, a manufacturing method of a mask represented with pattern information of two-dimensional binary data in order to transfer its electrical circuit information onto a semiconductor device (a producing method of mask data or the like), and a manufacturing method of a thin film process (a manufacturing procedure, manufacturing apparatuses used in respective steps, usage conditions of the manufacturing apparatuses, and the like) are determined.

Evaluating methods, analyzing methods and optimizing methods of the design specifications and supporting methods thereof have been conventionally proposed for efficiently determining many design specifications in a hardware product.

For example, in Taguchi method which is one of methods of experiment design, a table called "orthogonal table" where levels of respective columns appear evenly is used to determine a design parameter to be a control factor and its level range, and experiments based upon the orthogonal table are performed. By this means, a proper value of a design parameter capable of minimizing a variation in product function and satisfying a target specification can be obtained. For example, the Taguchi method is described in detail in "design of experiments" by Shu Yamada, JUSE Press, Ltd. ISBN4-8171-0389-2 (Non-Patent Document 1). In this case, when one control factor of eight control factors is set to two levels and the remaining seven control factors are set to three levels, the total number of combinations becomes $2^1 \times 3^7 = 4374$, which requires many experiments.

On the other hand, in Taguchi method, when an orthogonal table called "L18" is used, it is only necessary to perform eighteen patterns of experiments. Since the number of times of experiments which can be performed actually is limited, it is necessary to extract design parameters which have relatively little interrelationship and influence product functions from all design parameters to allocate them to the orthogonal table. Further, in an experiment, an appropriate value of a design parameter robust to the function variation can be obtained by adding an error factor (for example, environmental condition, change in time, and the like) which is a parameter which influences a function of a product but is practically difficult to control and change.

Japanese Patent Application Laid-Open Publication No. 5-41443 (Patent Document 1) has proposed an analyzing system for a product specification, in which an optimal value of a design parameter (for example, shape and material) of a product is calculated based upon comprehensive judgment from a plurality of evaluation indexes. In this technology, regarding a plurality of evaluation items, analysis is performed while changing a design parameter within a preliminarily inputted predetermined range by using an evaluation program stored in the system. Then, the analysis results of the plurality of evaluation items are converted to a single evaluation index based on a predetermined evaluation function, thereby determining an optimal design parameter value.

Also, Japanese Patent Application Laid-Open Publication No. 7-200662 (Patent Document 2) has proposed an experiment design supporting system, in which product failures in the past product developments are accumulated and analysis and experiment designs are efficiently prepared by using this information in the event of a novel product design. In this system, correspondence relationships between product failures caused in the past product development processes and the causes of the occurrences thereof and between the product failures and design parameters at the time of failure occurrence are accumulated. At the time of the design of a novel product, the past products with the specification similar to the product specification of the new product are extracted, and the cause and process of the occurrence of the product failure are displayed.

Further, Japanese Patent Application Laid-Open Publication No. 2000-148817 (Patent Document 3) has proposed a designing method using a neural network method so as to readily coordinate a plurality of design parameters. In this designing method, a neural network in which a plurality of design parameters are set in an input layer and product functions are set in an output layer is first established. Then, measurement values of product functions obtained when the plurality of design parameters are actually changed are inputted to this network, and the network is caused to learn a mapping relationship between design parameter inputs and product function outputs. Further, an adjustment network in which design parameters for adjustment are set in an input layer and the remaining design parameters are set in an output layer is provided at a former stage of the neural network, and coupling load of the adjustment network is adjusted so as to minimize an objective function of an estimated error between an estimation value of a product function estimated by using the mapping relationship between the design parameter and the product function and an actual measurement result. By this means, an optimum solution of the design parameter is derived.

Also, Japanese Patent Application Laid-Open Publication No. 2002-259464 (Patent Document 4) has proposed a supporting apparatus for a method of experiment design, which comprises: means for selecting a control factor and an error factor to be allocated to an orthogonal table from candidates displayed on a screen; and means for separately displaying selected factors and the other factors in order to efficiently perform the planning of an experiment design using a method of experiment design such as the above-described Taguchi method without fail.

Further, Japanese Patent No. 3313040 (Patent Document 5) has proposed a design supporting system, in which an estimation expression representing a relationship between a characteristic value to be analyzed and a design parameter is prepared through variance analysis using an orthogonal table, and setting of a design parameter and calculation of a reliability evaluation index can be performed through the arithmetic optimizing calculation using this estimation expression.

This system comprises: means for allocating design parameters to an orthogonal table; means for performing an experiment or structure analysis based upon the orthogonal table; means for performing variance analysis of the result; influence degree analyzing means including means for preparing an estimation expression for a characteristic value to be analyzed based upon the variance analysis result; means for performing arithmetic optimizing calculation using the prepared estimation expression; and means for calculating an evaluation index of reliability according to a probabilistic and statistic method after the optimizing calculation.

SUMMARY OF THE INVENTION

Incidentally, in the above-described technology for determining a design parameter of a product and supporting the determination, when large-scale development of a new product is to be performed, there are many kinds of functions required for the product and many target design parameters. When a design parameter is coordinated through experiments and simulation analyses using a computer while focusing attention on one item of a plurality of product functions, such a drawback may occur that the coordination influences other product functions and a target specification cannot be achieved. Also, when adjustment of the design parameter is again performed through experiments or the like so as to satisfy the problematic product function, such a chain reaction occurs in some cases that other product functions deviate from a target though the problematic product function satisfies a target. When there is a strong interaction among product functions as described above, it is necessary to determine design parameters so as to simultaneously satisfy a plurality of product functions.

In a method of experiment design such as Taguchi method, since the number of times of experiments is limited, design parameters that influence product functions and are independent from one another have to be extracted from all design parameters, thereby planning an experiment design. If the design parameters are appropriately extracted, optimal design parameters can be obtained according to the method of experiment design based upon Taguchi method.

However, since an extracting work of design parameters depends on a knowledge and skill of a designer, there is no assurance that the extractions can be correctly performed every time. Similarly, since a work for selecting control factors used in experiments is performed by a designer even in the supporting apparatus for a method of experiment design described in the Patent Document 4 and the design supporting system described in the Patent Document 5, the work depends on a knowledge and skill of a designer.

In the optimizing method of design parameters described in the Patent Document 1, it is possible to consider influences of a plurality of product functions, but analysis is performed while changing design parameters within a preliminarily inputted predetermined range by using an evaluation program stored in the system. When an evaluation program using a computer is not present and experiments must be performed actually, it is impossible to use this system.

Also, in the optimizing method of design parameters using the neural network described in the Patent Document 3, it is necessary to prepare much data for leaning in advance in order to express a mapping relationship between design parameters and product functions by using a coupling load of the network. For example, in an embodiment described in the Patent Document 3, when a network having nine design parameters in an input layer is established for a ship shape design, design parameters of 62 different ship shapes and the measurement results of corresponding product functions are prepared as learning data in advance.

In an actual large-scale development of a new product, the number of design parameters may reach several hundreds or several thousands. At this time, it is practically difficult to prepare the learning data for all parameter combinations in advance. Further, when important design parameters are extracted from many design parameters and then evaluated, such extraction depends on the knowledge and skill of a designer who conducts the extracting work of the design parameters like the above-described Taguchi method.

Further, an interaction among product functions can be preliminarily supposed from the past experience in some cases. Alternatively, the interaction cannot be preliminarily supposed because it is new. It is difficult to estimate the new matters in advance according to systematic method. Since the experiment design supporting system described in the Patent Document 2 has a function to display a cause of occurrence of a product failure in the past product similar to a certain product function of a new product and a correspondence relationship between the product failure and the cause of its occurrence and design parameters, a design parameter which influences a product function can be estimated based upon the past instances.

However, the experiment design supporting system described in Patent Document 2 does not have a function to extract other product functions influenced when a design parameter of a new product is changed. Therefore, as a result of changing a certain design parameter in order to solve the failure instances of the past products similar to a novel function of a new product, such a drawback occurs that a product function which is not problematic until now deviates from a target range.

In order to appropriately coordinate design parameters so as to efficiently satisfy a target product function in a product development stage, it is necessary to model the interrelationship between the design parameters and the product functions, immediately grasp the influence of change of a certain design parameter on another design parameter, extract groups of design parameters which do not influence other design parameters, and perform an experiment for each of the groups of design parameters.

In view of these circumstances, an object of the present invention is to provide a technology for determining a design parameter of a product and its supporting technology which can efficiently determine many design parameters without any retries and are applied to product development where there are many design parameters and product functions to be handled and interactions between design parameters and product functions are present.

The above and other objects and novel characteristics of the present invention will be apparent from the description of this specification and the accompanying drawings.

The typical ones of the inventions disclosed in this application will be briefly described as follows.

The present invention provides a product design parameter determining method and its supporting system which can efficiently determine many design parameters without any retries, even in a product development where there are many target design parameters and product functions to be handled and interactions between design parameters and product functions are present. For its achievement, an interaction between product function and design parameter is structured, design parameter groups which have reduced interaction therebetween are extracted, experiment design based upon the design parameter groups is prepared, modeling of quality influence degree between the product functions and the design parameters from the experiment result is performed, and a coordination process for design parameters and estimation of the product functions with taking into account the manufacturing variation are performed.

Also, the system according to the present invention comprises: a first database unit where historical information about a measurement result of manufacturing variation in past manufacturing process of a product is accumulated; a second database unit where experiment result historical information for storing a set value for each design parameter and a measurement value thereof in an experiment and a measurement result of a product function in the experiment is accumulated; a third database unit where product failure historical information for storing past product failure information therein is accumulated; a fourth database unit where quality influence model information obtained by structuring a quality influence degree between product function and design parameter of a product to be developed is accumulated; a data input unit which inputs information about a product to be developed; a result display unit which displays an operation result; and a data operation unit which includes: a quality influence model structuring processing unit which performs structuring process of a quality influence degree between product function and design parameter; an experiment design preparing unit which prepares an experiment design of a target product by using the structured quality influence degree; and a design parameter coordination processing unit which performs coordination calculation of a design parameter from an evaluation result of an experiment performed based upon the experiment design.

Especially, the data operation unit performs the steps of:
(1) producing information about design parameters and product functions of a product to be developed;
(2) producing initial values of a quality influence model of the product to be developed by using the past product development historical information;
(3) preparing an experiment design by using the quality influence model produced in the step (2) to output the result thereof;
(4) collecting experiment results of the experiment design prepared in the step (3) to update the quality influence model based upon the experiment results;
(5) performing coordination process of design parameters with taking into account a manufacturing variation; and
(6) outputting a design parameter specification calculated in the step (5) and an estimation value of the product function.

By sequentially performing the steps (1) to (6), appropriate specifications can be efficiently determined for many design parameters in product development.

Further, the present invention provides a product design parameter determining method and its supporting system which can efficiently determine many design parameters without any retries, even in a product development where there are many target design parameters and product functions to be handled and interactions between design parameters and product functions are present. For its achievement, interface parameters and design parameter groups independent from one another are produced by structuring quality influence degrees between product function and design parameter and mutual influence degrees among the design parameters, an experiment design is prepared based upon the design parameter groups, modeling of the quality influence degrees between the product functions and the design parameters from the experiment result is performed, a coordination process of the design parameters is performed with taking into account the manufacturing variation, and estimation of the product functions and adjustment of the interface parameters at that time are performed.

Further, the system of the present invention comprises: a first database unit where historical information about a measurement result of manufacturing variation in past manufacturing process of a product is accumulated; a second database unit where experiment result historical information for storing a set value for each design parameter and a measurement value thereof in an experiment and a measurement result of a product function in the experiment is accumulated; a third database unit where product failure historical information for storing past product failure information therein is accumulated; a fourth database unit where quality influence model information including a quality influence model obtained by structuring quality influence degrees between product function and design parameter of a product to be developed and a design parameter structured model obtained by structuring mutual influence degrees among the design parameters is accumulated; a data input unit which inputs information about the product to be developed; a result display unit which displays operation result; and a data operation unit which includes: a quality influence model structuring processing unit for performing a structuring process of quality influence degrees between product function and design parameter to produce interface parameters and design parameter groups independent from one another; an experiment design preparing and analyzing unit which prepares an experiment design of a target product by using the structured quality influence model and analyzes an experiment result to update a quality influence model between product function and design parameter; a design parameter coordination processing unit which performs coordination calculation of a design parameter with taking into account a manufacturing variation so as to satisfy a required product function by using the quality influence model between product function and design parameter; and an interface parameter adjustment processing unit for performing adjustment of the interface parameters based upon the estimation result of the product functions.

Especially, the data operation unit performs the steps of:
(1) producing information about design parameters and product functions of a product to be developed;
(2) producing initial values of a quality influence model between the product functions and the design parameters of the product to be developed by using the past product development historical information;
(3) setting interface parameters among the design parameters and producing design parameter groups independent from one another by structuring the quality influence model produced in the step (2);
(4) preparing an experiment design for each of the interface parameters and the design parameter groups produced in the step (3) to update the quality influence model by using the experiment result of the prepared experiment design;

(5) performing coordination process of the design parameters with taking into account the manufacturing variation and then outputting a design parameter specification and an estimation value of the product function; and (6) performing adjustment of the interface parameters based upon the estimation value of the product function calculated in the step (5) to re-produce design parameter groups.

By sequentially performing the steps (1) to (6), an appropriate design parameter specification can be efficiently determined for many design parameters in product development.

The effects obtained by typical aspects of the present invention will be briefly described below.

According to the present invention, an experiment which can efficiently satisfy required product functions in a short time, takes the mutual influence degrees among design parameters into account from the beginning, and requires reduced number of repetition processes can be realized.

Also, according to the present invention, since a function to estimate a product function with taking into account the manufacturing variation from a relationship of a quality influence degree between product function and design parameter is provided, the design parameters can be determined while taking influence of manufacturing variation generated in a mass production stage into account, and product failure does not occur in the mass production stage, which makes it possible to shorten a product development term.

BRIEF DESCRIPTIONS OF THE DRAWINGS

These and other features, objects and advantages of the present invention will become more apparent from the following description when taken in conjunction with the accompanying drawings wherein;

FIG. 3 is a table showing a display example of design parameter information in a hard disk drive development in the product design parameter determination supporting system according to the embodiment of the present invention;

FIG. 4 is a table showing a display example of product function information in the hard disk drive development in the product design parameter determination supporting system according to the embodiment of the present invention;

FIG. 5 is a table showing a display example of design parameter information in a development of a transistor of a semiconductor LSI in the product design parameter determination supporting system according to the embodiment of the present invention;

FIG. 6 is a table showing a display example of product function information in the development of a transistor of a semiconductor LSI in the product design parameter determination supporting system according to the embodiment of the present invention;

FIG. 12 is a diagram showing a method for performing structuring process of design parameters in the product design parameter determination supporting system according to the embodiment of the present invention;

FIG. 15 is a diagram showing a display example of a small experiment design in the product design parameter determination supporting system according to the embodiment of the present invention;

FIG. 19 is a table showing a display example of a calculation result of a design parameter specification in the product design parameter determination supporting system according to the embodiment of the present invention;

FIG. 20 is a table showing a display example of a calculation result of a product function estimation value in the product design parameter determination supporting system according to the embodiment of the present invention;

FIG. 21 is a diagram showing influence of interaction between two design parameters on a product function in the product design parameter determination supporting system according to the embodiment of the present invention;

FIG. 30A is a diagram showing one example of a method for performing a structuring process of design parameters in the product design parameter determination supporting system according to the embodiment of the present invention;

FIG. 30B is a diagram showing one example of a method for performing a structuring process of design parameters subsequent to FIG. 30A;

FIG. 30C is a diagram showing one example of a method for performing a structuring process of design parameters subsequent to FIG. 30B;

FIG. 30D is a diagram showing one example of a method for performing a structuring process of design parameters subsequent to FIG. 30C;

FIG. 30E is a diagram showing one example of a method for performing a structuring process of design parameters subsequent to FIG. 30D;

FIG. 30F is a diagram showing one example of a method for performing a structuring process of design parameters subsequent to FIG. 30E;

FIG. 30G is a diagram showing one example of a method for performing a structuring process of design parameters subsequent to FIG. 30F;

FIG. 30H is a diagram showing one example of a method for performing a structuring process of design parameters subsequent to FIG. 30G;

FIG. 33 is a table showing an example of a preparation result of an experiment design by using an orthogonal table in the product design parameter determination supporting system according to the embodiment of the present invention;

FIG. 34 is a table showing an example of extraction of a significant parameter through a variance analysis of an experiment result by using an orthogonal table in the product design parameter determination supporting system according to the embodiment of the present invention;

FIG. 35 is a table showing one example of a related status of quality influence degrees between product function and design parameter in the product design parameter determination supporting system according to the embodiment of the present invention;

FIG. 36 is a table showing one example of a calculation state of a quality influence coefficient between product function and design parameter in the product design parameter determination supporting system according to the embodiment of the present invention;

FIG. 39 is a table showing a display example of a calculation result of design parameter specifications in the product design parameter determination supporting system according to the embodiment of the present invention;

FIG. 40 is a table showing a display example of a calculation result of product function estimation values in the product design parameter determination supporting system according to the embodiment of the present invention;

FIG. 42 is a diagram showing one example of influence of the design parameter to be the interface parameter on a product function in the product design parameter determination supporting system according to the embodiment of the present invention; and FIG. 43 is a diagram showing one example of a design parameter structured model after interface parameter adjustment in the product design parameter determination supporting system according to the embodiment of the present invention.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

<Product Design Parameter Determination Supporting System According to an Embodiment of the Present Invention>

Figure 1:
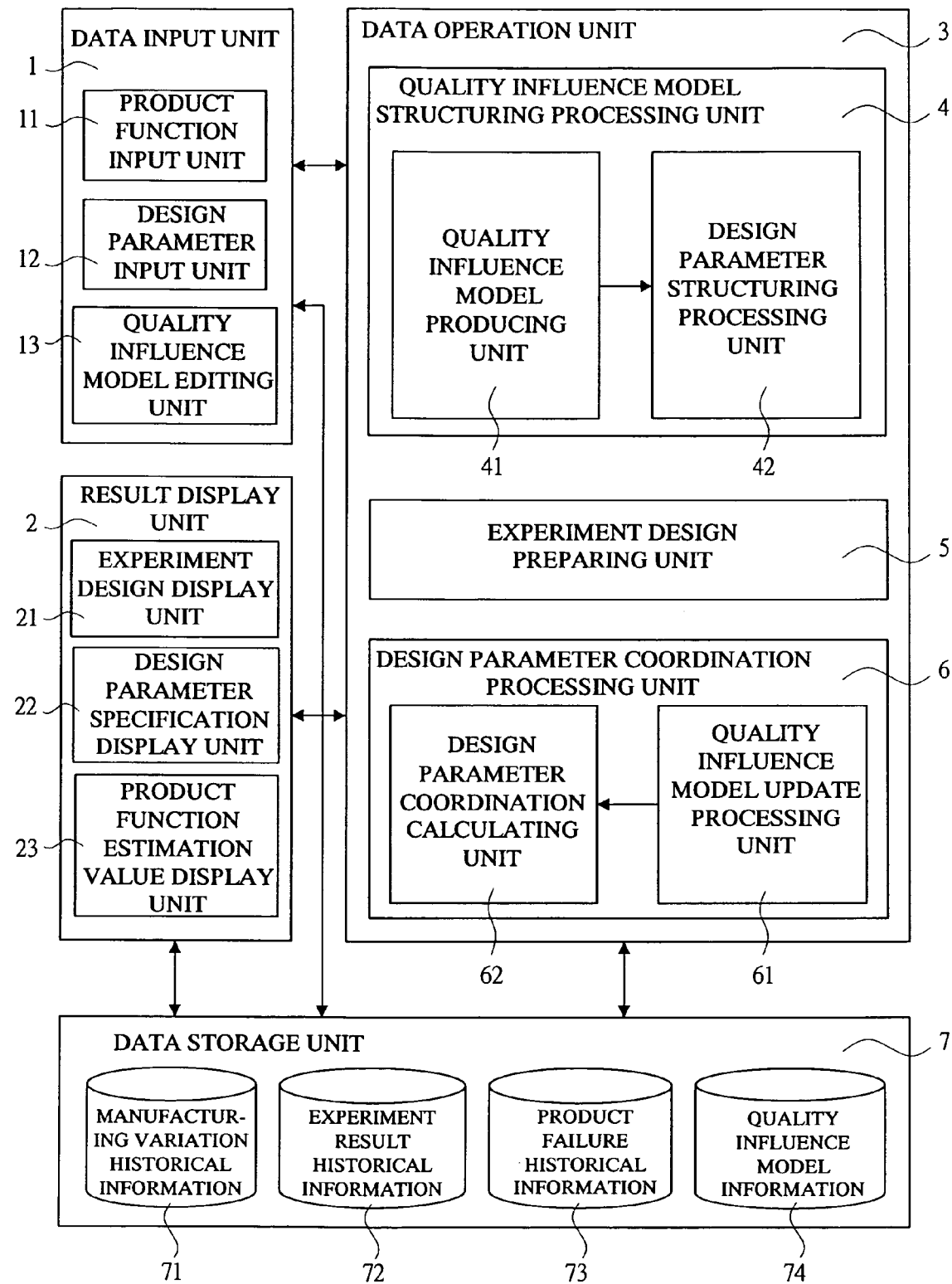
FIG. 1 is a system block diagram showing an entire configuration of a product design parameter determination supporting system according to an embodiment of the present invention.

FIG. 1 is a system block diagram showing an entire configuration of a product design parameter determination supporting system according to an embodiment of the present invention.

The product design parameter determination supporting system according to this embodiment comprises: a data input unit 1 for inputting information about a product to be developed; a result display unit 2 for displaying an operation result; a data operation unit 3 including a quality influence model structuring processing unit 4 for performing a structuring process of a quality influence degree between product function and design parameter, an experiment design preparing unit 5 for preparing an experiment design of a target product by using a structured quality influence degree, and a design parameter coordination processing unit 6 for performing coordination calculation of design parameters from an evaluation result of experiment performed based upon the experiment design; and a data storage unit 7 including a plurality of database units for storing information required for the operation.

The data input unit 1 includes a product function input unit 11 for inputting product function information of a product to be developed, a design parameter input unit 12 for inputting design parameter information of the product, and a quality influence model editing unit 13 for performing an editing work of a quality influence model between product function and design parameter of the product and a design parameter structured model obtained by structuring a mutual influence degree among design parameters.

Data inputted from the product function input unit 11 and the design parameter input unit 12 is sent to the quality influence model structuring processing unit 4 in the data operation unit 3, in which a predetermined process is performed, and then registered in quality influence model information 74 in the data storage unit 7. Also, the quality influence model editing unit 13 selects a product to be edited, and it displays product function information of a target product, design parameter information, and quality influence model information and design parameter structured model information which have been registered in the quality influence model information 74. Then, after editing the displayed information, the quality influence model editing unit 13 registers the edited data in the quality influence model information 74.

The result display unit 2 includes an experiment design display unit 21 for displaying an experiment design of a product to be developed, a design parameter specification display unit 22 for displaying a specification of design parameters of the product to be developed, and a product function estimation value display unit 23 for displaying an estimation value of product functions in the design parameter specification displayed on the design parameter specification display unit 22. In the experiment design display unit 21, information required for selection of the target product and preparation of the experiment design is inputted and an experiment design prepared in the experiment design preparing unit 5 in the data operation unit 3 is displayed. The design parameter specification display unit 22 and the product function estimation value display unit 23 display a design parameter specification and estimation values of product functions calculated in the design parameter coordination processing unit 6 in the data operation unit 3, respectively.

The quality influence model structuring processing unit 4 is configured of a quality influence model producing unit 41 for producing an initial model expressing a relationship of quality influence degree between product function and design parameter of a target product by using experiment result historical information 72 or product failure historical information 73 in the data storage unit 7 and a design parameter structuring processing unit 42 for performing structuring process of an interrelationship among design parameters by using the quality influence model produced in the quality influence model producing unit 41 and preparing a design parameter group where the interrelationship among design parameters becomes the minimum. Regarding product functions and design parameters of a product inputted through the product function input unit 11 and the design parameter input unit 12 in the data input unit 1, the quality influence model producing unit 41 extracts information about product functions and design parameters of the past similar products from the experiment result historical information 72 or the product failure historical information 73 to prepare an initial value of a quality influence model. The quality influence model produced in the quality influence model producing unit 41 and the design parameter structured model produced in the design parameter structuring processing unit 42 are registered in the quality influence model information 74 in the data storage unit 7.

Regarding a product selected in the experiment design display unit 21 in the result display unit 2, the experiment design preparing unit 5 acquires a quality influence model between product function and design parameter and a quality influence model formed of the design parameter structured model from the quality influence model information 74 in the data storage unit 7 and prepares a design parameter group to be evaluated in the same experiment to output the group to the experiment design display unit 21.

The design parameter coordination processing unit 6 is configured of a quality influence model update processing unit 61 which acquires experiment result information, which has been performed based upon an experiment design prepared in the experiment design preparing unit 5 in the data operation unit 3, from the experiment result historical information 72 in the data storage unit 7 to produce a further detailed quality influence model and a design parameter coordination calculating unit 62 which performs calculation of an appropriate value of a design parameter satisfying a target product function by using the quality influence model prepared in the quality influence model update processing unit 61 and estimation of the product function at this time.

The data storage unit 7 is connected to the date input unit 1, the result display unit 2, and the data operation unit 3, and it performs delivery of accumulated data and registration of new data in response to a request from each unit. The data storage unit 7 has stored therein manufacturing variation historical information 71 for storing history of the measurement results of manufacturing variation in the past manufacturing process of a product, experiment result historical information 72 for storing a set value and a measurement value for each design parameter in an experiment and the measurement result of a product function at this time, a product failure historical information 73 in which the past product failure information is accumulated, and the quality influence model information 74 obtained by structuring a quality influence degree between product function and design parameter of a product to be developed.

For example, the manufacturing variation historical information 71 includes a product name (or code), a process step name (or code), ID of a part to be processed (corresponding to a member ID in the case of a process product), processed date and hour, a manufacturing apparatus used for process, measurement items of product quality after process (for example, size and the like), a measurement result thereof, and the like. Also, the experiment result historical information 72 includes a product name (or code), a part name (or code or step name in the case of a process product), design parameter item and its set value and measurement value, product function item, measurement result of a product function at a set design parameter value, and the like. The product failure historical information 73 includes a product name (or code), a part name (or code or step name in the case of a process product), failed product function item, information related to a design parameter item causing the failure, and the like.

The quality influence model information 74 includes a product name (or code), a target value for each product function item (aimed value, upper limit value, lower limit value), a characteristic value for each design parameter (upper critical value, a lower critical value, manufacturing variation), the number of experiment levels and the minimum change amount for each design parameter, quality influence model information obtained by structuring a relationship of a quality influence degree between function items and design parameters of a product to be developed, design parameter structured model information obtained by structuring interrelationship among design parameters, and the like.

Figure 2:
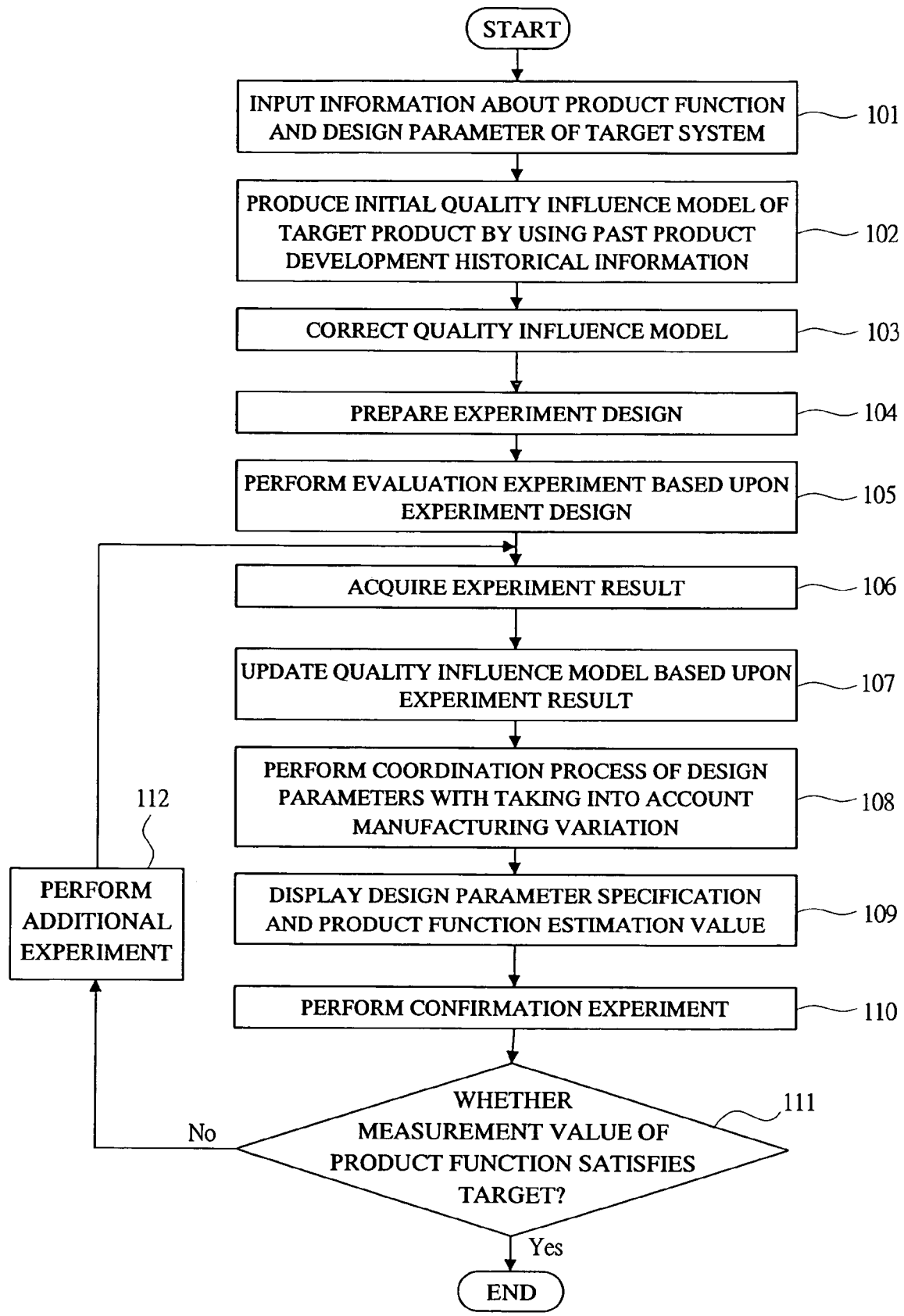
FIG. 2 is a flowchart showing a method for determining design parameter in the product design parameter determination supporting system according to the embodiment of the present invention.

FIG. 2 is a flowchart showing a method for determining a design parameter in the product design parameter determination supporting system according to this embodiment.

First, in step 101, product function information and design parameter information about a product to be developed are inputted. Here, the product functions are indexes of functions which are required for the product and can be directly measured. Also, the design parameters are parameters which must be determined so as to satisfy a product function required for the product. Therefore, the design parameters include both of a structure design parameter regarding a product structure and a process design parameter regarding a manufacturing method.

The design parameter information includes a name (or code) of a design parameter, physical upper and lower critical values, manufacturing variation, the number of experiment levels, the minimum change amount of the design parameter, and the like. The design parameter information about the product structure can be obtained from BOM (Bill of Material). The design parameter information about the manufacturing process can be obtained from BOP (Bill of Process). Also, manufacturing variation record of design parameters in the past similar products stored in the data storage unit is assigned as an initial value of the manufacturing variation.

Note that some design parameters do not include manufacturing variation information. The product function information includes a name (or code) of a product function and a target value (aimed value, an upper limit value, a lower limit value). For example, product functions such as power consumption are more preferable when they become smaller. Therefore, the target value of the product function becomes equal to or less than an upper limit value. Thus, the target value of the product function can include only a lower limit value or only an upper limit value depending on a function item.

Next, in step 102, a quality influence model configured of an initial value of a quality influence model expressing influence degree of quality between product function and design parameter of a product to be developed obtained by using the past product development historical information accumulated in the data storage unit and a design parameter structured model obtained by structuring interrelationship among design parameters is produced. The initial value of the quality influence model can be prepared by utilizing statistical processes using experiment result historical information about the past similar products. Note that the similar product mentioned here indicates, for example, a product of the previous generation, derivative products having the same platform, and the like.

The experiment result historical information includes a set value of a design parameter at the time of experiment, a measurement result of a product function at this time, and the like. Also, the quality influence model can be produced based on a relationship between a failed product function in the past and a design parameter by using failure historical information about the past similar products. The product failure historical information includes related information between the failed product function and an item of the design parameter which has caused the failure.

On the other hand, the initial value of the design parameter structured model can be automatically prepared through the operation process using quality influence model produced previously. Further, the initial value can be automatically prepared from shape information between design parameters resulting from a product structure. For example, regarding a design parameter for the shapes of connecting portions of two parts, when the shape of the connecting portion of one of the parts is changed, the shape of the connecting portion of the other part must be changed. Information regarding such a design structure can be obtained also from design drawing information. A specific preparing method will be described later with reference to FIG. 7.

In step 103, correction of the quality influence model produced in the step 102 is performed. In this step, the correction is performed for a quality influence model between design parameters and product functions and a structured model of mutual influence degree among design parameters which cannot be judged from the past instances based upon only knowledge of a designer.

Next, in step 104, an experiment design of a product to be developed is prepared by using the quality influence model produced in the step 103. A specific preparing method of an experiment design will be described later with reference to FIG. 12.

Next, in step 105, experiments are performed based upon the experiment design prepared in the step 104. Then, an experiment result including set value of design parameters and measurement values of product functions corresponding thereto in respective experiments is accumulated in the experiment result historical information in the data storage unit.

In step 106, the experiment result information including the set values of the design parameters and the measurement values of the product functions corresponding thereto in the respective experiments conducted in the step 105 is acquired from the data storage unit.

Then, in step 107, the quality influence model prepared in the step 103 is updated by using the experiment result information of the experiments obtained in the step 106. A causal correlation between the set value of the design parameter and the measurement value of the product function is examined so that the magnitude of a quality influence degree between the design parameter and the product function in the quality influence model is corrected. Also, the design parameter structured model relating to the corrected design parameter and product function is automatically corrected.

Next, in step 108, coordination process of a design parameter taking the manufacturing variation into account is performed by using the quality influence model updated in the step 107. A specific method for the coordination process will be described later with reference to FIG. 16.

In step 109, design parameter specification information and estimation value information of product functions in the design parameter specification are displayed from the result of the coordination process of the design parameters performed in the step 108. The design parameter specification information includes an appropriate value of each design parameter, a tolerance, a manufacturing variation record, other design parameter items having interrelationship, and the like. A design parameter where a tolerance required from a manufacturing variation record is small is displayed in an emphasized manner.

The estimation value information of a product function includes an average value and its variation (for example, a standard deviation value) of product functions in the design parameter specification calculated in the step 108, a target value of the product function, a determination result about whether or not a target is satisfied, and the like. When a product function which does not satisfy a target is present, adjustment of the evaluation function of the product function used in the step 108 and review of the target value are conducted, and the step 108 and the step 109 are repeated until the target is satisfied.

Next, in step 110, a confirmation experiment using the design parameter specification calculated in the step 108 is performed and a product function at this time is measured.

In step 111, it is determined whether or not the measurement value of the product function in the confirmation experiment performed in the step 110 satisfies the target. When all the product functions satisfy the targets, a series of processes are terminated.

When a product function which does not satisfy the target is present, an additional experiment about the product function is performed in step 112. In this case, regarding the design parameter where a quality influence degree about the product function which does not satisfy the target has not been obtained yet, an additional experiment for performing correction of the quality influence model and preparation of an additional experiment design is performed by using the quality influence model prepared in the step 107. A design for the additional experiment is prepared by using the same method as that performed in the step 104, and evaluation of the product function to be evaluated at this time and evaluation of a product function having an interrelationship with the product function to be evaluated at this time are simultaneously performed. After the additional experiment has been performed, the step 107 and the steps subsequent thereto are repeated.

Figure 22:
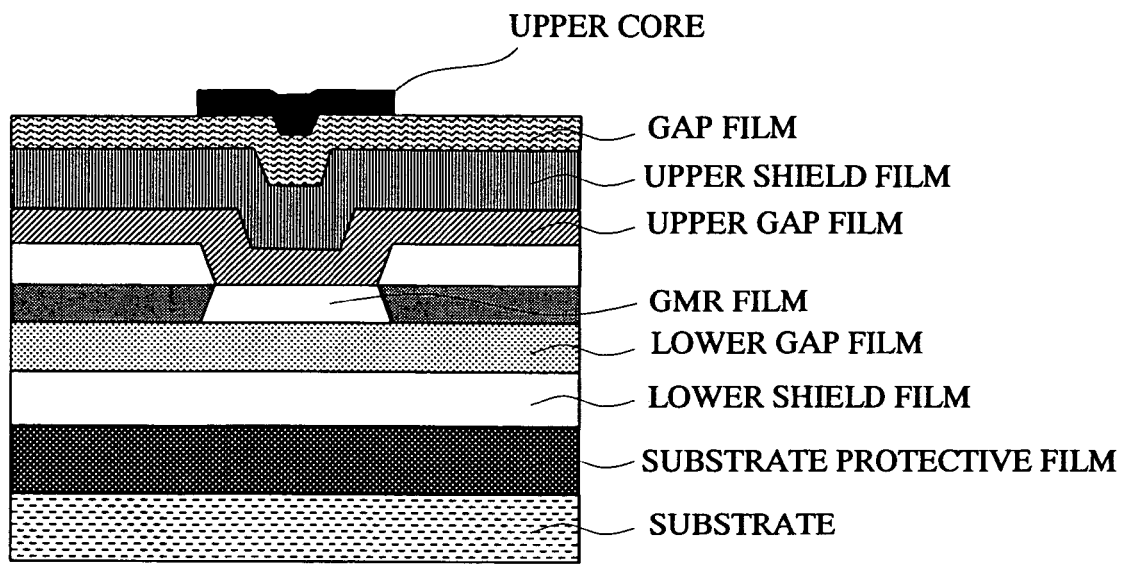
FIG. 22 is a sectional view showing a sectional structure of a header slider portion of a hard disk drive in the product design parameter determination supporting system according to the embodiment of the present invention.

FIG. 22 is a diagram schematically showing a sectional structure of a header slider portion of a hard disk drive.

A header slider portion of the hard disk drive includes a substrate protective film, a lower shield film, a lower gap film, a GMR film, an upper gap film, an upper shield film, a light gap film, and an upper core portion formed on a substrate in this order so that respective films have predetermined thicknesses. Not only a thickness of the GMR film but also a size thereof in a width direction are controlled.

FIG. 3 shows a display example of design parameter information in the development of a hard disk drive as an example of assembly product of machine parts.

The hard disk drive is roughly disassembled into several constituent elements. For example, the constituent elements include a disk on which data is recorded and a header assembly which performs reproducing and erasing of data recorded on the disk and recording of data on the disk. Also, one constituent element may be constituted of a plurality of parts. For example, the header assembly portion of the hard disk drive described above is constituted of a header slider, a spacer, and other parts. Further, since a header portion of the header slider is manufactured through a thin film process, the header slider portion is disassembled to parts such as a lower shield film, a lower gap film, a GMR film, and the like.

The design parameters which must be set for each of parts disassembled as described above are inputted. In the header slider, for example, the design parameters include a film thickness of the lower shield film, a film thickness of the lower gap film, an Mn composition ratio, an Fe composition ratio, and a Co composition ratio of a magnetic film material in the GMR film, a film thickness of the GMR film, a head portion size, and the like. Besides, the design parameters further include a gap size between spacer parts of the header assembly, flatness, thickness of a substrate glass of the disk, and the like.

The design parameters do not include the parameters which cannot be changed in view of a cost, a time, a physical constraint, or the like in the evaluation. For example, regarding the lower shield film of the header slider described above, material for the film itself can be changed, but the material of the lower shield film is not included in the design parameter because it is not changed in this case.

FIG. 4 is a diagram showing a display example of product function information corresponding to the instance of the development of the hard disk drive shown in FIG. 3.

The product functions required for a hard disk drive include a disk transfer rate showing a writing rate of data on a disk, an interface transfer rate showing a transfer rate with a host mounted with the hard disk drive, a seek time for retrieving data stored in the disk, a remnant magnetization of the disk, an inductance of the GMR head, and the like. Since faster disk transfer rate and interface transfer rate are more preferable indexes, a targeted upper limit thereof is not present but only a targeted lower limit value is set. Similarly, since shorter seek time is more preferable, a targeted lower limit value thereof is not present but only a targeted upper limit value is set. Since the remnant magnetization of the disk and the inductance of the GMR head influence an operation timing and an excessively large value or an excessively small value thereof causes troubles, a target value range and upper and lower limit values thereof are set.

Figure 23:
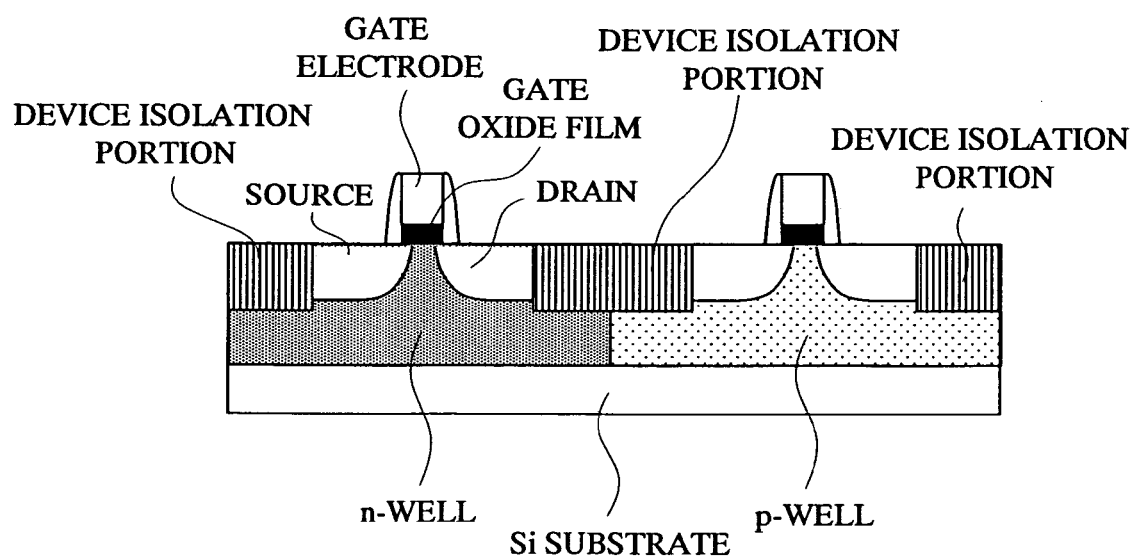
FIG. 23 is a sectional view showing a sectional structure of a transistor portion of a semiconductor LSI in the product design parameter determination supporting system according to the embodiment of the present invention.

FIG. 23 is a diagram schematically showing a sectional structure of a transistor of a semiconductor LSI. In the transistor of a semiconductor LSI, non-conductive device isolation portions are formed by embedding an insulating film in an Si substrate, and an n-well portion and a p-well portion are formed by implanting ion species corresponding to the characteristics of the transistor in a device portion in the Si substrate. A source portion and a drain portion are formed in an upper portion of each well portion of the Si substrate through ion-implantation and diffusion. Also, a gate electrode composed of an insulating film and a conductive film is formed on the Si substrate.

FIG. 5 is a diagram showing a display example of design parameter information in a development of the transistor of the semiconductor LSI as an example of a process product.

For example, many processes such as a device isolation process for making transistors electrically non-conductive to one another, an ion-implantation process and a diffusion process for controlling an impurity concentration in the Si substrate, and a process for forming a gate to be a switch portion of an actual transistor are required in order to form transistors on the Si substrate.

In this case, for example, a length, a width, and a depth of device isolation, an embedding amount of a trench, a cutting amount of the trench, and the like are the design parameters in the device isolation process. An ion implantation amount for each position is the design parameter in the ion-implantation process, and a temperature and a time are design parameters in the diffusion process. Regarding a design parameter which is difficult to be directly measured such as an ion-implantation amount, manufacturing variation information may not be present. In addition, it is unnecessary to input the manufacturing variation for a parameter such as a diffusion time because of its high controllability and small variation.

Also, a film thickness of the gate oxide film, a gate size, a gate film thickness, necessity of a cleaning process performed as a post-process, and the like are design parameters in the gate formation process. The design parameter regarding necessity of a cleaning process is expressed as "0" when it is necessary and as "1" when it is not necessary. A design parameter which cannot be directly digitized is expressed with numerical values allocated to such a combination as described above.

FIG. 6 is a diagram showing a display example of the product function information of a transistor of a semiconductor LSI shown in FIG. 5.

Functions required in a transistor are, for example, a threshold voltage for controlling ON/OFF of a transistor, a leakage current from the transistor, a standby current flowing between a source and a drain at a standby time, a sheet resistance, a power consumption, and the like. Since the smaller leakage current, smaller standby current, and smaller power consumption are more preferable indexes, a target lower limit thereof is not present but only a target upper limit value is set. Also, since the sheet resistance and the threshold voltage influence an operation characteristic at the designing of an electric circuit and an excessively large value and an excessively small value thereof cause troubles, a targeted value and upper and lower limits thereof are set.

Figure 7:
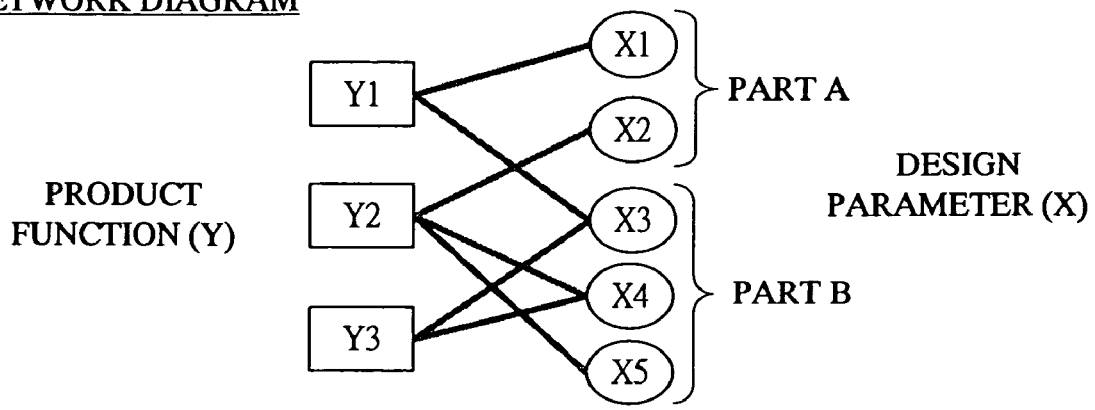
FIG. 7 is a diagram showing initial values of a quality influence model representing quality influence degrees between design parameters and product functions in the product design parameter determination supporting system according to the embodiment of the present invention.

FIG. 7 is a diagram showing one example of an initial value of a quality influence model expressing a quality influence degree between design parameters and product functions.

In this example, the target design parameters are five items of X1 to X5, and the target product functions are three items of Y1 to Y3. The design parameters X1 and X2 are parameters regarding a part A, while the remaining design parameters X3, X4, and X5 are parameters regarding a part B. In this example, relationships in quality (this is referred to as "quality influence degree") are observed between the product function Y1 and the design parameters X1 and X3, between the product function Y2 and the design parameters X2, X4, and X5, and between the product function Y3 and the design parameters X3 and X4.

In other words, when the value of the design parameter X1 or X3 is changed (or when it changes unintentionally), the value of the product function Y1 also changes. As a method for expressing the quality influence degree, there are a network diagram where a product function and a design parameter in which quality influence is observed are connected by a line and a matrix diagram where, in a matrix between product functions and design parameters, "1" is assigned to a combination of a product function and a design parameter where quality influence is present and "0" is assigned in a combination thereof where quality influence is not present. Since relationships in quality influence degree are equivalent to each other in both the expressing methods, either one of the methods may be used.

Figure 8:
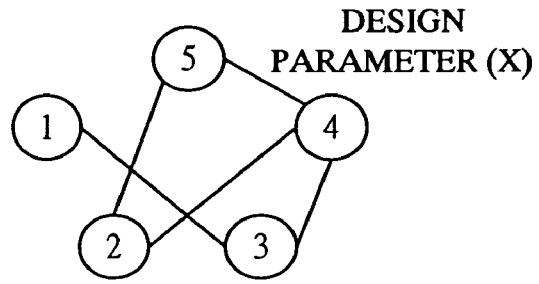
FIG. 8 is a diagram showing a design parameter structured model by structuring interrelationship among design parameters in the product design parameter determination supporting system according to the embodiment of the present invention.

FIG. 8 is a diagram showing one example of a design parameter structured model obtained by structuring interrelationship among design parameters.

In this example, target design parameters are five items of X1 to X5. Interrelationships are observed between the design parameters X1 and X3, between X2 and X4, between X2 and X5, between X3 and X4, and between X4 and X5. In other words, when the design parameter X1 is changed, the design parameter X3 must be simultaneously changed with taking the design parameter X1 into account. Also, when the design parameter X3 is changed, the design parameter X4 must be changed with taking the design parameter X3 into account.

As methods for expressing the interrelationship, there are a network diagram where design parameters having an interrelationship therebetween are connected with a line to express the interrelationship of the design parameters and a matrix diagram where, in a matrix between design parameters, "1" is assigned to a combination of design parameters having an interrelationship and "0" is assigned to a combination of design parameters having no interrelationship. Since the interrelationships between design parameters are equivalent to each other in both the expressing methods, either one of the methods may be used.

Figure 9:
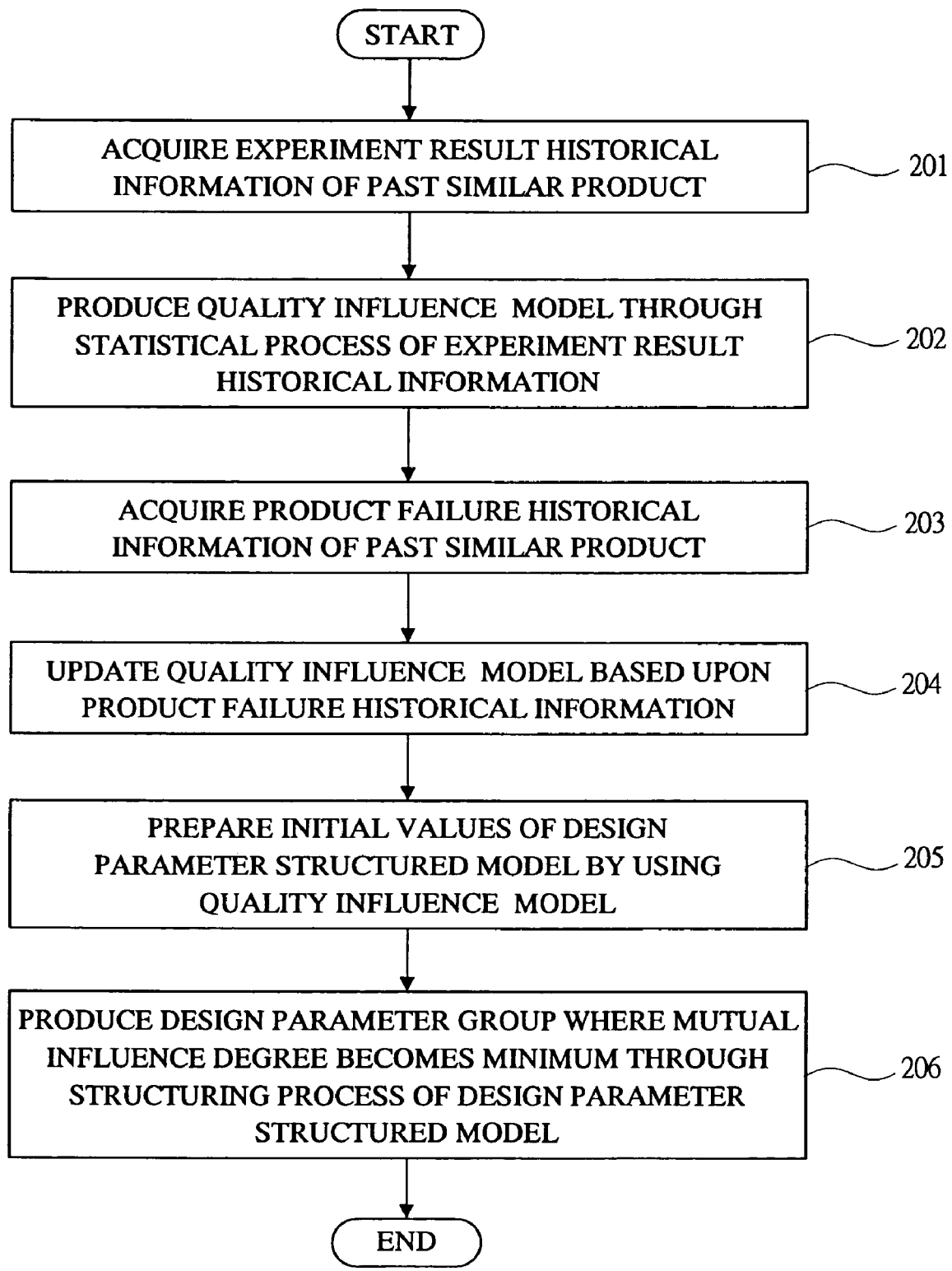
FIG. 9 is a flowchart showing a method for producing a quality influence model by using product development historical information in the product design parameter determination supporting system according to the embodiment of the present invention.

FIG. 9 is a flowchart showing a method for producing a quality influence model by using the product development historical information in step 102 shown in FIG. 2.

In step 201, first, experiment result historical information of a product similar to a product to be developed is acquired from the experiment result historical information accumulated in the data storage unit. As described above, the similar product is, for example, a product of the previous generation, derivative products having the same platform, and the like. Also, the experiment result historical information includes a set value of a design parameter and a measurement value at the time of an experiment and a measurement result of a product function at that time.

Next, in step 202, the past experiment result historical information acquired in the step 201 is statistically processed so that a quality influence model expressing a relationship in quality influence degree between product function and design parameter is produced.

Figure 10:
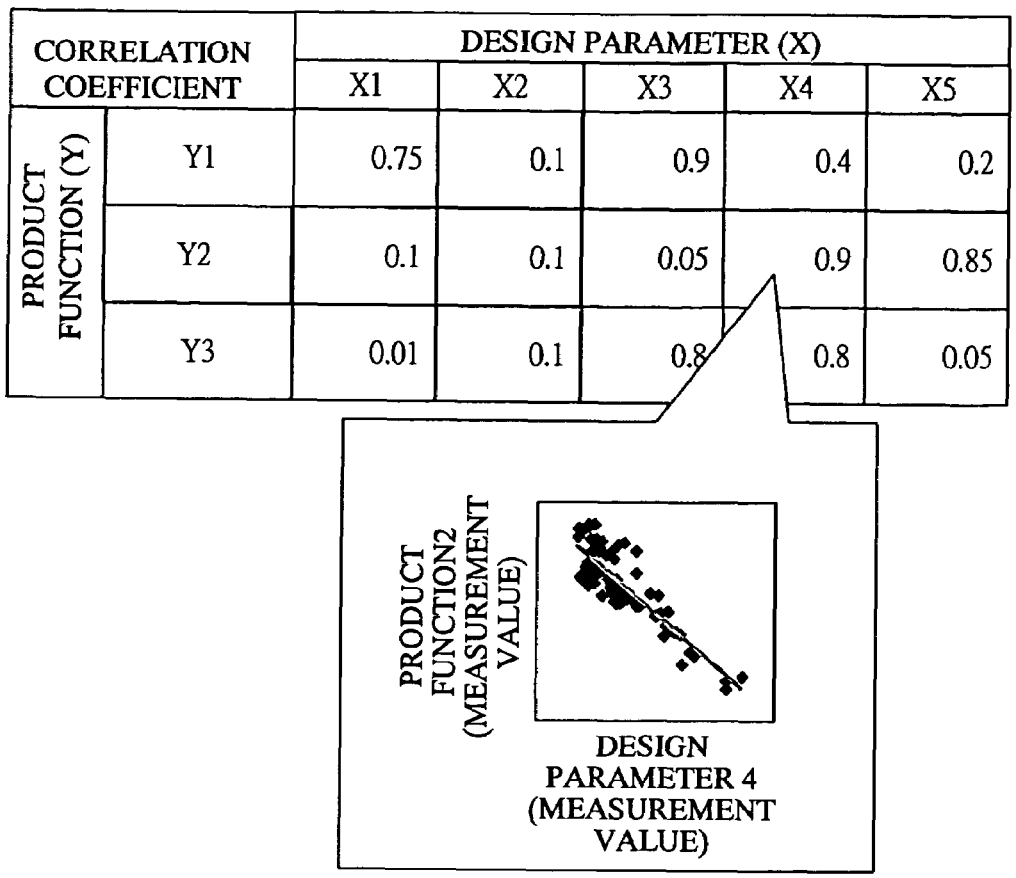
FIG. 10 is a table showing a method for producing a quality influence model by using the past experiment result information in the product design parameter determination supporting system according to the embodiment of the present invention.

FIG. 10 is a diagram showing one example of a method for producing a quality influence model through the statistical process of the experiment result historical information. In FIG. 10, target design parameters are five items of X1 to X5 and target product functions are three items of Y1 to Y3. Regarding respective combinations of measurement values of the design parameters of five items and measurement values of the product functions of three items in the past experiment result history information, correlation analysis is performed so that correlation coefficients of the respective combinations are calculated. The correlation coefficient is an index indicating strength of correlation between two data items, and it takes a value in a range of −1 to 1. Also, correlation becomes high when an absolute value of the correlation coefficient is closer to 1 and correlation becomes low when it is closer to 0.

In FIG. 10, absolute values of a total of fifteen correlation coefficients obtained from the combinations of design parameters of 5 items and product functions of 3 items are shown. For example, correlation between the design parameter X4 and the product function Y2 is high as shown in a scatter diagram, and the absolute value of the correlation coefficient is also high such as 0.9. Here, when it is assumed that the combination with an absolute value of the correlation coefficient indicating 0.7 or more is defined as that having a relationship in quality between product function and design parameter, it is expressed by the quality influence model that the influence degrees are present in the combinations between the product function Y1 and the design parameters X1 and X3, between the product function Y2 and the design parameters X2, X4, and X5, and between the product function Y3 and the design parameters X3 and X4.

In this case, a quality influence model indicating a quality influence degree between product function and design parameter can be produced by assigning "1" to a combination of a product function and a design parameter which influence each other and assigning "0" to a combination thereof which do not influence each other. A quality influence model in this case becomes similar to that shown in FIG. 7. Note that, in some cases, a measurement value of a design parameter is not present but only a set value thereof is present. In such a case, statistical process is performed by using a set value of a design parameter instead of a measurement value thereof.

In step 203, the past product failure historical information of a product similar to a product to be developed is acquired from the product failure historical information accumulated in the data storage unit. The product failure historical information includes relating information between a failed product function and an item of a design parameter causing the failure and the like.

Figure 11:
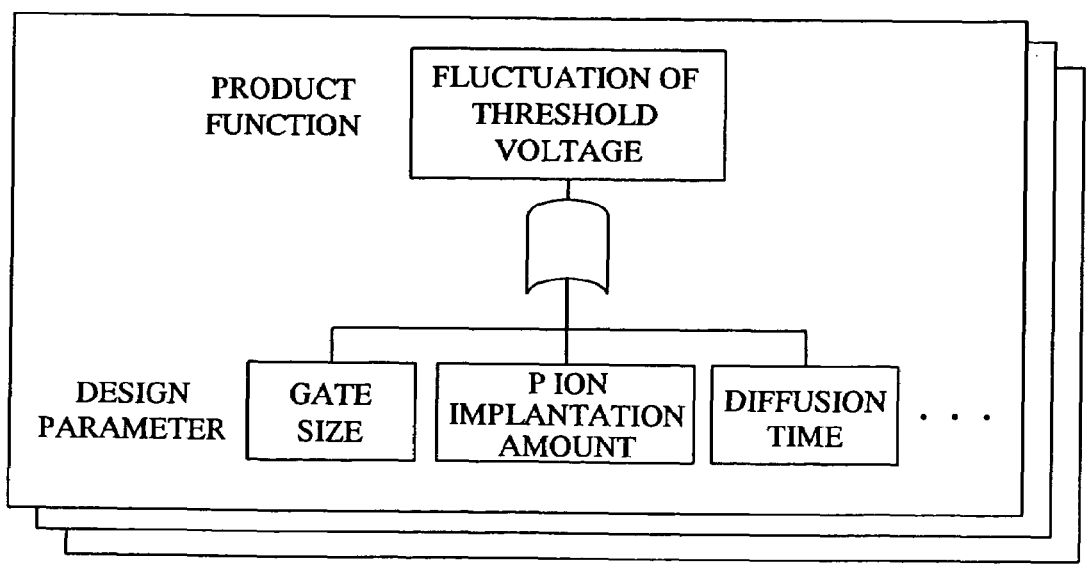
FIG. 11 is a diagram showing a method for producing a quality influence model by using product failure historical information in the product design parameter determination supporting system according to the embodiment of the present invention.

Next, in step 204, the quality influence model is updated by using the product failure historical information acquired in the step 203. FIG. 11 is a diagram showing one example of a method for producing a quality influence model by using the product failure historical information. FIG. 11 shows an instance of the past product failure with a tree diagram of design parameters with respect to a product function. In this example, change of a gate size, change of a P-ion implantation amount, change of a diffusion time, and the like are provided as causes of the fluctuation of a threshold voltage of a transistor in a semiconductor LSI. In this case, it is determined that the quality influence is present between the product function which is the threshold voltage of a product to be developed and the design parameters which are the change of a gate size, the change of a P-ion implantation, and the change of a diffusion time, and "1" indicating the presence of influence is assigned to corresponding portions in the quality influence model. In this manner, similar process is applied to the other failure instances to establish a quality influence model.

Next, in step 205, interrelationship among design parameters is calculated by using the quality influence model produced in the step 204 to prepare an initial value of a design parameter structured model. So, a method for preparing an initial value of a design parameter structured model by using a quality influence model will be described with reference to FIG. 7 and FIG. 8. In this example, the target design parameters are five items of X1 to X5 and the target product functions are three items of Y1 to Y3 as described above.

In the quality influence model shown in FIG. 7, first, product functions influenced by design parameters are extracted. For example, in the case of the design parameter X1, the product function Y1 is extracted. Next, other design parameter which influences the extracted product function is extracted. In this case, since the first design parameter and the extracted design parameter have some relationship via a certain product function, interrelation occurs in the corresponding combination in the design parameter structured model.

In the case of the product function Y1 described above, since the design parameter X3 is a parameter influencing the product function Y1 besides the design parameter X1, interrelationship occurs between the design parameters X1 and X3. Similarly, in the case of the design parameter X2, the product function Y2 is first extracted. Then, since the design parameters X4 and X5 are extracted based upon the product function Y2, interrelationship between the design parameters X2 and X4 and between the design parameters X2 and X5 are derived. In the case of the design parameter X3, the product functions Y1 and Y3 are extracted, and the design parameter X1 is extracted based upon the product function Y1 and the design parameter X4 is extracted based upon the product function Y3. In the case of the design parameter X4, the product functions Y2 and Y3 are first extracted, and the design parameters X2, X5, and X3 are extracted, respectively. In the case of the design parameter X5, finally, the product function Y2 is extracted, and the design parameters X2 and X4 are then extracted. A design parameter structured model expressing all the interrelationships described above corresponds to a design parameter structured model shown in FIG. 8.

Next, in step 206, a structuring process for changing configuration of design parameters so as to prepare design parameter groups where interrelationship between design parameters becomes minimum is performed by using the design parameter structured model produced in the step 205. In this case, it is desirable that the number of design parameters included in each design parameter group is as small as possible. One example of the structuring processing method will be described with reference to FIG. 12.

An initial value of a design parameter structured model shown in FIG. 12 is the same as that of the design parameter structured model shown in FIG. 8. In this example, five items of X1 to X5 are adopted as design parameters. Combinations for dividing the design parameters X1 to X5 into two groups are prepared. Since it is desirable that the number of design parameters included in each design parameter group is as small as possible, two or three design parameters are included in each group.

Since the combination is equivalent to combination at the time when selecting two design parameters from the design parameters of five items, ten combinations are prepared through the calculation for preparing the combinations. Then, the combination including the least number of lines of interrelationships connecting two design parameter groups is extracted from the total of 10 combinations. For example, in the case of a design parameter group 1={X1, X2} and a design parameter group 2={X3, X4, X5}, the number of interrelationships between the group 1 and the group 2 is three, that is, X1-X3, X2-X4, and X2-X5.

Also, in the case of a design parameter group 1={X1, X3} and a design parameter group 2={X2, X4, X5}, the number of interrelationships between the group 1 and the group 2 is one, that is, X3-X4. Similarly, when the number of interrelationships between the groups is obtained regarding all combinations, the case of the design parameter group 1={X1, X3} and the design parameter group 2={X2, X4, X5} has the least number of interrelationships in this example. Therefore, by re-arranging the design parameter structured model, a design parameter structured model configured of two design parameter groups is produced.

Figure 13:
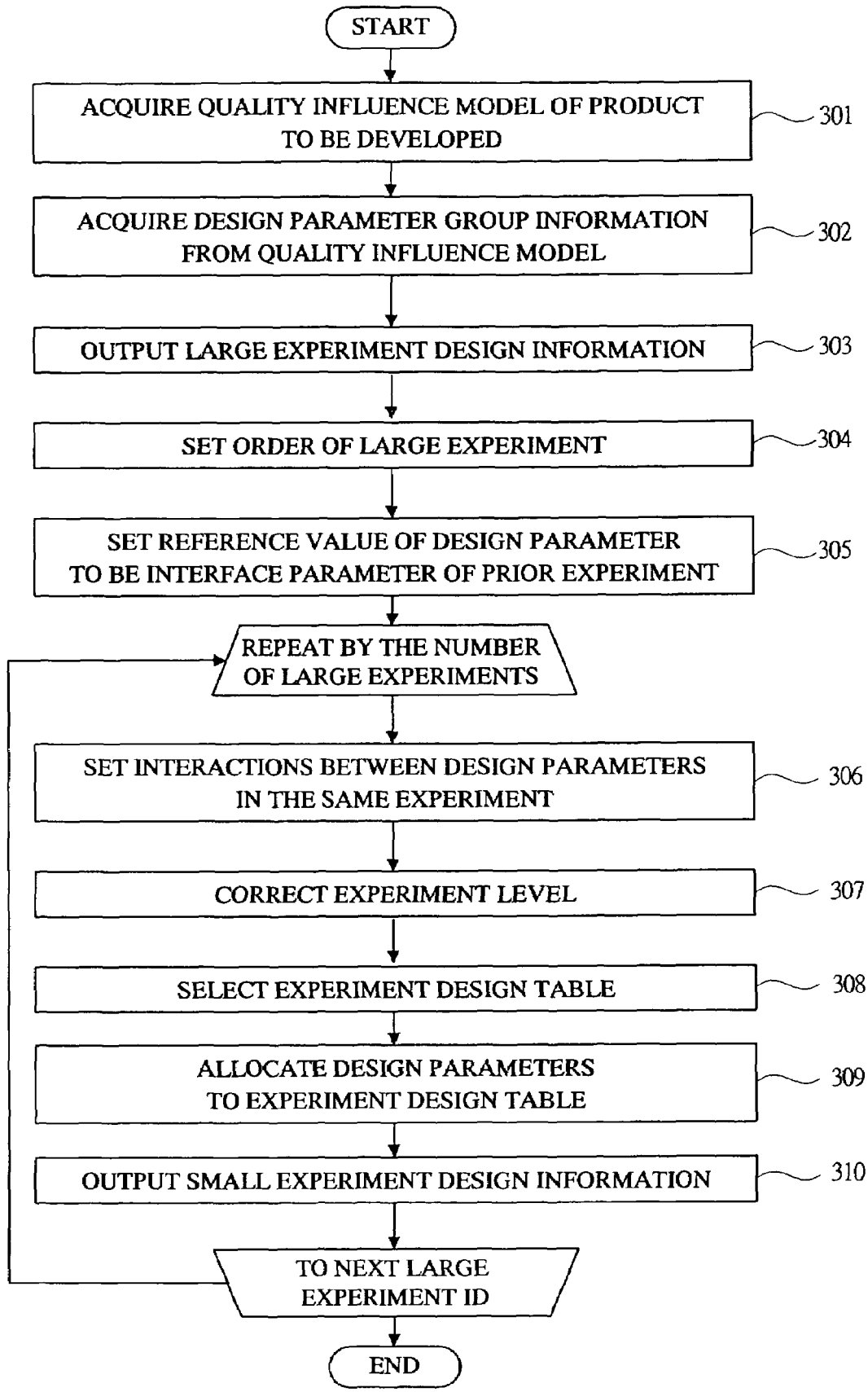
FIG. 13 is a flowchart showing a method for preparing experiment design by using a quality influence model in the product design parameter determination supporting system according to the embodiment of the present invention.

FIG. 13 is a flowchart showing a method for preparing an experiment design by using the quality influence model in the step 104 in FIG. 2.

In step 301, first, quality influence model information about a product to be developed is acquired from the data storage unit. The quality influence model information includes a quality influence model obtained by structuring a relationship of quality influence degree between product function and design parameter, a design parameter structured model obtained by structuring interrelationship among design parameters, and the like.

Next, in step 302, design parameter group information is acquired from the quality influence models acquired in the step 301 based on the design parameter structured model which has been subjected to the structuring process in the step 206 shown in FIG. 9. The description will be made by using a design parameter structured model which has been subjected to the structuring process shown in FIG. 12. In this example, target design parameters are five items of X1 to X5. Also, design parameter group information including a design parameter group 1={X1, X3} and a design parameter group 2={X2, X4, X5} is acquired through the structuring process.

Next, in step 303, a large experiment is allocated to each design parameter group based on the design parameter group information acquired in the step 302, and large experiment design information is outputted. The large experiment design information includes a large experiment ID allocated to each design parameter group, an experiment order, a list of corresponding design parameters, an interface parameter with the prior experiment, the number of experiment levels, and their level values.

Figure 14:
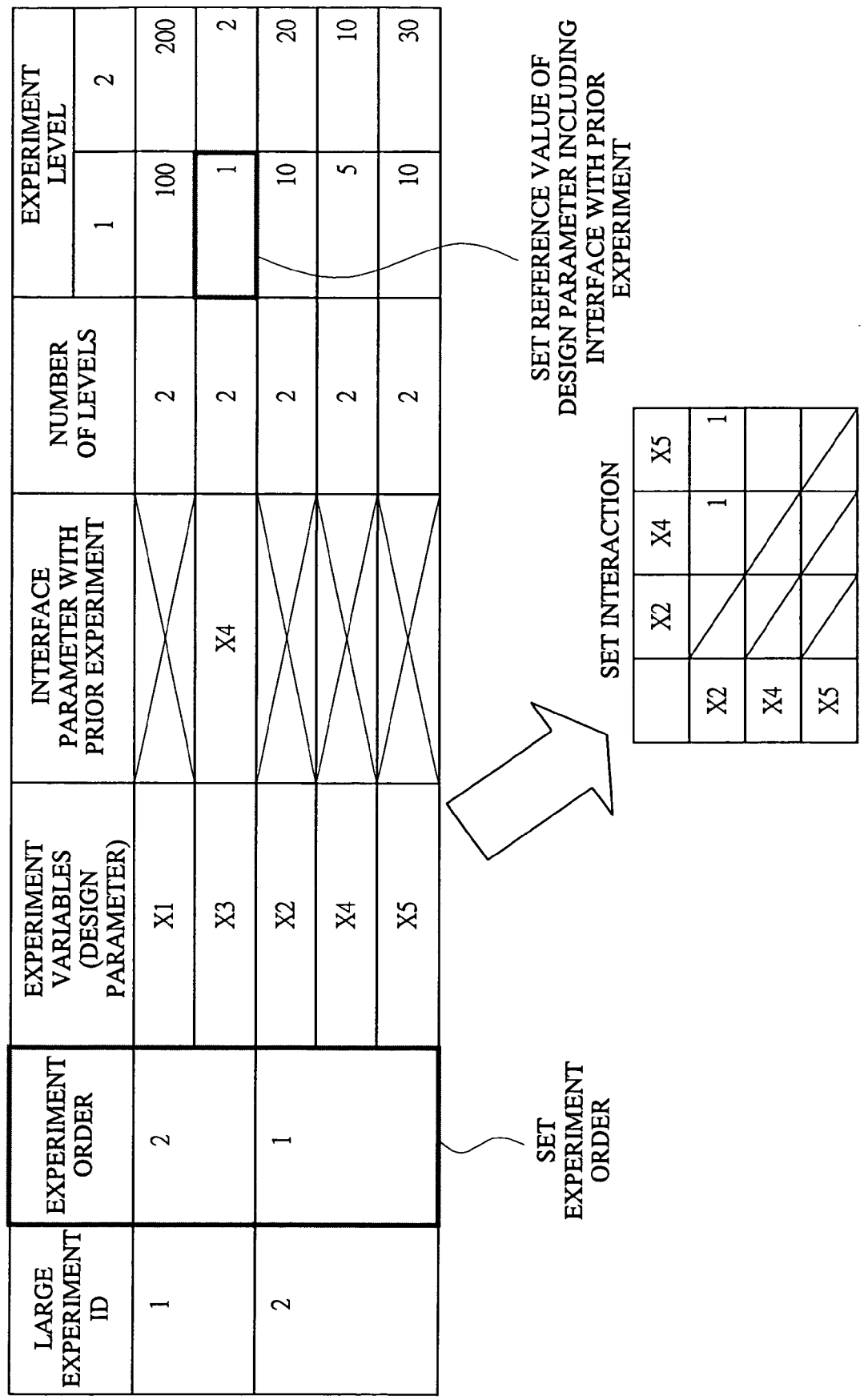
FIG. 14 is a table showing a display example of a large experiment design prepared by using design parameter group information in the product design parameter determination supporting system according to the embodiment of the present invention.

FIG. 14 is a diagram showing one display example of the large experiment design prepared by using the design parameter group information shown in FIG. 12. Of the design parameter groups described above, the group 1 is allocated to a large experiment ID=1 and the group 2 is allocated to a large experiment ID=2. Therefore, design parameters which are experiment variables in the large experiment ID=1 are X1 and X3, and design parameters which are experiment variables in the large experiment ID=2 are X2, X4, and X5. A value set at the time of inputting a design parameter is assigned to an initial value of the number of levels for each design parameter. Also, an initial value of the experiment level is automatically calculated from physical upper and lower critical limit values set for each design parameter and the number of experiment levels. In this stage, the experiment order and the interface parameter with the prior experiment are blank.

Next, in step 304, experiment order information is set in the large experiment design information outputted in the step 303. In the determination of the order, setting of the order of experiments performed at the same timing is also possible. In the example shown in FIG. 14, large experiment ID=2 is first performed and the large experiment ID=1 is then performed.

Next, in step 305, a reference value of the interface parameter with the prior experiment determined from the experiment order information set in the step 304 is set. In the instance shown in FIG. 14, the design parameter X3 in the large experiment ID=1 performed secondly has an interrelationship with the design parameter X4 in the prior experiment (see the design parameter structured model shown in FIG. 12). Therefore, it is necessary to determine the set value of the design parameter X3 as the reference value before the first experiment is performed. Also, in the experiment of the large experiment ID=1, the design parameter X3 cannot be changed from the reference value. The design parameters except for the design parameter X3 can be evaluated regarding the set experiment level.

Then, the process from step 306 to step 310 is repeated a number of times equivalent to the number of experiments for each order of the large experiment. In step 306, regarding a target large experiment ID, interaction between design parameters in the same experiment is set. The term "interaction" means a fluctuation factor of an evaluation index generated due to the combination of two design parameters.

FIG. 21 is a diagram showing a difference in the change of an evaluation value depending on the presence and absence of interaction as an influence of interaction between two design parameters applied on a product function. When there is no interaction between two design parameters, since the design parameters are independent from each other, an evaluation index at the time when the level of a parameter 1 is changed from 1 to 2 decreases regardless of the level of a parameter 2. When there is an interaction between the design parameters, behavior of the evaluation index at the time when the level of the parameter 1 is changed from 1 to 2 varies according to the level of the parameter 2. Therefore, an experiment design taking the combination into account must be prepared. In the instance shown in FIG. 14, presence/absence of an interaction among the design parameters X2, X4, and X5 in the large experiment ID=2 is set. In this example, interactions are present between X2 and X4 and between X2 and X5.

Next, in step 307, the experiment level of each design parameter is corrected. An initial value automatically calculated from physical upper and lower critical limit values of the design parameter and the number of experiment levels is used for a design parameter which is not corrected.

Next, in step 308, a plurality of experiment design tables satisfying the number of design parameters to be experimented, the number of experiment levels thereof, and the number of interactions between design parameters are outputted, and one of the experiment design table is selected. In the experiment design table, combinations of levels of parameters are displayed in each column, and the experiment design table includes an orthogonal table used in Taguchi method, a composite design table used in response surface methodology, and the like. A design table with an appropriate scale is selected according to the number of design parameters, the levels thereof, and the number of interactions among design parameters. Regarding the types of experiment design tables according to the number of design parameters, the levels thereof, and the number of interactions among design parameters, please see the Non-Patent Document 1.

Next, in step 309, target design parameters are allocated to each column of the experiment design table selected in the step 308. In the orthogonal table used in Taguchi method, a column to which design parameters having an interaction are allocated is determined in advance, and the allocation is conducted according to an instruction of the allocation.

Finally, in step 310, small experiment design information in a target large experiment ID is outputted. The small experiment design information includes an experiment level of a design parameter for each small experiment ID, a set value in the experiment level for each design parameter, and the like. FIG. 15 is a diagram showing small experiment design information utilized when all combination experiments of the design parameters X2, X4, and X5 in the large experiment ID=2 shown in FIG. 14 are performed with two experiment levels. Experiment levels of the design parameters X2, X4, and X5 for each small experiment ID are displayed, and set values of design parameters X2, X4, and X5 in the experiment levels are also displayed.

Figure 16:
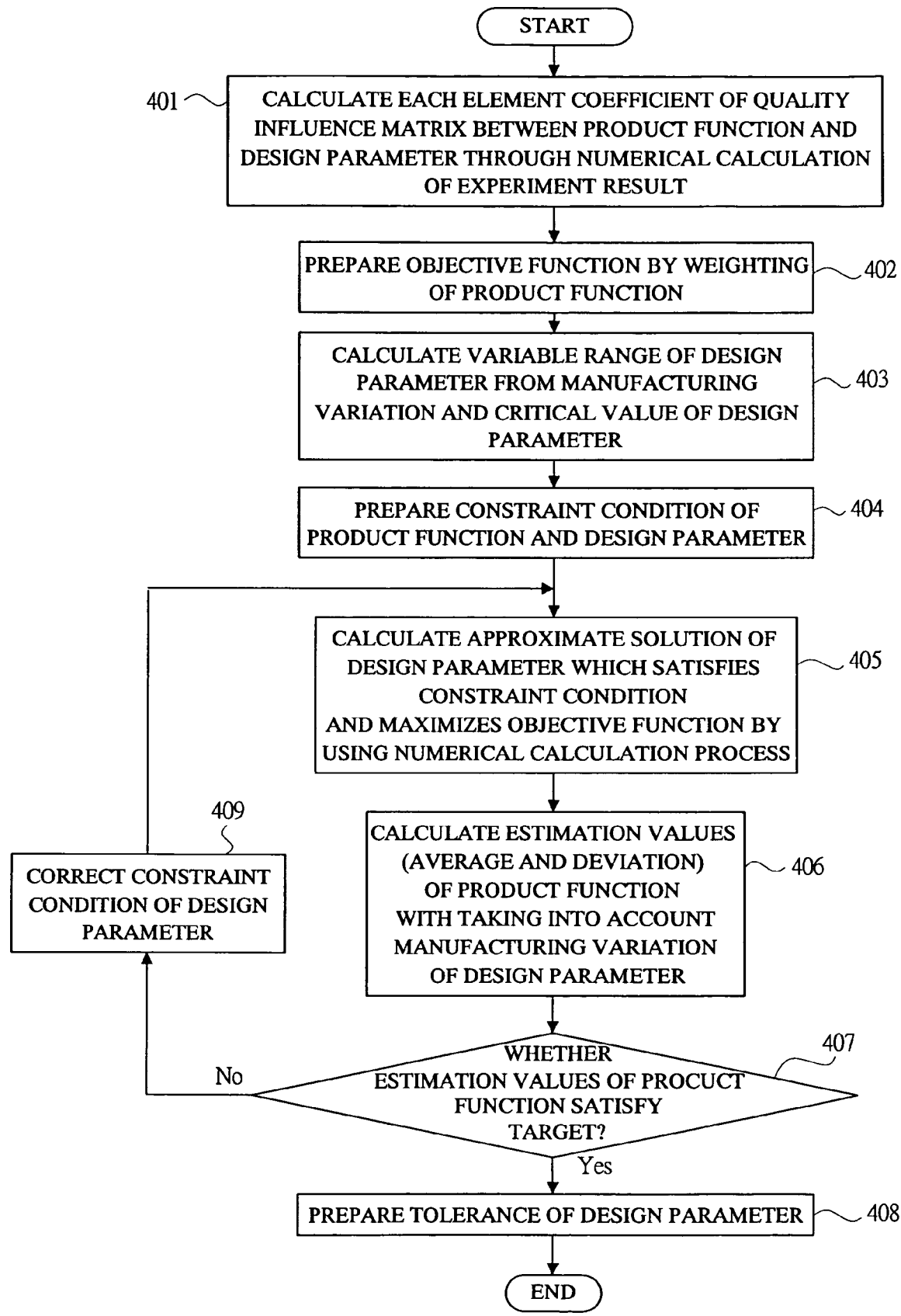
FIG. 16 is a flowchart showing a method for performing coordination process of design parameters by using a quality influence model in the product design parameter determination supporting system according to the embodiment of the present invention.

FIG. 16 is a flowchart showing a method for performing a coordination process of design parameters by using a quality influence model, with taking into account the manufacturing variation in step 107 and step 108 shown in FIG. 2.

First, in step 401, coefficients of respective element components in a quality influence matrix between product function and design parameter are calculated through numerical calculation of the experiment results acquired from the data storage unit in step 106 shown in FIG. 2. In this case, a vector representing a product function is defined as Y and a vector representing a design parameter is defined as X. Then, a relationship between the product function vector Y and the design parameter vector X is expressed by the following Equation (1).

$$Y = A \cdot X + B \quad (1)$$

Figure 17:
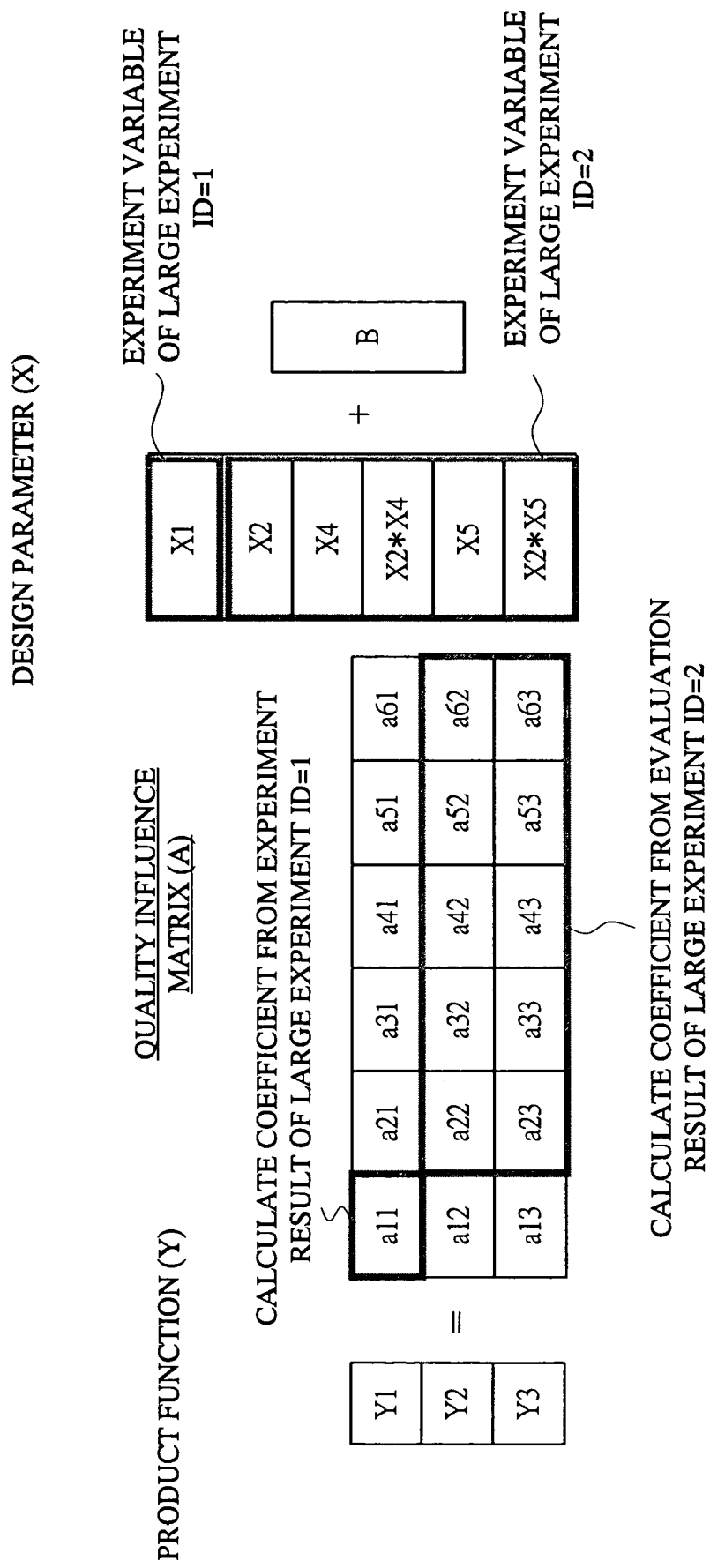
FIG. 17 is a diagram showing a method for calculating a quality influence matrix by using experiment result information in the product design parameter determination supporting system according to the embodiment of the present invention.

Here, A is a quality influence matrix comprising a number of columns corresponding to the design parameter vectors and a number of rows corresponding to product functions. Also, B is an offset correction vector corresponding to a product function vector. Note that the design parameter vector includes not only respective design parameter items but also a plurality of interaction components between design parameters. Therefore, the number of items in the design parameter vector is equal to or more than the number of target design parameters. For example, coefficients of respective elements of the quality influence matrix A and the offset correction vector B are determined through calculation of least-square method of the experiment result so that an error between the measurement value of the product function vector Y in the design parameter vector X in each experiment and an estimation value of a product function vector calculated by utilizing Equation (1) becomes the minimum. FIG. 17 is a diagram showing one example of a method for calculating a quality influence matrix by using the experiment result information of the experiment design shown in FIG. 14.

As described above, target design parameters are five items of X1 to X5 and target product functions are three items of Y1 to Y3 in this example. Also, evaluation experiment is performed in the order of a design parameter group 2={X2, X4, X5} and a design parameter group 1={X1, X3}. In this case, since the design parameter X3 has an interrelationship with the design parameter X4 (see the design parameter structured model shown in FIG. 12) in the prior experiment and it is fixed as a reference value, it is excluded from the target of the design parameter coordination process at this time, and it is not included in the design parameter vector.

Since interactions are present between the design parameters X2 and X4 and between the design parameters X2 and X5, a primary interaction component is added to the design parameter vector. Then, a design parameter vector X={X1, X2, X4, X2*X4, X5, X2*X5} can be obtained. Also, a product function vector Y={Y1, Y2, Y3} can be obtained. Consequently, the quality influence matrix A constitutes a matrix of 6×3.

Further, a coefficient of an element all of the quality influence matrix A is calculated through the calculation of least-square method of the experiment result of the large experiment ID=1. In addition, coefficients of elements a22 to a62 and a23 to a63 of the quality influence matrix A are calculated through the calculation of least-square method of the experiment result of the large experiment ID=2.

Next, in step 402, an objective function for coordination process is prepared by performing weighting to the product function vector. For example, an objective function f of the product function vector Y={Y1, Y2, Y3} shown in FIG. 17 is expressed by the following Equation (2).

$$f = \sum_{i=1}^{3} \{g(i) \cdot \Delta Y^2\} \quad (2)$$

$$\Delta Y = (Y(i) - Y_{target}(i))/(Y_{ul}(i) - Y_{ll}(i)) \quad (3)$$

$$\Delta Y = Y(i)/Y_{ll} \quad (4)$$

$$\Delta Y = Y_{ul}/Y(i) \quad (5)$$

Here, $\Delta Y(i)$ represents a deviation amount from a target of each element of a product function vector, $Y_{target}(i)$, $Y_{u1}(i)$, and $Y_{11}(i)$ represent a target aimed value, an upper limit value, and a lower limit value of each product function, respectively, and $g(i)$ represents a weighting coefficient of each product function. Also, a calculation equation for $\Delta Y(i)$ varies according to target values of respective product functions. $\Delta Y(i)$ in the case where a product function has a target aimed value is expressed by Equation (3), $\Delta Y(i)$ in the case where a product function is the lower threshold value is expressed by Equation (4), and $\Delta Y(i)$ in the case where a product function is the upper threshold value is expressed by Equation (5).

Next, in step 403, a variable range of each design parameter item is calculated based upon the manufacturing variation record and the physical critical threshold value of each design parameter item. The manufacturing variation record and the physical critical threshold value of the design parameter are acquired at the time of inputting design parameters in the step 101 shown in FIG. 2.

Figure 18:
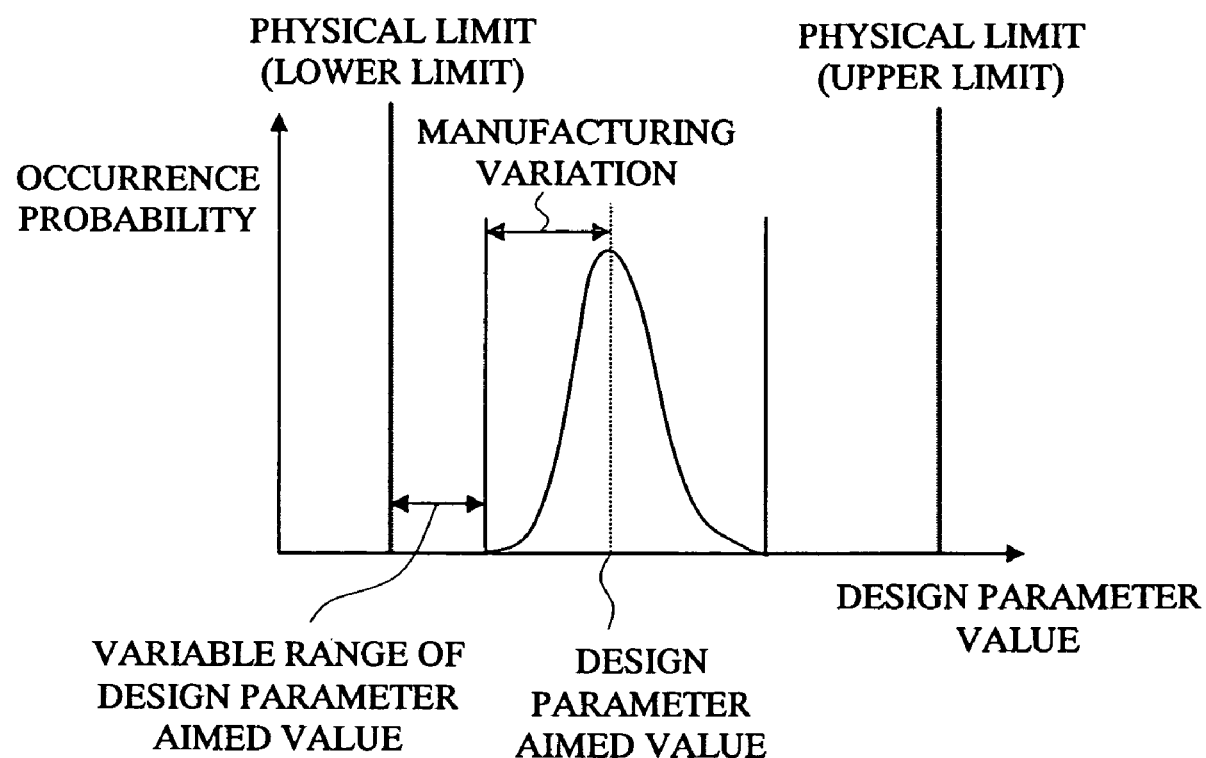
FIG. 18 is a diagram showing a method for calculating a variable range of design parameters by using manufacturing variation and a limit value of design parameters in the product design parameter determination supporting system according to the embodiment of the present invention.

FIG. 18 is a diagram showing one example of a method for calculating a variable range of a design parameter by using the manufacturing variation and the limit values of the design parameter. The design parameter has limit values at which further change is physically impossible. Also, even if design parameters are set to a certain aimed value, a distribution thereof deviating from the value is formed due to manufacturing variation. Therefore, when taking the manufacturing variation into account, the design parameter cannot be changed within the range of the manufacturing variation from the physical limit. Accordingly, an upper limit of the variable range of the design parameter is at a value obtained by subtracting the manufacturing variation from the upper limit value of the physical limit. Also, a lower limit of the variable range of the design parameter is at a value obtained by adding the lower limit of the physical limit to the manufacturing variation. Note that 3σ is frequently used as a value of the manufacturing variation.

In step 404, constraint conditions for the design parameter and the product function are prepared based upon the variable range of the design parameter calculated in the step 403 and the target value of the product function. In a constraint conditional expression, ranges of a design parameter and a target product function are expressed with inequality expressions.

Then, in step 405, a numerical calculation process is performed by using the quality influence matrix calculated in the step 401, the objective function prepared in the step 402, and the constraint conditional expression prepared in the step 404, and an approximate solution of a design parameter which satisfies the constraint conditions and makes a value of the objective function minimum is calculated. For example, as a numerical calculation method, linear programming, quadratic programming, Newton-Raphson process, and the like are known. In each case, an input variable which makes the objective function minimum (or maximum) and satisfies the constraint conditions can be calculated by setting a function between an input variable and an output variable, an objective function of the output variable, and constraint conditions of the input variable and the output variable to perform a predetermined calculation algorithm.

Next, in step 406, an estimation value (average and variation) of a product function taking a manufacturing variation of a design parameter into account is calculated by using the quality influence matrix prepared in the step 401. For example, it is assumed that each design parameter conforms to a normal distribution having a manufacturing variation as standard deviation centering on the aimed value calculated in the step 405. In Monte Carlo simulation method, variations of a normal distribution are generated at random for all design parameters and an estimation value of a product function at this time is calculated by using the Equation (1). By performing the calculation repeatedly, an average value and variation (standard deviation) of the product function estimation values can be calculated.

Next, in step 407, it is determined whether the estimation value of the product function including a variation and calculated in the step 406 satisfies the target. For example, the average value ±3σ (standard deviation) of the estimation values of the product function is compared with the upper threshold value and the lower threshold value of the target. When the estimation value including the variations of the product function satisfies the target, the process proceeds to step 408. On the other hand, when the estimation value including the variations of the product function is out of the target, the process proceeds to step 409.

In step 408, a tolerance of each design parameter is calculated. Since the tolerance is an allowable change amount of the design parameter, the manufacturing variation set in the step 406 is defined as the tolerance. When the manufacturing variation is given by the standard deviation (σ), the value of 3σ is the tolerance.

In step 409, since the estimation value of a product function is out of the target, the constraint conditions of the design parameter and the weighting coefficient of the objective function are corrected, and the process of step 405 and steps subsequent thereto are performed again. The correction can be performed by increasing the weighting coefficient of the product function which is out of the target. Alternatively, the constraint conditions are changed so as to decrease the value of the manufacturing variation of the design parameter which largely influences the product function which is out of the target. For example, in the example shown in FIG. 17, since the product function Y1 is influenced by the design parameter X1, it is necessary to reduce the manufacturing variation of the design parameter X1. Also, since the product function Y2 is influenced by the design parameters X2, X4, and X5, it is necessary to change manufacturing variations of the design parameters X2, X4, and X5 in such an order that the sensitivity to the product function Y2 is larger. In this case, however, the manufacturing variation of the design parameter which cannot be further reduced physically is not changed.

FIG. 19 is a diagram showing a display example of the calculation result of a design parameter specification when the design parameter coordination process using the quality influence matrix shown in FIG. 17 has been performed. As described above, in this example, five items of the design parameters X1 to X5 are handled. An appropriate value of each design parameter item, a tolerance thereof, a manufacturing variation record thereof and interface information thereof with other design parameter are displayed. In the design parameter X1, for example, its manufacturing variation record is "30" but its tolerance is "20". Therefore, regarding the design parameter X1, it is understood that the manufacturing variation must be reduced.

FIG. 20 is a diagram showing a display example of the calculation result of the estimation value of the product function when the design parameter coordination process using the quality influence matrix shown in FIG. 17 has been performed. As described above, in this example, three items of the product functions Y1 to Y3 are handled. An estimation value (average, variation) of each product function, a target value (aimed value, upper limit value, and lower limit value) thereof and a determination result thereof are displayed. In some cases, a product function does not have a target value to be aimed and has only the upper limit or the lower limit. Further, a product function whose determination result indicates "NG" is displayed in an emphasized manner.

As described above, according to the product design parameter determination supporting system according to this embodiment and the method for determining a design parameter in this system, since the interaction between product function and design parameter is structured, a design parameter group having small interaction is extracted, and a function to prepare an experiment design based upon the design parameter group is provided, an experiment which can efficiently satisfy a required product function in a short time, takes an interrelationship among design parameters into account from the beginning, and requires reduced number of repetition processes can be performed.

Also, since a function to estimate a product function from a relationship of a quality influence degree between product function and design parameter with taking into account the manufacturing variation is provided, a design parameter can be determined with taking influence of manufacturing variation occurring in a mass production stage into account. Accordingly, product drawback is prevented from occurring in the mass production stage, and a product development term can be shortened.

<Product Design Parameter Determination Supporting System According to Another Embodiment of the Present Invention>

Figure 24:
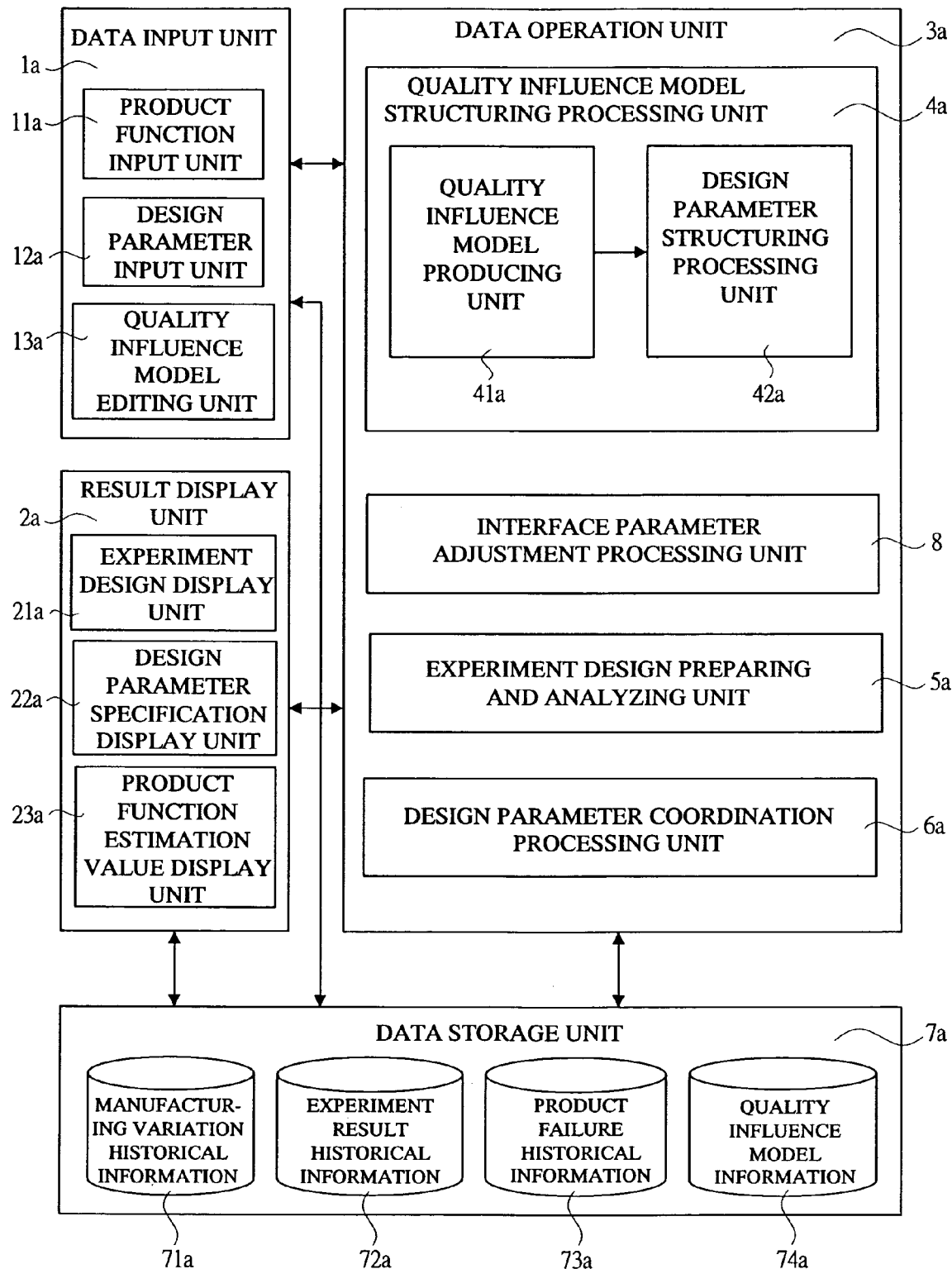
FIG. 24 is a system block diagram showing an entire configuration of a product design parameter determination supporting system according to another embodiment of the present invention.

FIG. 24 is a system block diagram showing a whole configuration of a product design parameter determination supporting system according to another embodiment of the present invention.

The product design parameter determination supporting system according to this embodiment comprises: a data input unit 1a for inputting information about a product to be developed; a result display unit 2a for displaying an operation result; a data operation unit 3a including a quality influence model structuring processing unit 4a for performing a structuring process of a quality influence degree between product function and design parameter, an interface parameter adjustment processing unit 8 for performing setting and adjustment of an initial value of an interface parameter, an experiment design preparing and analyzing unit 5a for preparing an experiment design of a target product by using a structured quality influence model and analyzing an experiment result, and a design parameter coordination processing unit 6a for performing coordination calculation of a design parameter with taking into account the manufacturing variation so as to satisfy a required product function by using the quality influence model between product function and design parameter; and a data storage unit 7a for storing information required for operation.

The data input unit 1a includes a product function input unit 11a for inputting product function information of a product to be developed, a design parameter input unit 12a for inputting design parameter information of the product, and a quality influence model editing unit 13a for performing an editing work of a quality influence model between product function and design parameter of the product and a design parameter structured model obtained by structuring a mutual influence degree among design parameters.

The design parameter input unit 12a acquires manufacturing variation information corresponding to the target design parameter from the manufacturing variation historical information 71a in the data storage unit 7a to display it on an input screen. Data inputted through the product function input unit 11a and the design parameter input unit 12a is sent to the quality influence model structuring processing unit 4a or the interface parameter adjustment processing unit 8 in the data operation unit 3a, in which predetermined processes are performed, and then it is registered in a quality influence model information 74a in the data storage unit 7a.

Also, the quality influence model editing unit 13a selects a product to be edited, and it displays product function information of a target product, design parameter information, and quality influence model information and design parameter structured model information which have been registered in quality influence model information 74a. Then, after editing the displayed information, the quality influence model editing unit 13a registers the edited data in the quality influence model information 74a.

The result display unit 2a includes an experiment design display unit 21a for displaying an experiment design of a product to be developed, a design parameter specification display unit 22a for displaying a specification of design parameters of the product to be developed, and a product function estimation value display unit 23a for displaying an estimation value of product functions in the design parameter specification displayed on the design parameter specification display unit 22a.

The experiment design display unit 21a selects a target product included in the quality influence model information 74a and displays an experiment design of the selected product prepared in the experiment design preparing and analyzing unit 5a in the data operation unit 3a. The design parameter specification display unit 22a and the product function estimation value display unit 23a display a design parameter specification and an estimation value of the product function calculated in the design parameter coordination processing unit 6a in the data operation unit 3a, respectively.

The quality influence model structuring processing unit 4a is configured of a quality influence model producing unit 41a for producing an initial model expressing a relationship of quality influence degree between product function and design parameter of a target product by using the experiment result historical information 72a or the product failure historical information 73a in the data storage unit 7a and a design parameter structuring processing unit 42a for structuring a mutual influence degree among design parameters by using the quality influence model produced in the quality influence model producing unit 41a and then setting interface parameters and preparing a design parameter group so that design parameters are independent from one another.

Regarding product functions and design parameters of a product inputted through the product function input unit 11a and the design parameter input unit 12a in the data input unit 1a, the quality influence model producing unit 41a extracts information about product functions and design parameters of the past similar product from the experiment result historical information 72a or the product failure historical information 73a to prepare an initial value of the quality influence model. The quality influence model produced in the quality influence model producing unit 41a and the interface parameter and the design parameter structured model prepared in the design parameter structuring processing unit 42a are registered in the quality influence model information 74a in the data storage unit 7a.

The interface parameter adjustment processing unit 8 calculates an initial value of the interface parameter prepared in the design parameter structuring processing unit 42a and performs adjustment process of the interface parameter after performing an experiment. The interface parameter and the design parameter structured model adjusted in the interface parameter adjustment processing unit 8 are registered in the quality influence model information 74a in the data storage unit 7a.

Regarding the product selected in the experiment design display unit 21a in the result display unit 2a, the experiment design preparing and analyzing unit 5a acquires a quality influence model between product function and design parameter and a quality influence model formed of a design parameter structured model from the quality influence model information 74a in the data storage unit 7a, allocates design parameters to be evaluated to an experiment design table to prepare an experiment design, and then outputs the same to the experiment design display unit 21a.

Also, the experiment design preparing and analyzing unit 5a acquires information of experiment result performed based upon the corresponding experiment design from the experiment result historical information 72a in the data storage unit 7a to prepare a further detailed quality influence model between product function and design parameter and then registers the same in the quality influence model information 74a in the data storage unit 7a.

The design parameter coordination processing unit 6a acquires a quality influence model of a target product from the quality influence model information 74a in the data storage unit 7a and performs calculation of an appropriate value of a design parameter satisfying a target product function and estimation of the product function at this time.

The data storage unit 7a is connected to the data input unit 1a, the result display unit 2a, and the data operation unit 3a, and it performs delivery of accumulated data and registration of new data in response to a request from each unit. The data storage unit 7a has stored therein manufacturing variation historical information 71a for storing history of the measurement result of manufacturing variations in a manufacturing process of the past products, an experiment result historical information 72a for storing a set value and a measurement value for each design parameter in an experiment and a measurement result of the product function in the experiment, a product failure historical information 73a in which the past product failure information is accumulated, and a quality influence model information 74a formed of a quality influence model which expresses a quality influence degree between product function and design parameter of a product to be developed and a design parameter structured model which expresses a structured mutual influence degree among design parameters.

For example, the manufacturing variation historical information 71a includes a product name (or code), a process step name (or code), ID of a part to be processed (corresponding to a member ID in the case of a process product), processed date and hour, a manufacturing apparatus used for process, measurement items of product quality after process (for example, size and the like), a measurement result thereof, and the like.

Also, the experiment result historical information 72a includes a product name (or code), a part name (or code or step name in the case of a process product), design parameter item and its set value and measurement value, product function item, measurement result of a product function at a set design parameter value, and the like. The product failure historical information 73a includes a product name (or code), a part name (or code or step name in the case of a process product), failed product function item, information related to a design parameter item causing the failure, and the like.

The quality influence model information 74a includes a product name (or code), a target value for each product function item (aimed value, upper limit value, lower limit value), a characteristic value for each design parameter (upper critical value, a lower critical value, manufacturing variation), the number of experiment levels and the minimum change amount for each design parameter, quality influence model information obtained by structuring a relationship of a quality influence degree between function items and design parameters of a product to be developed, design parameter structured model information obtained by structuring mutual influence degree among design parameters, and the like.

Figure 25:
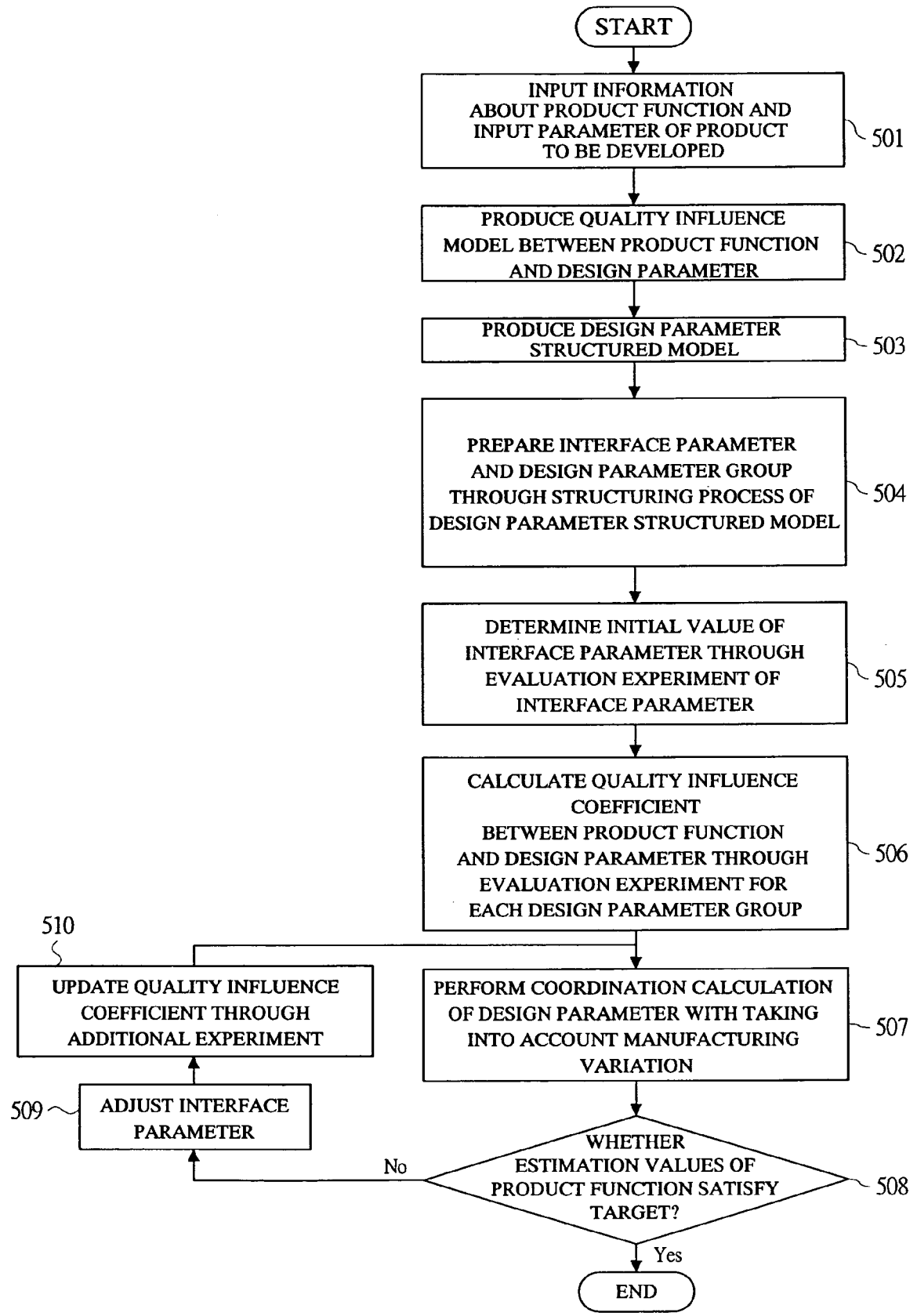
FIG. 25 is a flowchart showing a method for determining design parameters in the product design parameter determination supporting system according to the embodiment of the present invention.

FIG. 25 is a flowchart showing a method for determining a design parameter in the product design parameter determination supporting system according to this embodiment.

In step 501, first, product function information and design parameter information about a product to be developed are inputted. The product functions mentioned here are measurable indexes representing characteristic and performance of functions required for a product. Also, the design parameters are parameters which must be determined in order to satisfy a product function required for the product. Therefore, the design parameters include both of a structure design parameter regarding a product structure and a process design parameter regarding a manufacturing method. The design parameter information includes a name (or code) of a design parameter, physical upper critical value and lower critical value thereof, manufacturing variation, the number of experiment levels, the minimum change amount of the design parameter, and the like.

The design parameter information about the product structure can be obtained from BOM (Bill of Material). The design parameter information about the manufacturing process can be obtained from BOP (Bill of Process). Also, manufacturing variation record of design parameters in the past similar products stored in the data storage unit is assigned as an initial value of the manufacturing variation. Some design parameters do not include manufacturing variation information. The product function information includes a name (or code) of a product function and a target value (aimed value, an upper limit value, a lower limit value).

For example, product functions such as power consumption are more preferable when they become smaller. Therefore, the target value of the product function becomes equal to or less than an upper limit value. Thus, the target value of the product function can include only a lower limit value or only an upper limit depending on a function item.

Next, in step 502, an initial value of a quality influence model expressing magnitude of a quality influence degree between product function and design parameter of a product to be developed is prepared. For example, the initial value of the quality influence model can be prepared by utilizing statistical process using experiment result historical information about the past similar products. In this case, the similar product is a product of the previous generation, derivative products having the same platform, and the like.

The experiment result historical information includes a set value of a design parameter at the time of experiment or an actual measurement value, a measurement result of a product function at this time, and the like. A specific preparing method will be described later with reference to FIG. 27. Alternatively, a quality influence model can be produced based on a relationship between a failed product function in the past and a design parameter by using failure historical information about the past similar products. The product failure historical information includes related information between the failed product function and an item of the design parameter which has caused the failure. A specific preparing method is similar to that shown in FIG. 11. A quality influence model between product function and design parameter produced automatically can be corrected manually via a display screen based upon the knowledge of a designer.

In step 503, an initial value of the design parameter structured model expressing mutual influence degree among design parameters is prepared. The initial value of the design parameter structured model can be automatically prepared through operation process using the quality influence model between product function and design parameter produced in the step 502. Alternatively, the initial value can be automatically prepared from shape information among design parameters resulting from a product structure. For example, regarding a design parameter for shapes of connecting portions of two parts, when the shape of the connecting portion of one of the parts is changed, the shape of the connecting portion of the other part must be changed.

Information regarding such a design structure can be acquired from design drawing information. An automatically-produced design parameter structured model can be manually corrected via a display screen based upon knowledge of a designer.

Next, in step 504, the design parameter structured model produced in the step 503 is structured to prepare a design parameter to be an interface between design parameter groups and a design parameter group which is a collection of independent design parameters. A specific method for preparing the design parameter group and the interface parameter will be described later with reference to FIG. 29.

Next, in step 505, an experiment regarding the interface parameter prepared in the step 504 is performed to determine an initial value of the interface parameter. A set value of the design parameter in each experiment and an experiment result having a measurement value of a product function at this time are accumulated in the experiment result historical information in the data storage unit.

In step 506, an experiment design is prepared for each design parameter group prepared in the step 504, an experiment is performed based upon the experiment design, and a corresponding quality influence coefficient in a quality influence model between product function and design parameter is calculated by using the experiment result information including a set value of a design parameter in each experiment and a measurement value of a product function in the experiment. A preparing method and an analyzing method in an experiment in steps 505 and 506 will be described later with reference to FIG. 32.

In step 507, coordination process of a design parameter taking the manufacturing variation into account is performed by using the quality influence model updated in the step 506. A specific calculating method for the coordination process will be described later with reference to FIG. 37.

In step 508, an estimation value of a product function at the time of a coordination process of a design parameter performed in the step 507 is calculated, and it is determined whether or not the estimation value satisfies a target. The estimation value of the product function includes an average value and a variation (for example, a standard deviation value) of product functions in the design parameter specification calculated in the step 507.

When all product functions satisfy the targets, appropriate values of design parameters and estimation values of product functions are outputted on the display screen to terminate the processes. On the other hand, when a product function which does not satisfy a target is present, step 509 and step 510 are repeatedly performed until all the product functions satisfy the targets.

In step 509, an interface parameter relating to a product function which does not satisfy a target is selected, and an additional experiment design for performing adjustment of the selected interface parameter is prepared. A specific method for adjusting an interface parameter will be described later with reference to FIG. 41.

In step 510, an experiment is performed based upon the additional experiment design prepared in the step 509 and a corresponding quality influence coefficient in the quality influence model between product function and design parameter is calculated through a method similar to that in the step 506.

As an example of an assembly product of machine parts, a hard disk drive and the like are known. For example, a diagram schematically showing a sectional structure of the header slider portion of the hard disk drive is similar to FIG. 22 described above, a diagram showing a part of design parameter information in the hard disk drive is similar to FIG. 3 described above, a diagram showing a part of product functions corresponding to an instance of the hard disk drive is similar to FIG. 4 described above, and a diagram schematically showing a sectional structure of a transistor of a semiconductor LSI is similar to FIG. 23 described above. Therefore, the description for these diagrams is omitted here.

Also, as an example of a process product, a diagram showing a part of design parameters of a transistor of a semiconductor LSI is similar to FIG. 5 described above and a diagram showing a part of product functions of the transistor of the semiconductor LSI is similar to FIG. 6 described above. Therefore, the description of these diagrams is omitted here.

Figure 26:
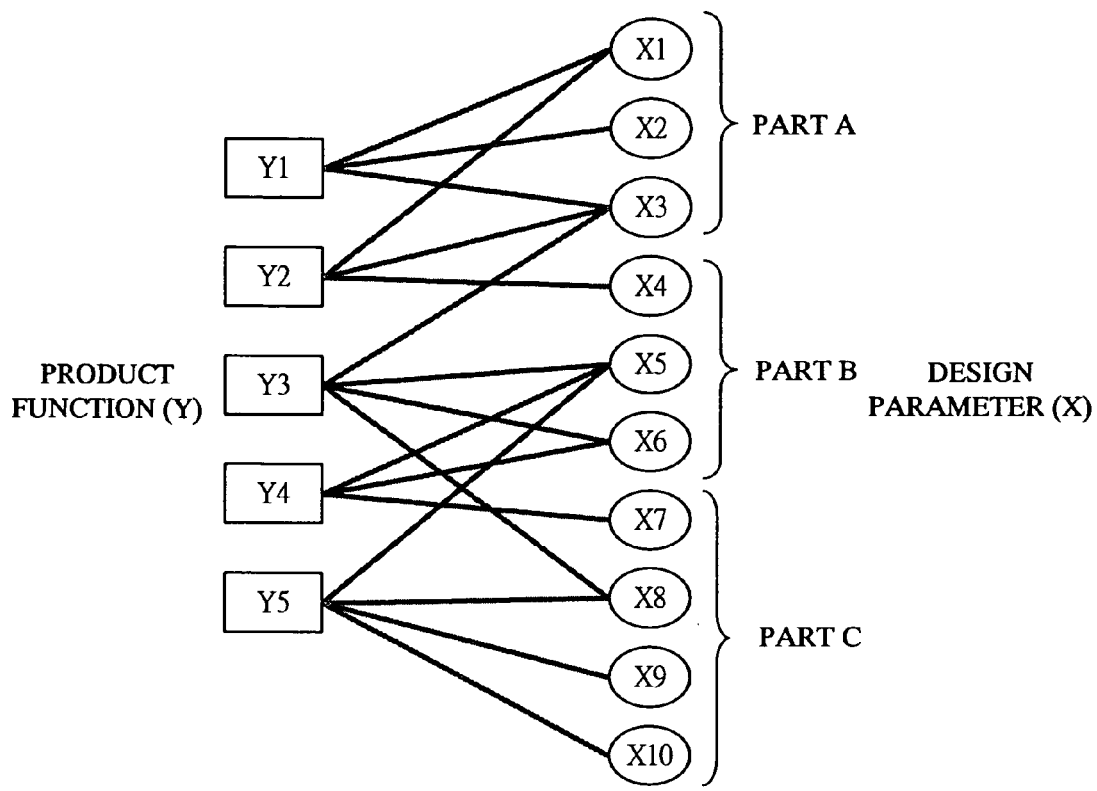
FIG. 26 is a diagram showing one example of initial values of a quality influence model representing quality influence degrees between design parameters and product functions in the product design parameter determination supporting system according to the embodiment of the present invention.

FIG. 26 is a diagram showing one example of initial values of a quality influence model expressing a quality influence degree between design parameters and product functions. In this example, target design parameters are ten items of X1 to X10 and target product functions are five items of Y1 to Y5. The design parameters X1, X2, and X3 are parameters regarding a part A, the design parameters X4, X5, and X6 are parameters regarding a part B, and the remaining design parameters X7, X8, X9, and X10 are parameters regarding a part C. In this example, relationships in quality (this is referred to as "quality influence degree") are observed between the product function Y1 and the design parameters X1, X2, and X3. In other words, when the value of the design parameter X1, X2, or X3 is changed (or when it changes unintentionally), the value of the product function Y1 also changes.

Besides, quality influence degrees are observed between the product function Y2 and the design parameters X1, X3, and X4, between the product function Y3 and the design parameters X3, X5, X6, and X8, between the product function Y4 and the design parameters X5, X6, and X7, and between the product function Y5 and the design parameters X5, X8, X9, and X10. As a method for expressing the quality influence degree, there are a network diagram where a product function and a design parameter in which quality influence is present are connected by a line and a matrix diagram where, regarding a matrix between a product function and a design parameter, "1" is assigned to a combination of a product function and a design parameter where quality influence is present and "0" is assigned to a combination thereof where quality influence is not present. Since relationships in quality influence degree are equivalent to each other in both the expressing methods, either one of the methods may be used.

Figure 27:
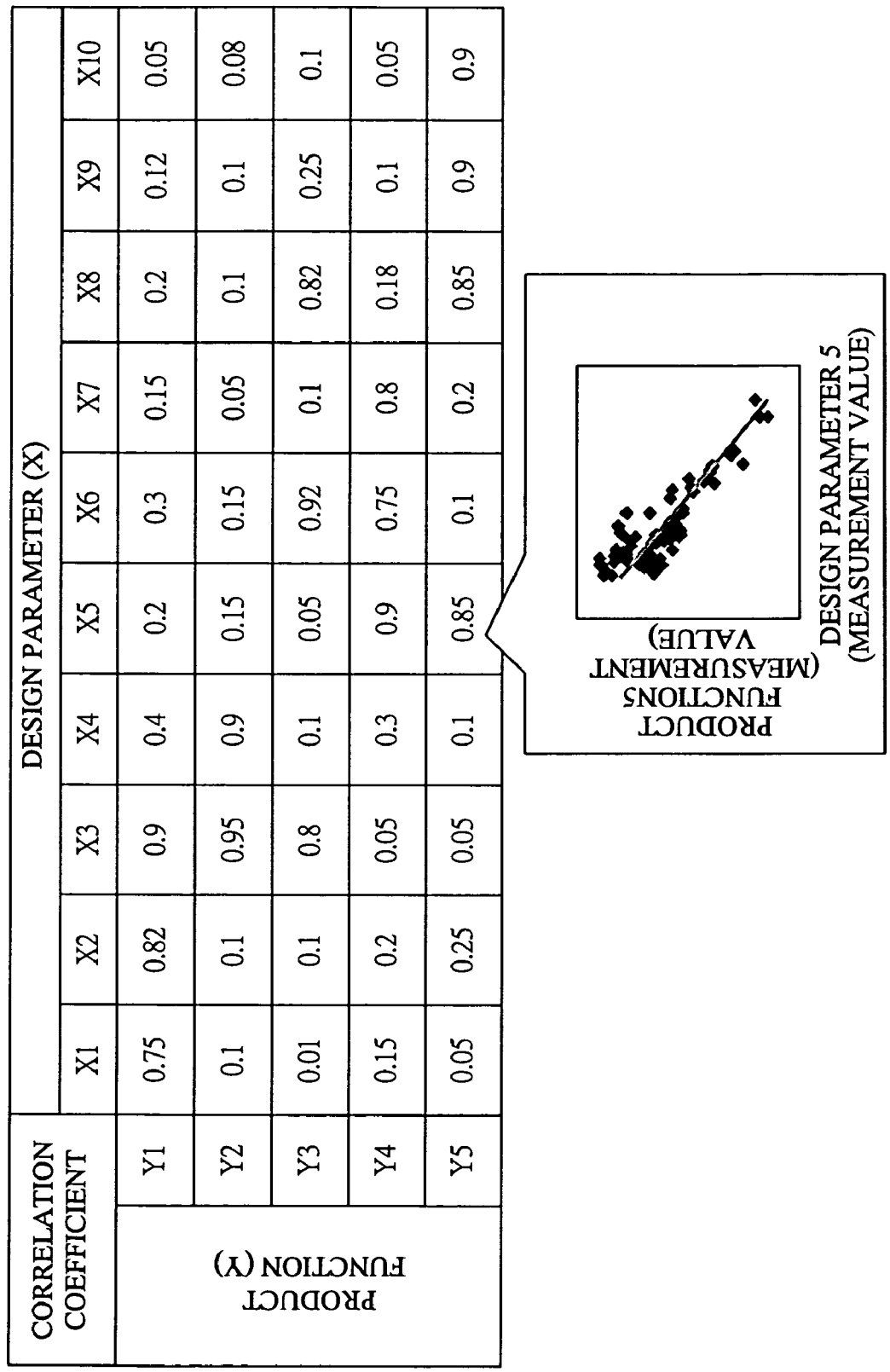
FIG. 27 is a table showing one example of a method for producing a quality influence model by using the past experiment result information in the product design parameter determination supporting system according to the embodiment of the present invention.

FIG. 27 is a diagram showing a method for producing a quality influence model through statistical process using the experiment result historical information of the past similar product, which corresponds to one example of a method for producing a quality influence model between product function and design parameter in step 502 shown in FIG. 25. In FIG. 27, there are ten items of X1 to X10 as target design parameters and five items of Y1 to Y5 as target product functions in the instance shown in FIG. 26. Correlation analysis is performed for all combinations of measurement values of design parameters of the ten items and measurement values of product functions of five items in the past experiment result historical information, and the correlation coefficients in the respective combinations are calculated.

The correlation coefficient is an index indicating strength of correlation between two data items, and it takes a value in a range of −1 to 1. Also, correlation becomes high when an absolute value of the correlation coefficient is closer to 1 and correlation becomes low when it is closer to 0. In FIG. 27, absolute values of a total of fifty correlation coefficients obtained from the combinations of design parameters of 10 items and product functions of 5 items are shown.

For example, correlation between the design parameter X5 and the product function Y5 is high as shown in a scatter diagram, and the absolute value of the correlation coefficient is also high such as 0.85. Here, when it is assumed that the combination with an absolute value of the correlation coefficient indicating 0.7 or more is defined as that having a relationship in quality between product function and design parameter, it is expressed by the quality influence model that there are influence degrees in combinations between the product function Y1 and the design parameters X1, X2, and X3, between the product function Y2 and the design parameters X1, X3, and X4, between the product function Y3 and the design parameters X3, X5, X6, and X8, between the product function Y4 and the design parameters X5, X6, and X7, and between the product function Y5 and the design parameters X5, X8, X9, and X10.

In this case, a quality influence model between product function and design parameter can be produced by assigning "1" to a combination of a product function and a design parameter which influence each other and assigning "0" to a combination thereof which do not influence each other. A quality influence model in this case becomes similar to that shown in FIG. 26. Note that, in some cases, a measurement value of a design parameter is not present but only a set value thereof is present. In such a case, statistical process is performed by using a set value of a design parameter instead of a measurement value thereof.

Note that a diagram showing a method for producing a quality influence model by using the product failure historical information, which corresponds to one example of a method for producing a quality influence model between product function and design parameter in the step 502 in FIG. 25, is similar to FIG. 11 described above. Therefore, the description thereof is omitted here.

Figure 28:
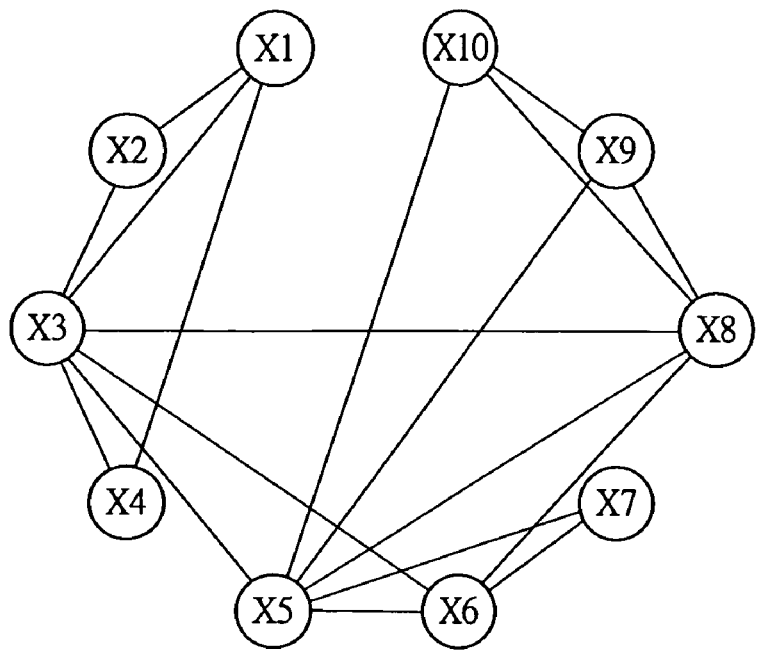
FIG. 28 is a diagram showing one example of initial values of a design parameter structured model representing mutual influence degrees among design parameters in the product design parameter determination supporting system according to the embodiment of the present invention.

FIG. 28 is a diagram showing one example of a design parameter structured model obtained by structuring mutual influence degree among design parameters in an example shown in FIG. 26. In this example, there are ten items of X1 to X10 as target design parameters. In FIG. 28, for example, a mutual influence degree is observed between the design parameters X1 and X2. In other words, when the design parameter X1 is changed, the design parameter X2 must be simultaneously changed with taking the design parameter X1 into account.

Besides, mutual influence degrees are observed between the design parameters X1 and X3, between the design parameters X1 and X4, between the design parameters X2 and X3, between the design parameters X3 and X4, between the design parameters X3 and X5, between the design parameters X3 and X6, between the design parameters X3 and X8, between the design parameters X5 and X6, between the design parameters X5 and X7, between the design parameters X5 and X8, between the design parameters X5 and X9, between the design parameters X5 and X10, between the design parameters X6 and X7, between the design parameters X6 and X8, between the design parameters X8 and X9, between the design parameters X8 and X10, and between the design parameters X9 and X10.

As a method for expressing the mutual influence degree, there are a network diagram where design parameters are connected by a line to express the presence of a mutual influence degree between the design parameters and a matrix diagram where "1" is assigned to a combination of design parameters where a mutual influence degree is present and "0" is assigned to a combination thereof where a mutual influence degree is not present. Since mutual influence degrees between design parameters of both the expressing methods are equivalent to each other, either one of the expressing methods may be used.

A method for preparing an initial value of the design parameter structured model using the quality influence model shown in FIG. 28 will be described with reference to FIG. 26. In the quality influence model shown in FIG. 26, a product function influenced by a design parameter is first extracted. For example, in the case of the design parameter X1, the product function Y1 is extracted. Next, another design parameter which influences the extracted product function is extracted. In this case, since the first design parameter and the extracted design parameter have a mutual relationship via a certain product function, an interrelationship occurs in a corresponding combination in the design parameter structured model.

In the case of the product function Y1 described above, since not only the design parameter X1 but also the design parameters X2 and X3 are parameters which influence the product function Y1, interrelationships occur between the design parameters X1 and X2 and between the design parameters X1 and X3. Also, since the design parameter X1 influences not only the product function Y1 but also the product function Y2, the product function Y2 is also extracted. Further, since the design parameters X3 and X4 are extracted due to the product function Y2, a mutual influence degree between the design parameters X1 and X4 is newly derived. Besides, in the case of the design parameter X2, the product function Y1 is extracted and the design parameters X1 and X3 are extracted due to the product function Y1.

In the case of the design parameter X3, the product functions Y1, Y2, and Y3 are first extracted, and the design parameters X1, X2, X4, X5, X6, and X8 are extracted, respectively. By performing similar processes to all the design parameters, a design parameter structured model expressing all mutual influence degrees among design parameters becomes a design parameter structured model shown in FIG. 28.

Figure 29:
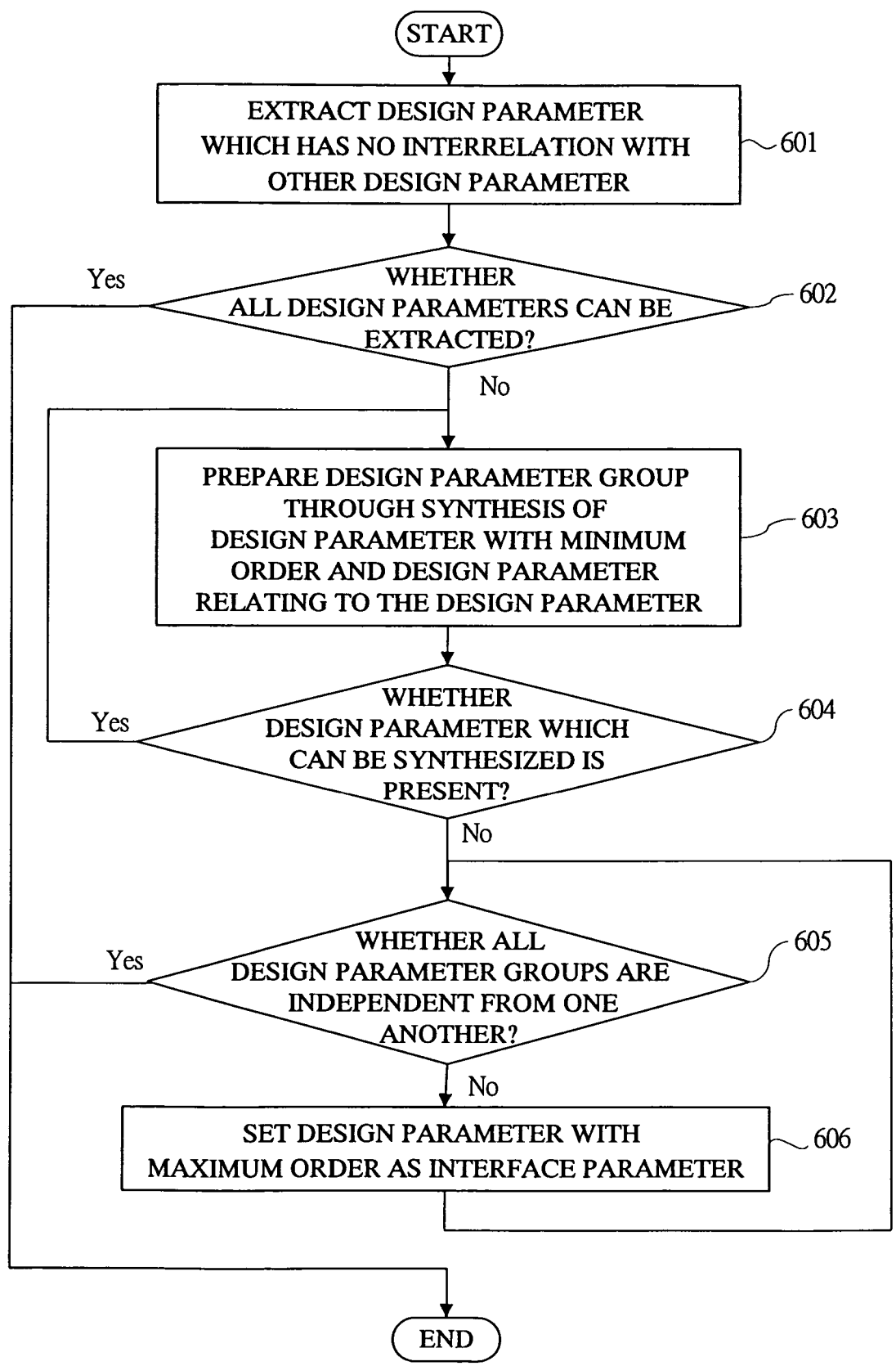
FIG. 29 is a flowchart showing a structuring process of design parameters in which design parameter groups are produced and interface parameters are set in the product design parameter determination supporting system according to the embodiment of the present invention.

FIG. 29 is a flowchart showing a method for preparing an interface parameter and a design parameter group through a structuring process of a design parameter structured model in the step 504 shown in FIG. 25.

In step 601, design parameters which do not have a mutual influence degree with other design parameters are first extracted from a design parameter structured model of a product to be developed, and they are defined as independent design parameter groups. In a design parameter structured model regarding design parameters X1 to X10 shown in FIG. 28, since each design parameter has a mutual influence degree with other design parameters, no independent design parameter is extracted.

In step 602, it is determined whether or not extraction of all design parameters has been completed in the step 601. When all the design parameters have been extracted, the process is terminated. When there is a remaining design parameter, a step 603 is conducted.

In step 603, a design parameter with the minimum order (the number of mutual influence degrees with other design parameters) is extracted from the remaining design parameters which have not been extracted in the step 601. At this time, when there are a plurality of design parameters with the same minimum order, the design parameters are extracted in the order of those having a smaller number of design parameters relating to the corresponding design parameter. Then, the design parameter with the minimum order is selected from the design parameters having a mutual influence degree with the extracted design parameter, and a design parameter group is prepared by synthesizing these design parameters. When the number of design parameters in the same design parameter group is equal to or more than a predetermined threshold number, synthesizing process to the design parameter group is not performed thereafter. Also, the design parameter group prepared by the synthesis is handled as one design parameter.

In step 604, it is determined whether or not any design parameter which can be synthesized is present in the remaining design parameters after the synthesizing process in the step 603. When a design parameter which can be synthesized is present, the step 603 is performed again. On the other hand, when no design parameter which can be synthesized is present, remaining design parameters which do not belong to any design parameter group are handled as one design parameter group and step 605 is performed.

In step 605, regarding design parameter groups prepared by the end of the step 604, it is determined whether or not respective design parameter groups have no mutual influence degree and they are independent from one another. When all the design parameter groups are independent from one another, the process is terminated. On the other hand, when a mutual influence degree is present between design parameter groups, the step 606 is repeatedly performed until the mutual influence degree between design parameter groups is removed.

In step 606, a design parameter with the maximum order in the design parameter groups where a mutual influence degree is present is set as an interface parameter of the design parameter group. Subsequently, the target design parameter group is processed without considering a mutual influence degree relating to the design parameter set as the interface parameter.

Figures 30A, 30B, 30C, 30D, 30E, 30F, 30G, 30H:
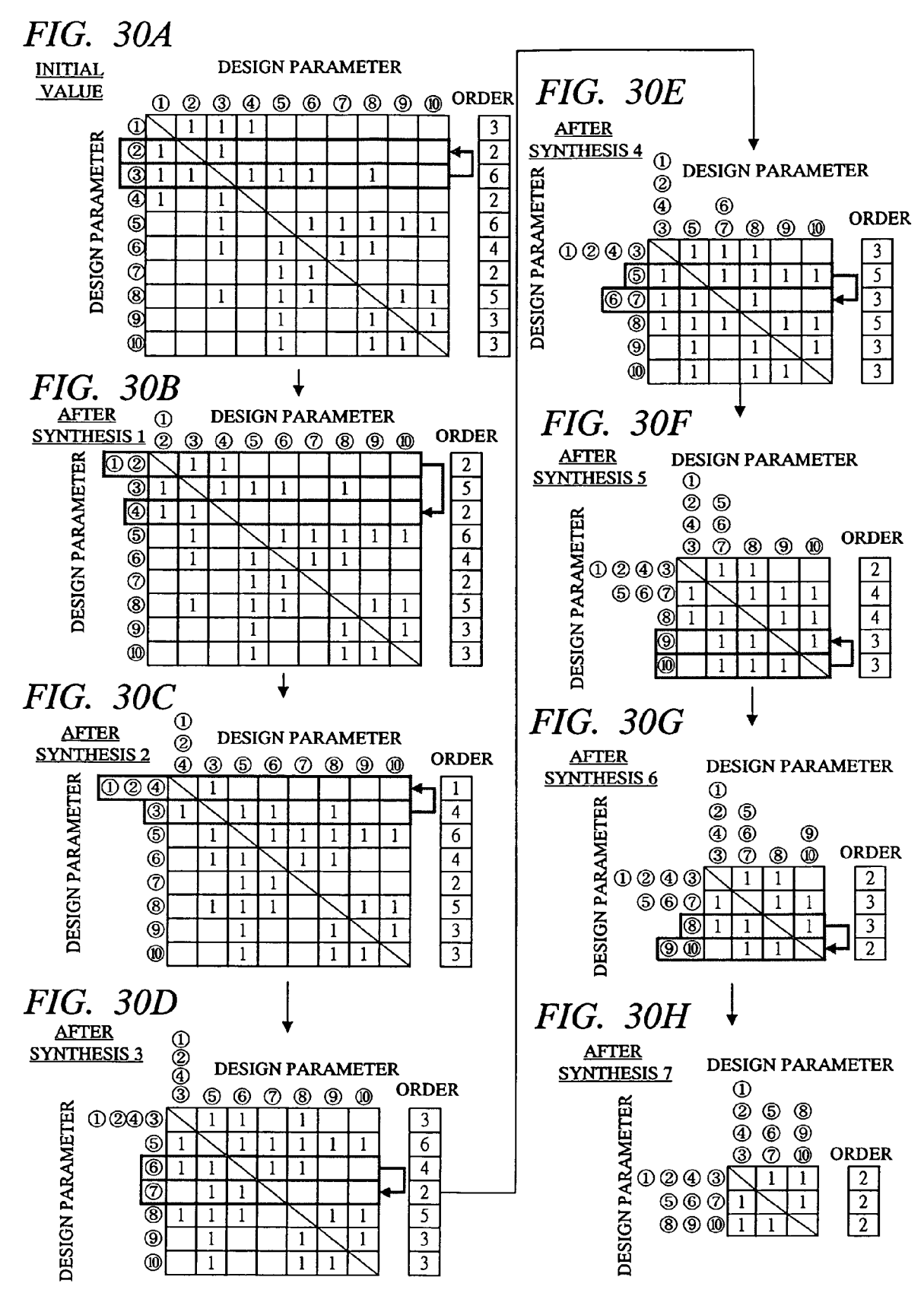

FIG. 30 is a diagram showing one example of a method for preparing a design parameter group in the design parameter structured model of the design parameters X1 to X10 shown in FIG. 28. The threshold number of design parameters in the same design parameter group is set to five in this example. Also, a synthesizing process of design parameters is performed seven times in total. In FIG. 30A, mutual influence degrees among the design parameters X1 to X10 and an initial value of the order for each design parameter (the number of mutual influence degrees with other design parameter) are shown.

In the first synthesis, the design parameter X2 is extracted as the design parameter with the minimum order. Then, the orders of the design parameters X1 and X3 relating to the design parameter X2 are compared with each other, and the design parameter X1 with a smaller order is selected. By this means, the design parameters X1 and X2 are synthesized (FIG. 30B).

When the design parameters X1 and X2 are synthesized, information items about mutual influence degrees of the respective design parameters X1 and X2 to other design parameters are also synthesized. In the second synthesis, the parameter (X1-X2) and the design parameter X4 which have the same order are compared with each other, and since the design parameter X4 is smaller in the number of design parameters than the design parameter (X1-X2), the design parameter X4 is selected as the design parameter with the minimum order. Of the design parameters (X1-X2) and X3 relating to the design parameter X4, the design parameter (X1-X2) is selected because of its minimum order, and X4 is synthesized with (X1-X2) (FIG. 30C). In the third synthesis, the design parameter X3 is synthesized with the design parameter (X1-X2-X4) with the minimum order (FIG. 30D). In the fourth synthesis, the design parameter X6 is synthesized with the design parameter X7 with the minimum order (FIG. 30E). In the fifth synthesis, the design parameter X5 is synthesized with the design parameter (X6-X7) with the minimum order (FIG. 30F). In the sixth synthesis, the design parameter X10 is synthesized with the design parameter X9 with the minimum order (FIG. 30G). In the seventh synthesis, the design parameter X8 is synthesized with the design parameter (X9-X10) with the minimum order (FIG. 30H). If further synthesis process is performed, the number of design parameters exceeds the threshold number (five) of the design parameters in the same design parameter group. Therefore, the synthesis process is terminated. Three types of design parameter groups are finally prepared, and a design parameter group 1={X1, X2, X3, X4}, a design parameter group 2={X5, X6, X7}, and a design parameter group 3={X8, X9, X10} are obtained.

Figure 31:
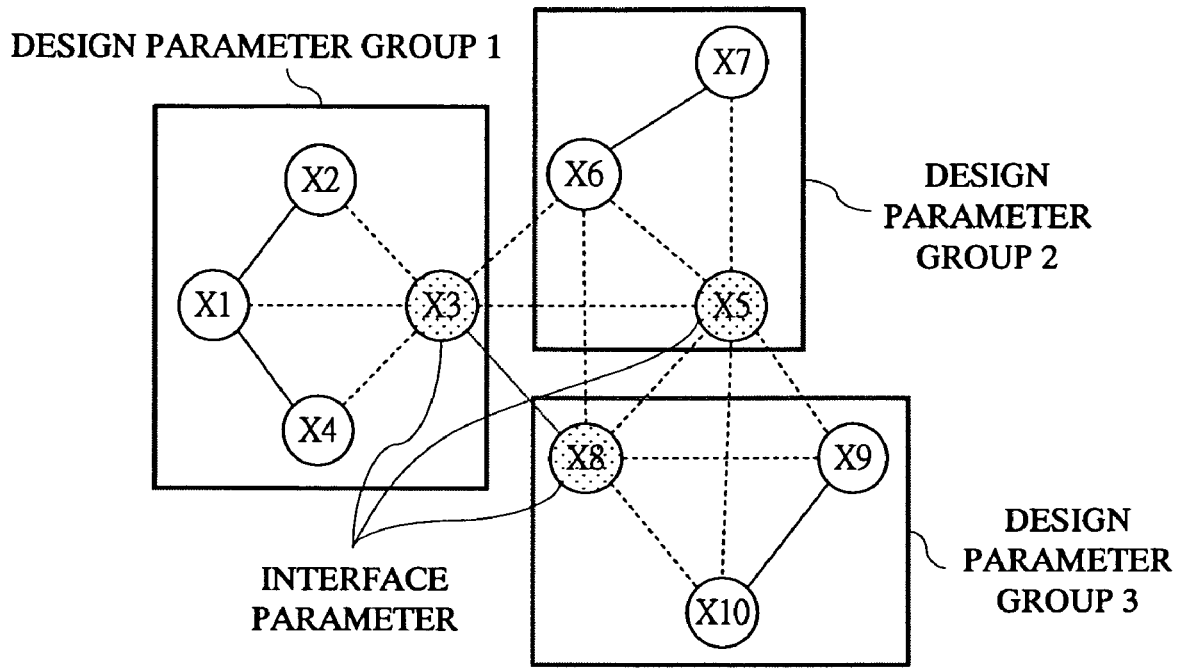
FIG. 31 is a diagram showing one example of a design parameter structured model after design parameter structuring process in the product design parameter determination supporting system according to the embodiment of the present invention.

FIG. 31 is a diagram showing one example of a method for setting an interface parameter in the design parameter structured model of the design parameters X1 to X10 shown in FIG. 28. As shown in FIG. 31, three design parameter groups are prepared according to steps 603 and 604 shown in FIG. 29. These groups are the design parameter group 1={X1, X2, X3, X4}, the design parameter group 2={X5, X6, X7}, and the design parameter group 3={X8, X9, X10}. In an initial state, since mutual influence degrees are present among the design parameter groups, they are not independent from one another.

Then, the design parameter X3 with the maximum order is set as the interface parameter, and a mutual influence degree with other design parameters relating to the design parameter X3 is made invalid. By doing so, the design parameter group 1 becomes independent from other design parameter groups. Next, the design parameter X5 with the maximum order is set as the interface parameter from the design parameter groups 2 and 3, and a mutual influence degree with other design parameters relating to the design parameter X5 is made invalid.

Since a mutual influence degree between the design parameter groups 2 and 3 is not cancelled yet in the above process, the design parameter X8 with the second-largest order is set as the interface parameter, and a mutual influence degree with other design parameters relating to the design parameter X8 is made invalid. By doing so, the design parameter groups 2 and 3 become independent from each other.

By finally setting the design parameters X3, X5, and X8 as interface parameters from the three design parameter groups, the respective design parameter groups become independent from one another. As a result, a design parameter group 1={X1, X2, X4}, a design parameter group 2={X6, X7}, and a design parameter group 3={X9, X10} are obtained.

Figure 32:
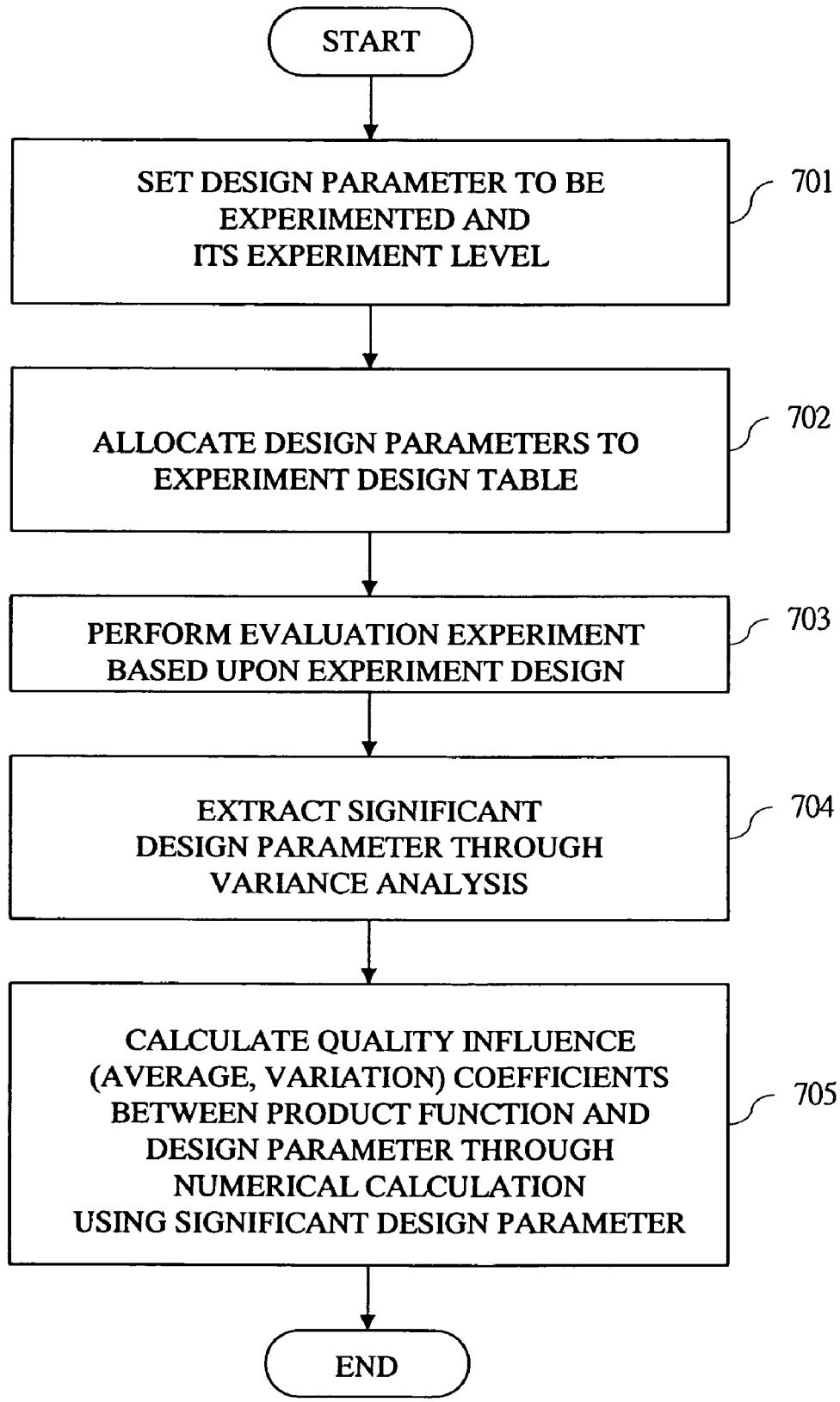
FIG. 32 is a flowchart showing a method for preparing an experiment design based upon a method of experiment design and a method for calculating a quality influence coefficient between product function and design parameter in the product design parameter determination supporting system according to the embodiment of the present invention.

FIG. 32 is a flowchart showing a method for preparing an experiment and a method for analyzing an experiment result in the steps 505 and 506 shown in FIG. 25.

First, in step 701, design parameters to be experimented and an experiment level for each design parameter are set. In an example of a design parameter structured model after the structuring process shown in FIG. 31, the design parameters X3, X5, and X8 are set in an experiment for an interface parameter. Design parameters of the design parameter group 1={X1, X2, X4}, the design parameter group 2={X6, X7}, and the design parameter group 3={X9, X10} are set in an experiment for each design parameter group.

Next, in step 702, an experiment design table satisfying the number of design parameters to be experimented, the number of levels thereof, and the number of interactions among design parameters is selected, and design parameters to be experimented are allocated to respective columns on the experiment design table. The experiment design table is a table where a combination of levels of parameters is displayed on each column, and it includes an orthogonal table used in Taguchi method, a composite design table used in response surface methodology, and the like. A design table with an appropriate scale is selected according to the number of design parameters, the experiment levels thereof, and the number of interactions among design parameters. Regarding the types of experiment design tables according to the number of design parameters, the levels thereof, and the number of interactions among design parameters, please see the Non-Patent Document 1.

In the orthogonal table used in Taguchi method, since a column to which design parameters having an interaction are allocated is determined in advance, the allocation is conducted according to an instruction of the allocation. For example, the design parameter group 1 of the design parameter structured model shown in FIG. 31 includes the design parameters X1, X2, and X4 to be experimented. When the number of levels of each design parameter=2 and interactions among respective design parameters are taken into account, the design parameters are allocated to an orthogonal table of L8 shown in FIG. 33, for example.

In this orthogonal table, when parameters A, B, and C are allocated to columns 1, 2, and 4, respectively, an interaction between A and B, an interaction between A and C, and an interaction between B and C orthogonally appear in the column 3, the column 5, and the column 6, respectively. Therefore, A, B, C, and influences of interactions of A×B, A×C, and B×C can be evaluated simultaneously by the analysis of the experiment result. In FIG. 33, the design parameter X1, the design parameter X2, and the design parameter X4 are respectively allocated to the column 1, the column 2, and the column 4 based upon the relationship among the interactions.

In step 703, an experiment is performed based upon the experiment design prepared in the step 702.

Next, in step 704, analysis of variance of the experiment result performed in the step 703 is performed and a statistically significant design parameter is extracted for each product function. FIG. 34 is a diagram showing an extraction example of significant parameters in the analysis of variance of the product function 1 in the experiment design shown in FIG. 33. In FIG. 34, p value is a value obtained through the statistical validation and showing a probability of occurrence of an assumption that, when no effect of a level of a parameter to be analyzed can be obtained, a value (F value) obtained by dividing variance due to change of a level of a target parameter (a value obtained by dividing a variation due to level change by the degree of freedom (the number of levels: 1)) by variance due to an error (a value obtained by dividing fluctuation of error variation by the degree of freedom (the number of columns to which design parameters are not allocated in the orthogonal table)) conforms to an F distribution. That is, an effect of a level of the target parameter becomes smaller when the p value becomes larger, and the effect of a level of the target parameter becomes larger when the p value becomes smaller.

When the threshold value of the p value is set to 0.05 or less, not only the interactions of the design parameters X1, X2, and X4 but also the interaction of (X1)×(X2) become significant parameters in this example. Regarding a specific method for calculating the variance analysis, see Patent Document 5.

In step 705, a quality influence coefficient between product function and design parameter is calculated through the numerical calculation using the statistically significant design parameters for each product function extracted by the variance analysis in the step 704. At this time, a quality influence coefficient is calculated for each of an average value and a variation of the product functions. In this case, a vector representing a product function is set as Y and a vector representing a design parameter is set as X. A relationship between the product function vector Y and the design parameter vector X is defined according to the following Equations (6) and (7). The Equation (6) is an equation representing an average value of product functions, and the equation (7) is an equation representing a variation of the product function.

$$Y\_ave = A\_ave \cdot X + B\_ave \quad (6)$$

$$Y\_var = A\_var \cdot X + B\_var \quad (7)$$

Note that A is a quality influence matrix including the number of columns corresponding to the design parameter vector and the number of rows corresponding to the number of product functions. Also, B is an offset correction vector corresponding to a product function vector. Further, the design parameter vector X includes not only respective design parameter items but also interaction components among a plurality of design parameter items and secondary components. Therefore, the number of items in the design parameter vector becomes equal to or more than the number of target design parameters.

Also, the product function vector includes an average value or a variation of the respective product functions. For example, a coefficient of each element of the quality influence matrix A and the offset correction vector B is determined through the calculation of least-square method of the experiment results so that an error between a measurement value of the product function vector Y in the design parameter vector X in each experiment and an estimation value of the product function vector calculated according to Equations (6) and (7) becomes minimum.

FIG. 35 is a diagram showing a relationship of a quality influence degree regarding the primary component and the interaction of design parameter and product function in the design parameter structured model shown in FIG. 31. The items of the design parameter include an item of interaction between design parameters. When "O" is marked in a row of product function and in a column of the design parameter item, there is a possibility that a quality influence degree is present. Therefore, presence/absence of such a quality influence degree must be confirmed in an experiment. In the present invention, the presence/absence of a relationship shown in FIG. 35 is efficiently examined in the experiment performed in the two steps of step 505 and step 506 in FIG. 25.

FIG. 36 is a diagram showing a state of a quality influence model between design parameter and product function which can be calculated in an experiment design prepared from the design parameter structured model shown in FIG. 31. The items of design parameter include an item of interaction among design parameters.

In a table shown in FIG. 36, A indicates a coefficient of design parameter and product function which can be calculated from an experiment between interface parameters. B indicates a coefficient of design parameter and product function which can be calculated from an experiment of the design parameter group 1, C indicates a coefficient of design parameter and product function which can be calculated from an experiment of the design parameter group 2, and D indicates a coefficient of design parameter and product function which can be calculated from an experiment of the design parameter group 3. E indicates a coefficient of design parameter and product function which cannot be calculated in the experiment design prepared from the design parameter structured model shown in FIG. 31. Influence of interaction between each design parameter in a design parameter group to which the interface parameter belongs and the interface parameter cannot be calculated.

Figure 37:
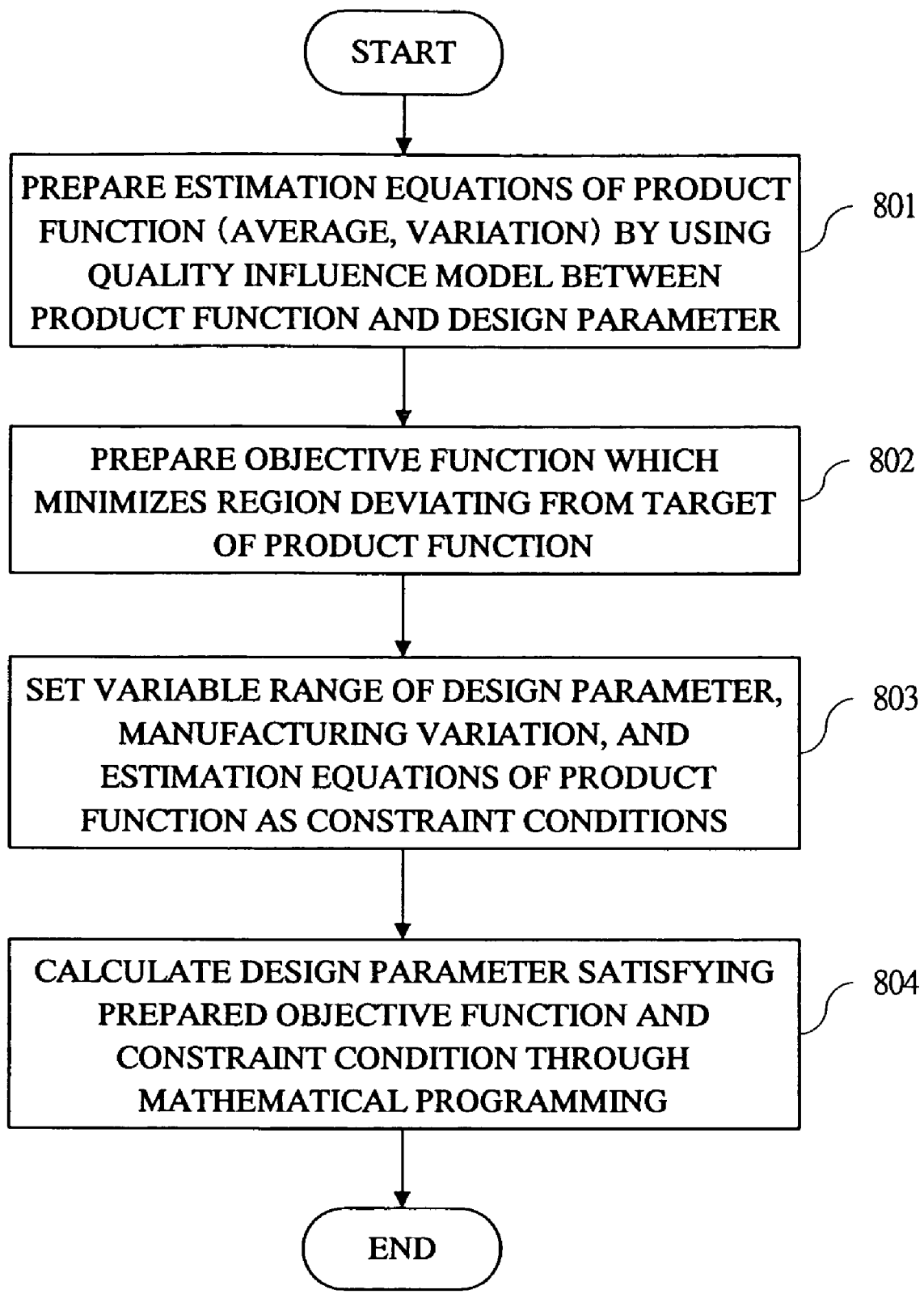
FIG. 37 is a flowchart showing a method for coordination calculation of design parameters with taking into account the manufacturing variation in the product design parameter determination supporting system according to the embodiment of the present invention.

FIG. 37 is a flowchart showing a calculating method for performing a coordination process of design parameter with taking into account the manufacturing variation in step 507 shown in FIG. 25.

In step 801, estimation equations for estimating an average value and a variation of product functions from design parameter are prepared by using a quality influence coefficient between product function and design parameter for each design parameter group calculated in the step 506 shown in FIG. 25 (Equations (8) and (9)). At this time, only the quality influence coefficients regarding a parameter determined to be significant in the step 506 shown in FIG. 25 are used.

$$F = (A\_ave \cdot X) + B\_ave \quad (8)$$

$$G^2 = (A\_ave \cdot \sigma)^2 + A\_var \cdot X + B\_var \quad (9)$$

Here, F is a function having the design parameter vector X as an input variable and the average value of the product function as an output variable, G is a function having the design parameter vector X as an input variable and the variation of the product function as an output variable, and σ is a vector formed of standard deviations of respective items of the design parameter vector X.

In step 802, an objective function having a region where an estimation value of product function deviates from a target as an index is prepared. For example, the objective function is defined by using estimation equations of the average value and the variation prepared in the step 801. When the objective function has target values regarding the upper limit and the lower limit, it is expressed by Equation (10). When it has a target value regarding only the upper limit, it is expressed by Equation (11). When it has a target value regarding only the lower limit, it is expressed by Equation (12). This is an equation equivalent to process capability index Cpk. Also, when a plurality of product functions are present, the total sum obtained by weighting the process capability index for each product function is defined as the objective function.

$$H = \min\{(USL-F)/3G, (F-LSL)/3G\} \quad (10)$$

$$H = (USL-F)/3G \quad (11)$$

$$H = (F-LSL)/3G \quad (12)$$

Here, USL represents an upper target value of a target product function and LSL represents a lower target value of the target product function.

In step 803, a variable range (range of level) of each design parameter item and estimation equations of the average value and the variation of the product function are set as constraint conditions for coordination calculation.

In step 804, numerical calculation process using the objective function prepared in the step 802 and the constraint condition equation prepared in the step 803 is performed, and an approximate solution of a design parameter which satisfies the constraint conditions and makes a value of the objective function minimum is calculated. For example, as a numerical calculation method, linear programming, quadratic programming, Newton-Raphson process, and the like are known. In each case, an input variable which makes the objective function minimum (or maximum) and satisfies the constraint conditions can be calculated by setting a function between an input variable and an output variable, an objective function of the output variable, and constraint conditions of the input variable and the output variable to perform a predetermined calculation algorithm.

Figure 38A:
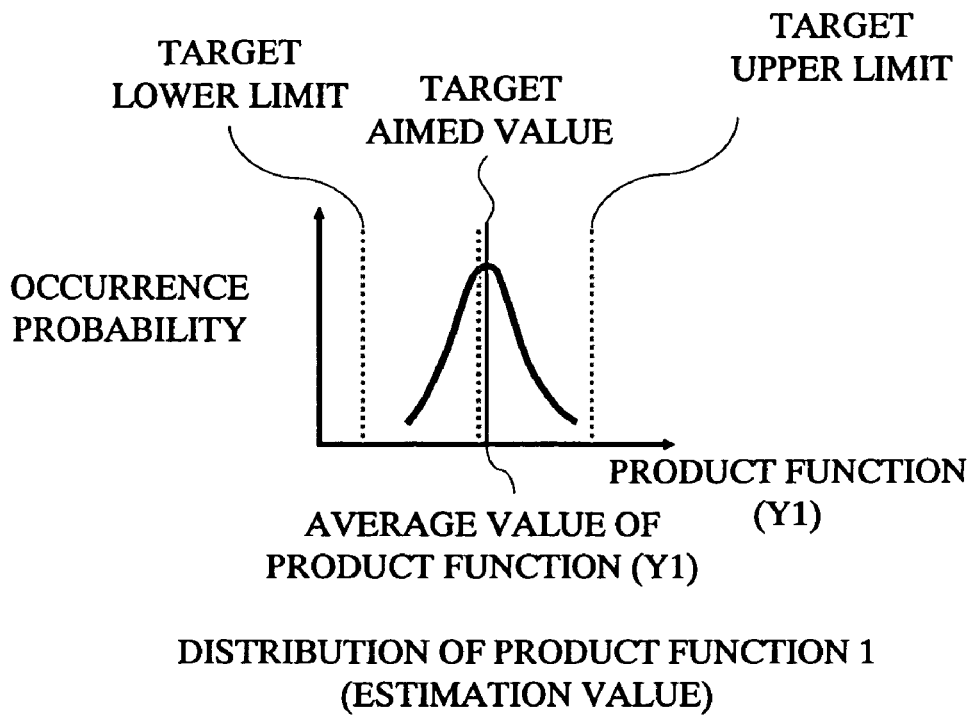
FIG. 38A is a diagram showing one example of a distribution state of an estimation result of product functions in the product design parameter determination supporting system according to the embodiment of the present invention.
Figure 38B:
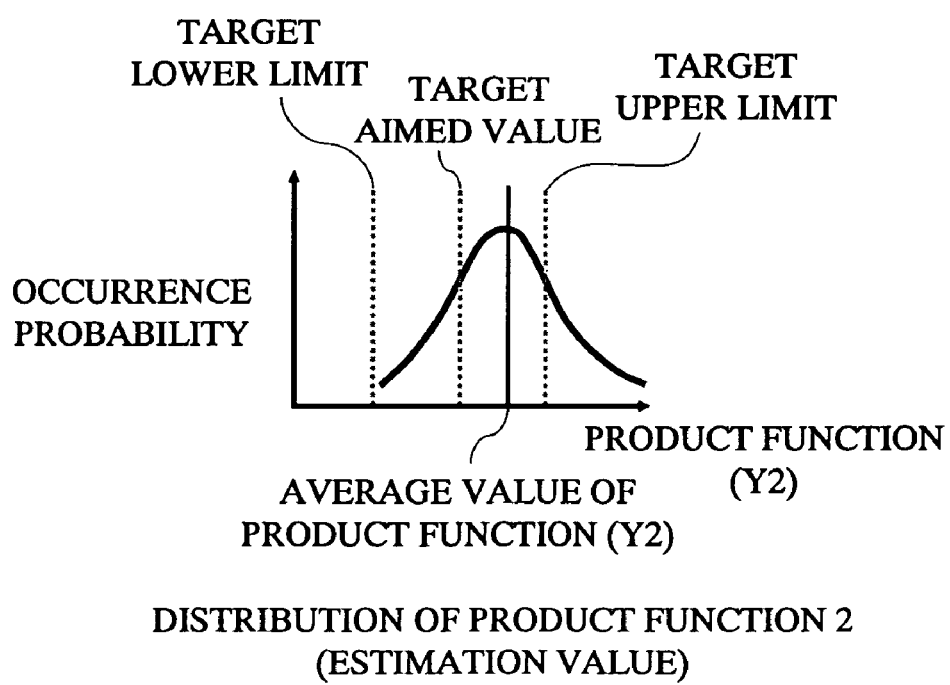
FIG. 38B is a diagram showing one example of a distribution state of an estimation result of product functions in the product design parameter determination supporting system according to the embodiment of the present invention.

FIG. 38 is a diagram showing an example of a distribution state of estimation values of a product function. An estimation result of a distribution of a product function 1 is shown in FIG. 38A. An average value of the product function 1 approximately coincides with a target aimed value. Also, a variation thereof also falls within a range of a target upper limit and a target lower limit. On the other hand, regarding a product function 2 shown in FIG. 38B, its average value deviates from a target aimed value and its variation is large. Therefore, a region exceeding a target upper limit is present. In the coordination process of a design parameter with taking into account the manufacturing variation shown in FIG. 37, coordination process of relating design parameters is performed so as to prevent the influence on the distribution of the product function 1 and to minimize the region deviating from the target of the product function 2.

FIG. 39 is a diagram showing a display example of a calculation result of design parameter specifications at the time when the coordination calculation of a design parameter taking into account the manufacturing variation shown in FIG. 37 has been performed. In this example, ten items of the design parameters X1 to X10 shown in FIG. 26 are handled. An initial value, an appropriate value, a manufacturing variation record, design parameter group, and presence/absence of interface setting of each design parameter item are displayed. For example, an initial value of the design parameter X1 is "150" but an appropriate value thereof is "130". Also, since the design parameter X3 is set as the interface parameter, its initial value is equal to the set value.

FIG. 40 is a diagram showing a display example of a calculation result of estimation values of product functions at the time when the coordination calculation of a design parameter taking into account the manufacturing variation shown in FIG. 37 has bee performed. In this example, five items of the product functions Y1 to Y5 shown in FIG. 26 are handled. An estimation value (average, variation), a target value (aimed value, upper limit, lower limit), and a determination result of each product function are displayed. Some product functions do not have a target value to be aimed but have only a target upper limit or a target lower limit. For example, although a target of the product function Y3 is in a range from 900 to 1100, an estimation average value thereof is 1050 and an estimation variation (3σ) is 80. Therefore, a value of (average+3σ) is 1130, which does not satisfy the target.

Figure 41:
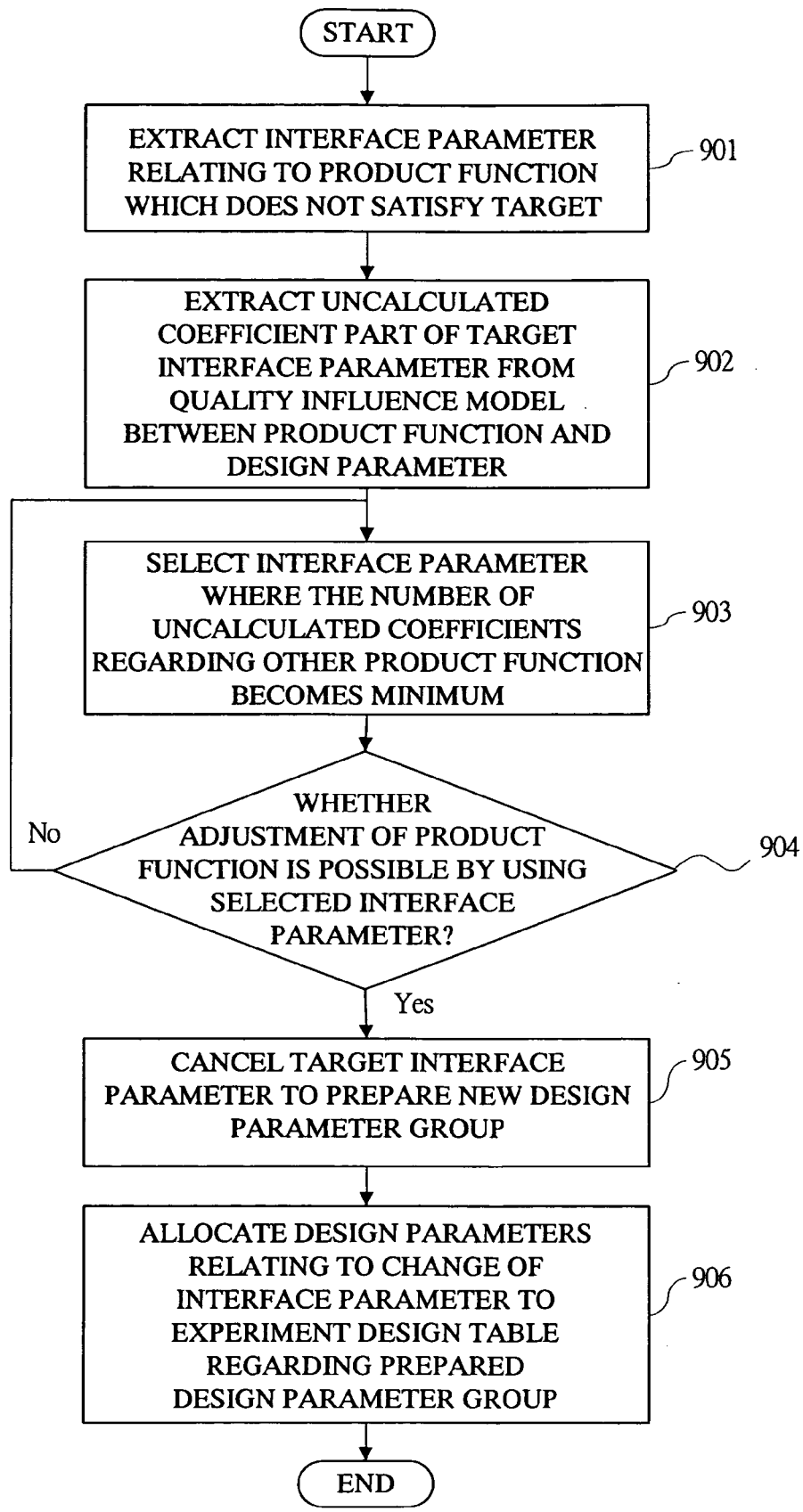
FIG. 41 is a flowchart showing a method for adjusting a design parameter to be an interface parameter in the product design parameter determination supporting system according to the embodiment of the present invention.

FIG. 41 is a flowchart showing a method for adjusting an interface parameter in the step 509 shown in FIG. 25.

In step 901, regarding a product function which is determined not to satisfy a target in the step 508 shown in FIG. 25, an interface parameter relating to a product function to be adjusted is extracted. For example, in the quality influence model between product function and design parameter shown in FIG. 26, it is assumed that only the product function Y3 does not satisfy the target. In this case, as an interface parameter relating to the product function Y3, the design parameters X3, X5, and X8 are extracted from the design parameter structured model shown in FIG. 31.

Next, in step 902, regarding the design parameter extracted as the interface parameter in step 901, a coefficient which has not been calculated in the quality influence model between product function and design parameter prepared in the steps 505 and 506 shown in FIG. 25 is extracted. In the previous example, FIG. 36 shows a calculation state of the quality influence model between product function and design parameter.

FIG. 42 is a diagram showing a result of extraction of coefficients, which have not been calculated in the quality influence model between product function and design parameter, from FIG. 36 regarding the extracted design parameters X3, X5, and X8 to be interface parameters. A mark "O" indicates a combination where a coefficient has been calculated, and a mark "x" indicates a combination where a coefficient has not been calculated yet. An item of interaction among design parameters is also handled. For example, not only a value of the product function Y3 but also values of the product functions Y1 and Y2 are changed when a value of the design parameter X3 is changed. Also, there is a possibility that X3 influences the product functions Y1, Y2, and Y3 due to influence of interaction when X3 is changed in combination with X1, X2, X4, and X6. For example, there is a possibility that the product functions Y1 and Y2 change when the design parameter X1 is changed in combination with the design parameter X3.

Next, in step 903, an interface parameter where the number of uncalculated coefficients regarding a product function except for a product function to be adjusted becomes minimum is extracted based on information of uncalculated coefficients of a quality influence model between product function and design parameter for each interface parameter prepared in the step 902.

In the previous example, it is understood from FIG. 42 that the numbers of uncalculated coefficients in the design parameters X3, X5, and X8 regarding a product function except for the product function Y3 to be adjusted are "4", "4", and "2", respectively. In this case, the interface parameter X8 which has the minimum number of uncalculated coefficients is selected.

In step 904, it is determined whether or not there is a possibility that a product function to be adjusted satisfies a target with the interface parameter selected in the step 903. In the previous example, it is determined from the quality influence coefficient between the selected design parameter X8 and the product function Y3 and variable level data of the design parameter X8 whether or not the product function Y3 can be changed to a range where a target is satisfied by using the quality influence coefficient between the design parameter X8 and the product function Y3 when the design parameter X8 is changed within the level range.

When it is determined that the product function to be adjusted does not satisfy the target with the selected interface parameter, the interface parameter selected in the step 903 is made invalid, and the step 903 is performed again for an interface parameter except for the invalid interface parameter. When it is determined that the product function to be adjusted satisfies the target with the selected interface parameter, step 905 is performed.

In step 905, the interface parameter selected in the step 903 is cancelled and design parameter groups independent from one another are newly prepared. The result obtained by canceling the interface condition of the design parameter X8 by using the previous example is shown in FIG. 43. In this case, a mutual influence degree occurs between the design parameter group 2 and the design parameter group 3 by canceling the interface condition of the design parameter X8. Therefore, a design parameter group 4 including the design parameter X5 as an interface parameter is newly prepared by synthesizing the design parameter group 2 and the design parameter group 3.

In step 906, regarding a design parameter whose interface setting has been canceled in the design parameter group newly prepared in the step 905 and a design parameter having a mutual influence degree with the design parameter, allocation to an experiment design table is performed by using the method for preparing an experiment shown in FIG. 30 to prepare an additional experiment design. In the previous example, the design parameter X8 whose interface setting has been canceled and the design parameters X6, X9, and X10 having a mutual influence degree with the design parameter X8 of the design parameters X6, X7, X8, X9, and X10 included in the design parameter group 4 to which X8 belongs are to be evaluated.

As described above, according to the product design parameter determination supporting system of this embodiment and the method for determining a design parameter in this system, since an interface parameter and design parameter groups independent from one another are prepared by structuring a quality influence degree between product function and design parameter and a mutual influence degree among design parameters and a function to prepare an experiment design based upon the design parameter groups is provided, an experiment which can efficiently satisfy a required product function in a short time, takes the mutual influence degrees among design parameters into account from the beginning, and requires reduced number of repetition processes can be performed.

Furthermore, since a function to estimate a product function with taking into account the manufacturing variation from a relationship of a quality influence degree between product function and design parameter is provided, a design parameter can be determined with taking influence of manufacturing variation occurring in a mass production stage into account. Accordingly, product drawback is prevented from occurring in the mass production stage, and a product development term can be shortened.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention relates to a technology for determining a design parameter of a product and supporting the determination. More particularly, it can be effectively applied to a method and a system for efficiently determining a design parameter in a design process for determining a design parameter required for manufacturing a hardware product in a hardware product development.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications to fall within the ambit of the appended claims.

What is claimed is:

1. A product design parameter determining method which includes a product design process for determining a design parameter regarding a product structure of a product and a design parameter regarding a manufacturing method of said product in order to satisfy a function required for said product, wherein said product design process comprises:

a first step of, by using quality influence model structuring processing means, producing a quality influence model including a model obtained by structuring a degree of quality influence of a plurality of design parameters of said product on a plurality of product functions and a model obtained by structuring a relationship of a mutual influence degree among design parameters;

a second step of, by using experiment design preparing means, extracting a design parameter group with reduced interaction from the quality influence model produced by said quality influence model structuring processing means and then preparing an experiment design based upon the design parameter group; and a third step of, by using a design parameter coordination processing means, acquiring a result of an experiment performed based upon the experiment design prepared by said experiment design preparing means, updating the quality influence model between product function and design parameter by using the experiment result, and performing coordination process of a design parameter and estimation of a product function for satisfying a required product function with taking into account manufacturing variation, and common quality influence model is used in said first, second, and third steps, and said product design process is performed by combining said first, second, and third steps.

2. The product design parameter determining method according to claim 1, wherein said first step comprises: a step of producing a model obtained by structuring a mutual influence degree in quality between product function and design parameter of said product by using past product failure historical information regarding a product similar to said product or product development historical information having experiment result historical information; and a step of automatically producing a model obtained by structuring a mutual influence degree among design parameters by using the previously produced quality influence model between product function and design parameter.

3. The product design parameter determining method according to claim 2, wherein the product development historical information acquired in said first step comprises: experiment result historical information including a design parameter item for each product, a set value and a measurement value thereof, a product function item, and a measurement result of a product function at a set design parameter value; and product failure historical information including a failed product function item for each product and information relating to a design parameter item causing the failure.

4. The product design parameter determining method according to claim 1, wherein said second step comprises: a step of preparing a design parameter group where an interrelationship between design parameters becomes minimum by using the model obtained by structuring a mutual influence degree in quality among design parameters and produced in said first step; a step of preparing experiment units of a design parameter group and setting an experiment order of the experiments by using design parameter group information prepared previously; a step of setting a reference value of a design parameter to be an interface parameter with a precedent experiment from previously set experiment order information; and a step of determining a setting combination of design parameters for each experiment unit to prepare individual experiment conditions.

5. The product design parameter determining method according to claim 1, wherein said third step comprises: a step of updating the model obtained by structuring a mutual influence degree between product function and design parameter by using result information of an experiment performed based upon the experiment design prepared in said second step; a step of preparing an objective function of design parameter coordination calculation by weighting for each product function; a step of preparing a constraint condition of the design parameter coordination calculation from a variable range of design parameter taking into account the past manufacturing variation record information and a target value of a product function; a step of calculating an approximate solution of a design parameter which satisfies the previously prepared constraint condition and maximizes the objective function; and a step of calculating estimation values of an average value and a variation of a product function with taking into account a manufacturing variation in the previously calculated approximate solution of the design parameter.

6. The product design parameter determining method according to claim 1, wherein the quality influence model produced in said first step is expressed by a matrix system.

7. A product design parameter determination supporting system comprising:

a first database unit where historical information about a measurement result of manufacturing variation in past manufacturing process of a product is accumulated;

a second database unit where experiment result historical information for storing a set value for each design parameter and a measurement value thereof in an experiment and a measurement result of a product function in the experiment is accumulated;

a third database unit where product failure historical information for storing past product failure information therein is accumulated;

a fourth database unit where quality influence model information obtained by structuring a quality influence degree between product function and design parameter of a product to be developed is accumulated;

a data input unit which inputs information about a product to be developed;

a result display unit which displays an operation result; and a data operation unit which includes: a quality influence model structuring processing unit which performs structuring process of a quality influence degree between product function and design parameter; an experiment design preparing unit which prepares an experiment design of a target product by using the structured quality influence degree; and a design parameter coordination processing unit which performs coordination calculation of a design parameter from an evaluation result of an experiment performed based upon the experiment design.

8. A product design parameter determining method which includes a product design process for determining a design parameter regarding a product structure of a product and a design parameter regarding a manufacturing method of said product in order to satisfy a function required for said product, wherein said product design process comprises:

a first step of, by using a quality influence model structuring processing means, producing a quality influence model between product function and design parameter obtained by structuring a degree of quality influence of a plurality of design parameters of said product on a plurality of product functions and a design parameter structured model obtained by structuring a relationship of a mutual influence degree among design parameters, and then classifying all design parameters into design parameters to be interface parameters between design parameters and design parameters included in mutually independent design parameter groups by using said design parameter structured model;

a second step of, by using an experiment design preparing and analyzing means, preparing an experiment design for each interface parameter and design parameter group prepared by said quality influence model structuring processing means, acquiring a result of an experiment performed based upon the prepared experiment design, calculating a magnitude of a quality influence degree between product function and design parameter by using the experiment result, and updating said quality influence model between product function and design parameter;

a third step of, by using a design parameter coordination processing means, performing coordination process of design parameters in the mutually independent design parameter groups and estimation of a product function with taking into account a manufacturing variation so as to satisfy a required product function by using the quality influence model between product function and design parameter prepared by said experiment design preparing and analyzing means; and a fourth step of adjusting an interface parameter between design parameter groups and a constitution of a design parameter group in accordance with the estimation value of a product function calculated by said design parameter coordination processing means, and said product design process is performed by combining said first, second, third, and fourth steps.

9. The product design parameter determining method according to claim 8, wherein said first step comprises:

a step of producing a model obtained by structuring a quality influence degree between product function and design parameter of said product by using past product failure historical information regarding a product similar to said product or product development historical information having experiment result historical information;

a step of automatically producing a model obtained by structuring a mutual influence degree among design parameters by using the previously produced quality influence model between product function and design parameter;

a step of sequentially performing synthesizing processes of a design parameter having the minimum number of mutual influence degrees with other design parameters and a design parameter having the minimum number of mutual influence degrees among from design parameters having a mutual influence degree with said design parameter by using the previously produced design parameter structured model, thereby preparing design parameter groups; and a step of sequentially setting a design parameter having the maximum number of mutual influence degrees with other design parameters as an interface parameter until the previously prepared design parameter groups become independent from one another.

10. The product design parameter determining method according to claim 9, wherein the product development historical information acquired in said first step comprises: experiment result historical information including a design parameter item for each product, a set value and a measurement value thereof, a product function item, and a measurement result of a product function at a set design parameter value; and product failure historical information including a failed product function item for each product and information relating to a design parameter item causing the failure.

11. The product design parameter determining method according to claim 8, wherein said second step comprises: a step of performing an experiment regarding the design parameter to be an interface parameter prepared in said first step to determine an initial value of the interface parameter; and a step of preparing experiment designs regarding design parameters in respective design parameter groups for each design parameter group prepared in said first step to sequentially perform the experiments, performing variance analysis for each product function from an experiment result, and then calculating a magnitude of quality influence degree between product function and design parameter regarding a significant design parameter.

12. The product design parameter determining method according to claim 8, wherein said third step comprises: a step of preparing estimation equations of an average value and a variation of a product function from a design parameter by using the quality influence model between product function and design parameter produced in said second step and preparing an objective function having a region where a product function deviates from a target as an index by using the estimation values of the average value and the variation of the product function; a step of preparing a constraint condition of a variable range of a design parameter; a step of calculating an approximate solution of a design parameter which satisfies the previously prepared constraint condition and minimizes the objective function; and a step of calculating estimation values of an average value and a variation of a product function with taking into account a manufacturing variation in the previously calculated approximate solution of a design parameter.

13. The product design parameter determining method according to claim 8, wherein said fourth step comprises: a step of extracting interface parameters relating to a product function which does not satisfy a target from the estimation values of an average value and a variation of product functions calculated in said third step; a step of selecting an interface parameter where the number of uncalculated coefficients is the minimum in the quality influence model between product function and design parameter from the previously extracted interface parameters; and a step of canceling interface setting of the selected interface parameter, and then newly preparing mutually independent design parameter groups.

14. The product design parameter determining method according to claim 8, wherein the quality influence model between product function and design parameter and the design parameter structured model produced in said first step are expressed by a matrix system.

15. A product design parameter determination supporting system comprising:

a first database unit where historical information about a measurement result of manufacturing variation in past manufacturing process of a product is accumulated;

a second database unit where experiment result historical information for storing a set value for each design parameter and a measurement value thereof in an experiment and a measurement result of a product function in the experiment is accumulated;

a third database unit where product failure historical information for storing past product failure information therein is accumulated;

a fourth database unit where quality influence model information obtained by structuring a quality influence degree between product function and design parameter of a product to be developed is accumulated;

a data input unit which inputs information about a product to be developed;

a result display unit which displays an operation result; and a data operation unit which includes: a quality influence model structuring processing unit which performs structuring process of a quality influence degree between product function and design parameter; an experiment design preparing and analyzing unit which prepares an experiment design of a target product by using the structured quality influence model and analyzes an experiment result to calculate a quality influence model between product function and design parameter; a design parameter coordination processing unit which performs coordination calculation of a design parameter with taking into account a manufacturing variation so as to satisfy a required product function by using said quality influence model between product function and design parameter; and an interface parameter adjustment processing unit which performs adjustment of an interface parameter between design parameter groups and re-prepares a design parameter group in accordance with a result of the design parameter coordination process.

* * * * *